United States Patent
Carol et al.

(10) Patent No.: US 10,404,713 B2
(45) Date of Patent: Sep. 3, 2019

(54) MULTI-SOURCE BROADCASTING ARCHITECTURE

(71) Applicant: ZOTT, INC., San Juan Capistrano, CA (US)

(72) Inventors: James Zenon Carol, Dana Point, CA (US); Taylor Quinton Carol, Dana Point, CA (US); Jacob Robert Hurst, Dana Point, CA (US)

(73) Assignee: Zott, Inc., San Juan Capistrano, CA (US)

( * ) Notice: Subject to any disclaimer, the term of this patent is extended or adjusted under 35 U.S.C. 154(b) by 158 days.

(21) Appl. No.: 15/723,825

(22) Filed: Oct. 3, 2017

(65) Prior Publication Data
US 2019/0104128 A1 Apr. 4, 2019

Related U.S. Application Data

(60) Provisional application No. 62/565,720, filed on Sep. 29, 2017.

(51) Int. Cl.
*H04L 29/06* (2006.01)
*H04L 29/08* (2006.01)
(Continued)

(52) U.S. Cl.
CPC .......... *H04L 63/102* (2013.01); *H04L 9/3226* (2013.01); *H04L 12/18* (2013.01);
(Continued)

(58) Field of Classification Search
CPC .................................................... H06L 63/102
(Continued)

(56) References Cited

U.S. PATENT DOCUMENTS 6,732,179 B1   5/2004 Brown et al.
6,766,305 B1   7/2004 Fucarile
(Continued)

FOREIGN PATENT DOCUMENTS

EP   1192804 B1   12/2003
EP   1419593 A1   12/2003
(Continued)

OTHER PUBLICATIONS

End-to-End IPTV Solutions 2015, Antik Technology, www.antiktech.com.
(Continued)

*Primary Examiner* — Longbit Chai
(74) *Attorney, Agent, or Firm* — Knobbe, Martens, Olson & Bear, LLP

(57) ABSTRACT

Embodiments of the systems and methods disclosed herein provide a private broadcast platform architecture including a web server communication module, an access module, and an external communications module. The web server communication module receives an encrypted request data packet and sends a resource request message to the access module. The access module receives the resource request message and generate a resource transcoding request message. The external communications module receives the resource transcoding request message and in response, displays a broadcast platform resource data packet stream in a web page for display to a first user.

20 Claims, 49 Drawing Sheets

(51) Int. Cl.
*H04L 12/18* (2006.01)
*H04L 9/32* (2006.01)

(52) U.S. Cl.
CPC ............ *H04L 63/104* (2013.01); *H04L 67/02* (2013.01); *H04L 67/12* (2013.01)

(58) Field of Classification Search
USPC .......................................................... 713/168
See application file for complete search history.

(56) References Cited

U.S. PATENT DOCUMENTS

| | | | |
|---|---|---|---|
| 7,283,491 B2 | 10/2007 | Ichiyoshi | |
| 8,140,004 B2 | 3/2012 | Hoffmann et al. | |
| 8,484,675 B2 | 7/2013 | Coppens et al. | |
| 8,726,403 B2 * | 5/2014 | Huang | H04L 9/083 380/201 |
| 8,868,678 B2 | 10/2014 | Hildreth et al. | |
| 8,966,544 B2 | 2/2015 | Perry, II et al. | |
| 9,270,724 B1 | 2/2016 | Morgan et al. | |
| 9,301,001 B2 | 3/2016 | Warrick et al. | |
| 9,326,016 B2 | 4/2016 | Grasset | |
| 9,467,706 B2 | 10/2016 | Good | |
| 9,654,807 B2 | 5/2017 | Funderburk et al. | |
| 2006/0230169 A1 | 10/2006 | Kaplan et al. | |
| 2010/0100898 A1 | 4/2010 | Pfleging et al. | |
| 2010/0175101 A1 | 7/2010 | Devictor et al. | |
| 2011/0197237 A1 | 8/2011 | Turner | |
| 2012/0331056 A1 | 12/2012 | Kim et al. | |
| 2012/0331106 A1 | 12/2012 | Ramamurthy et al. | |
| 2013/0198005 A1 | 8/2013 | Xiong et al. | |
| 2014/0118112 A1 | 5/2014 | Pugel et al. | |
| 2014/0282748 A1 | 9/2014 | McNamee et al. | |
| 2015/0020135 A1 | 1/2015 | Frusina et al. | |
| 2015/0195594 A1 | 7/2015 | Hicks et al. | |
| 2016/0094879 A1 | 3/2016 | Gerszberg et al. | |
| 2017/0201564 A1 | 7/2017 | Hardwick et al. | |
| 2017/0245015 A1 | 8/2017 | Rose et al. | |
| 2018/0006884 A1 * | 1/2018 | Zimmermann | G06F 9/5077 |
| 2018/0241849 A1 | 8/2018 | Edmiston et al. | |

FOREIGN PATENT DOCUMENTS

| | | |
|---|---|---|
| EP | 3001690 A1 | 3/2016 |
| KR | 10 2010 0127171 | 12/2010 |
| WO | WO 2010058215 A1 | 3/2001 |

OTHER PUBLICATIONS

IPVideoTrans.com, Live Video Stream Transcoding Software, IP Video Solution At Low Cost, http://www.ipvideotrans.com/live-video-transcoding.html, downloaded Oct. 16, 2017.
Scalable Live Video Streaming Witty Nginx Plus and Bitrnovin, https://www.nginx.com/blog/scalable-live-video-streaming-nginx-plus-bitmovin/, Mar. 13, 2016.
Light Speed Live Guide, "Lightspeed Live Capture", User Guide, Live Capture 2.3 with ComponentPac 7.1.3., http://www.telestream.net/pdfs/user-guides/Lightspeed-UserGuides/Lightspeed-Live-Guide.pdf, Telestream.
Timmerer, et al., "Over the Top Content Delivery: State of the Art and Challenges Ahead", ACM Multimedia, Nov. 2014, https://www-itec.uni-klu.ac.at/bib/files/ACM_MM_Tutorial_11_2014.pdf. Cisco Simple Live Video Streaming, https://www.wowza.com/solutions/streaming-types/live-video-streaming, Wowza.
"How does satellite Internet operate?" Apr. 3, 2001. HowStuffWorks.com. <https://computer.howstuffworks.com/question606.htm> Apr. 17, 2018.
Content Provider Platform for Satellite Migration to IP, https://www.cisco.com/c/en/us/solutions/collateral/service-provide/network-functions-virtualization-nfv-infrastructure/at-a-glance-c45-738811.pdf, Cisco, 2017.
Dsr-7401 Commercial Integrated Satellite Receiver, High quality cost effective SD output transcoder, http://www.arris.com/products/dsr-7401/, Arris.
Berman, et al., "Navigating The Media Divide; Innovating and enabling new business models", IBM Gobal Business Services, https://www-935.ibm.com/services/us/gbs/bus/pdf/g510-6579-03-mediadivide.pdf. IBM, 2007.
Cloud Air, https://playboxtechnology.com/sites/default/files/cloudair_brochure_0.pdf, Play Box Technology, Feb. 2016.
Ozer, "Video for the Long Haul: Exploring Backhaul Options", http://www.streamingmedia.com/Articles/Editorial/Featured-Articles/Video-for-the- Long-Haul-Exploring-Backhaul-Options-96896.aspx, Streaming Media.Com, May 2014.
How Ott is Changing the Shape of Pay Tv, http://www.v-net.tv/wp-content/uploads/2016/06/Videonet-OTT-PAY-TV-report-final.pdf, Videonet.
Accenture Video Solution, IPTV and Over-the-top TV delivered from a single software product, https://www.accenture.com/iv-en/~/media/Accenture/Conversion-Assets/DotCom/Docuents/Global/PDF/Technology_5/Accenture-Video-Solution.pdf, Accenture.
International Search Report and Written Opinion dated Jan. 18, 2019 for International Application No. PCT/US2018/052295 filed Sep. 21, 2018.

* cited by examiner

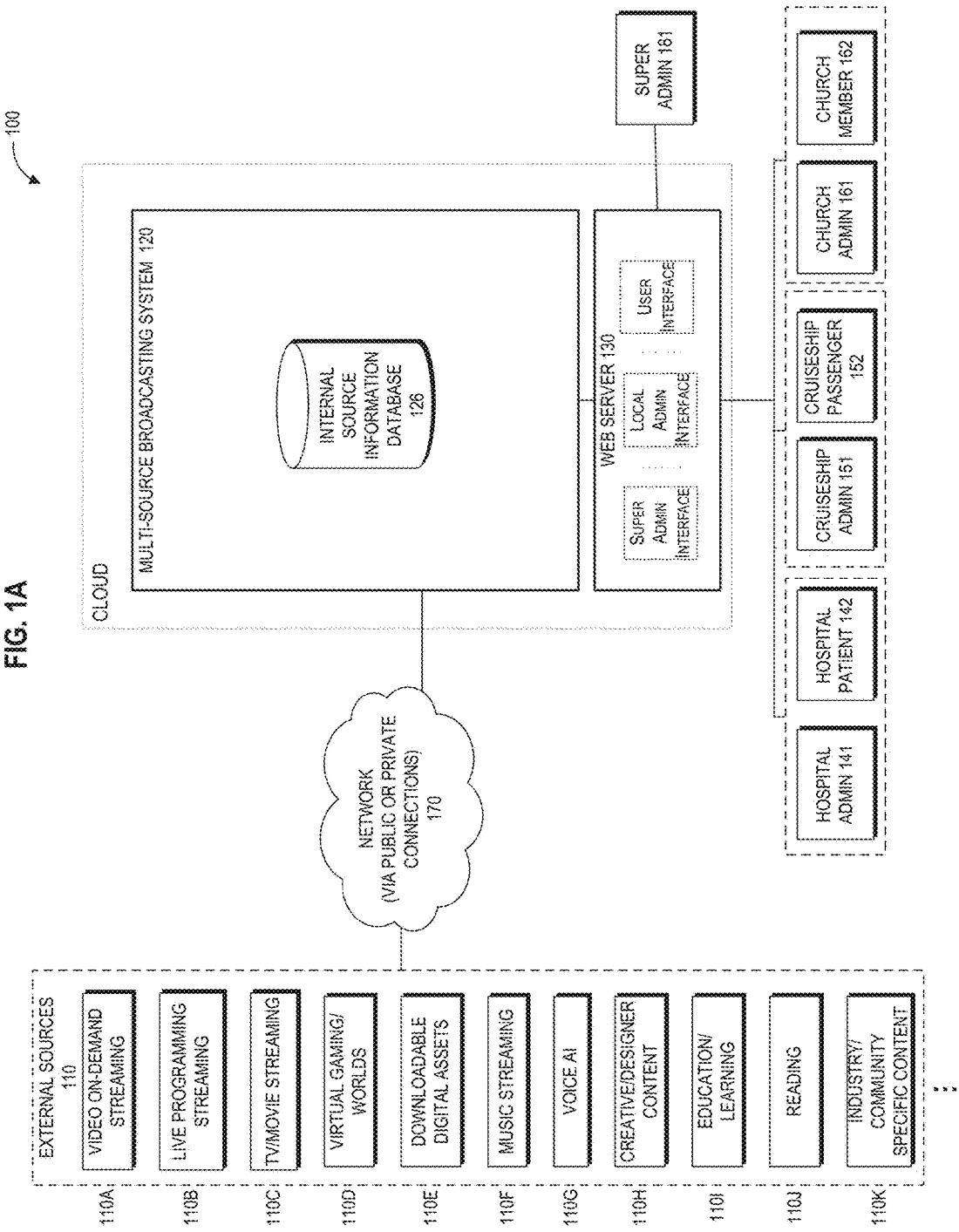

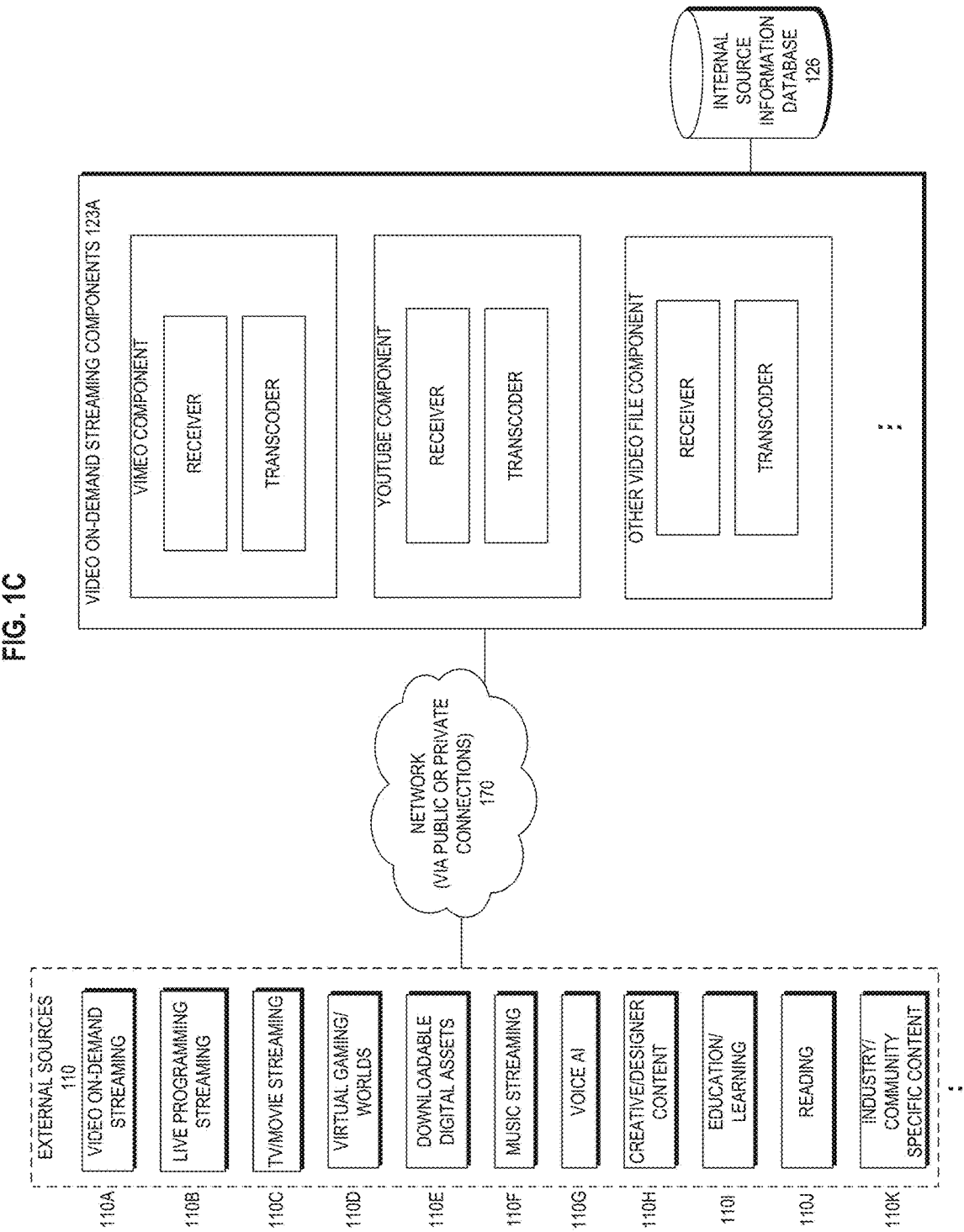

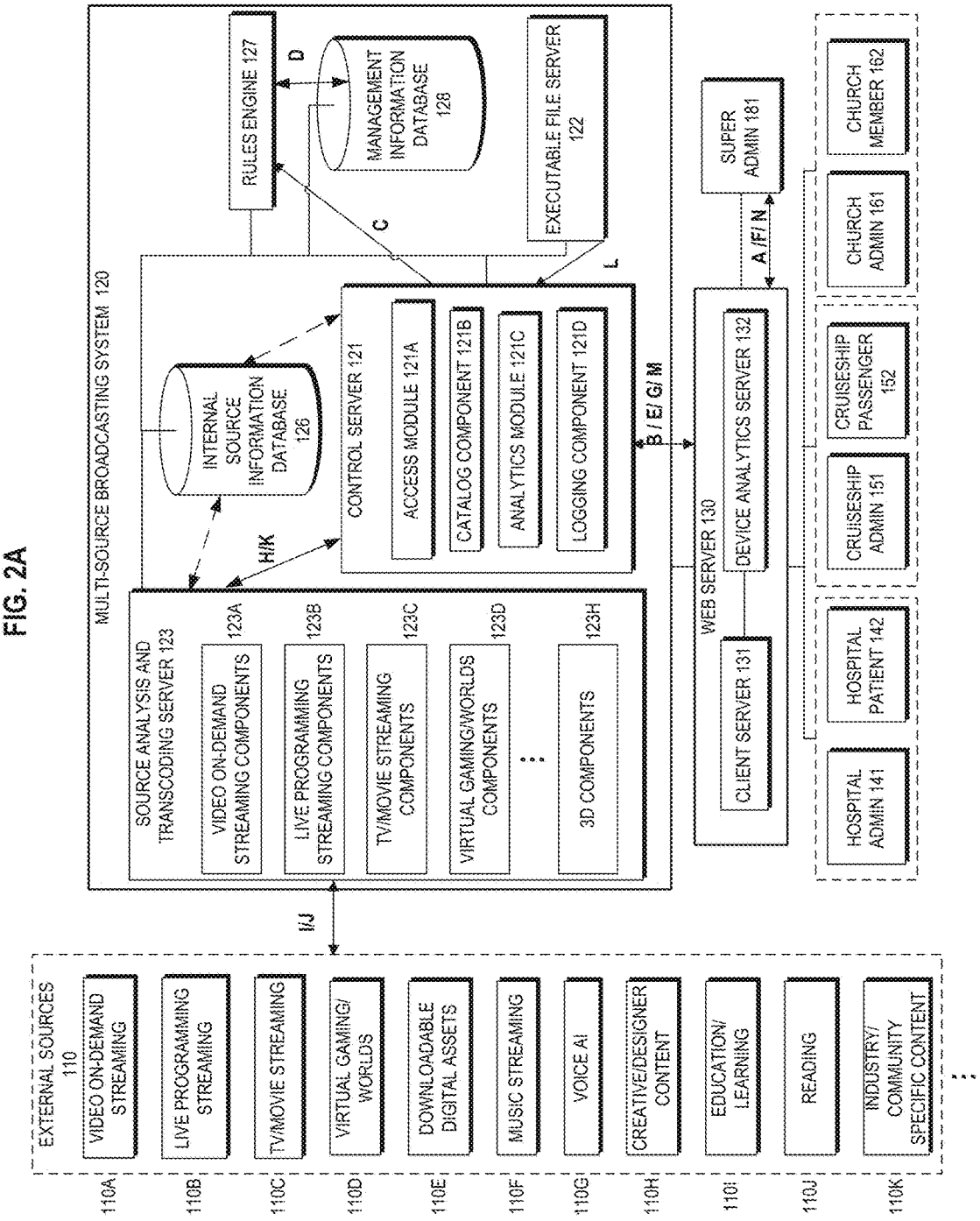

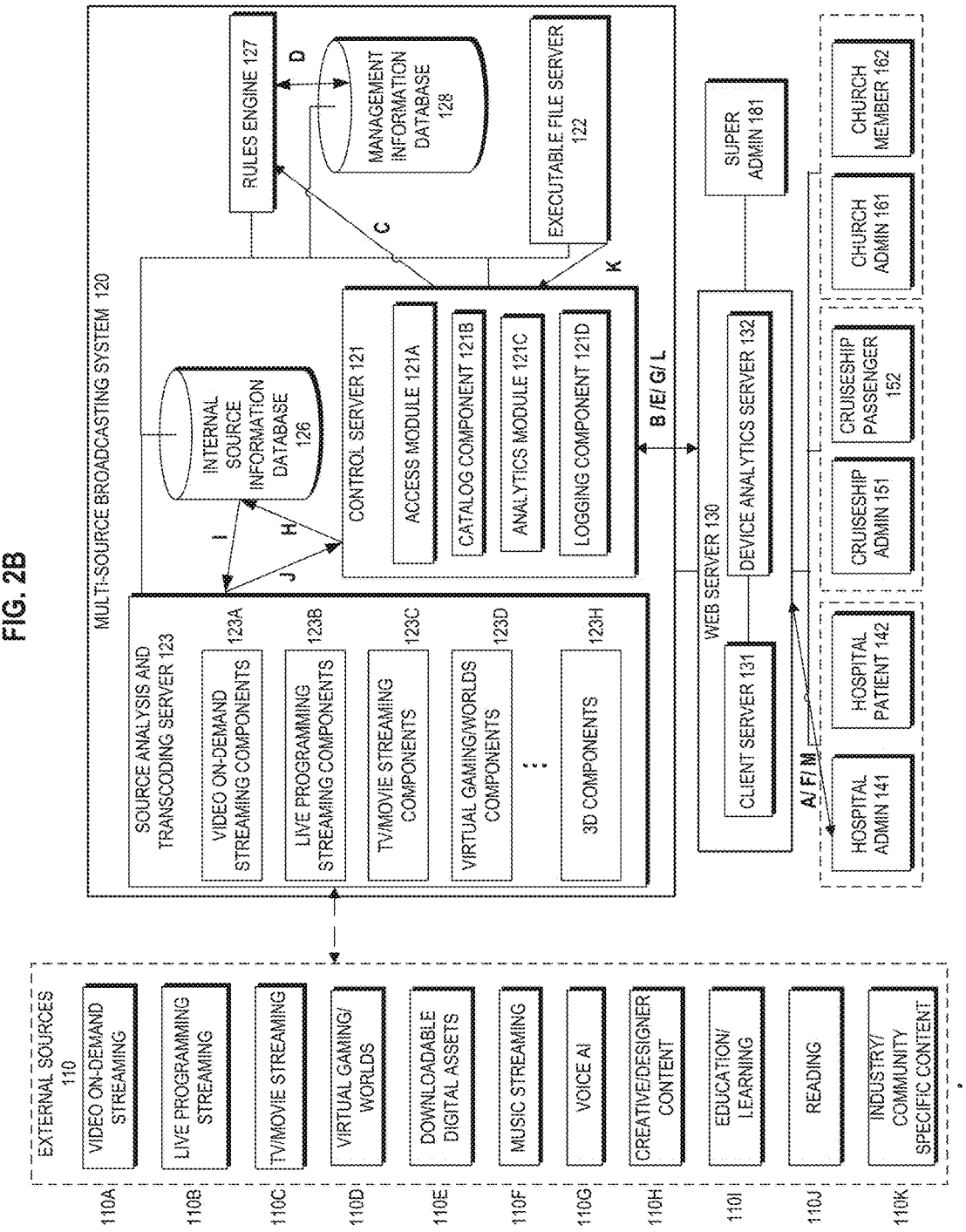

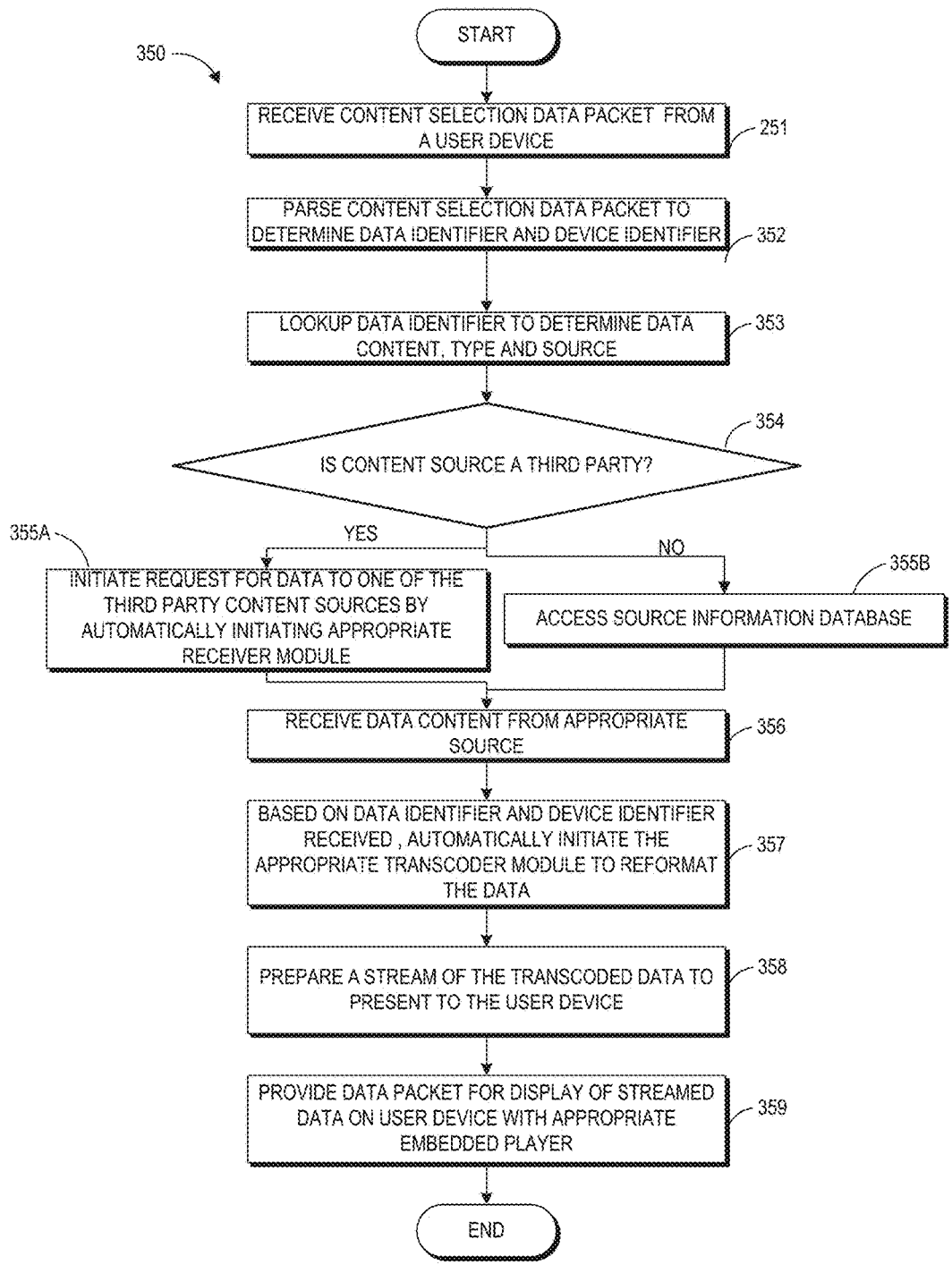

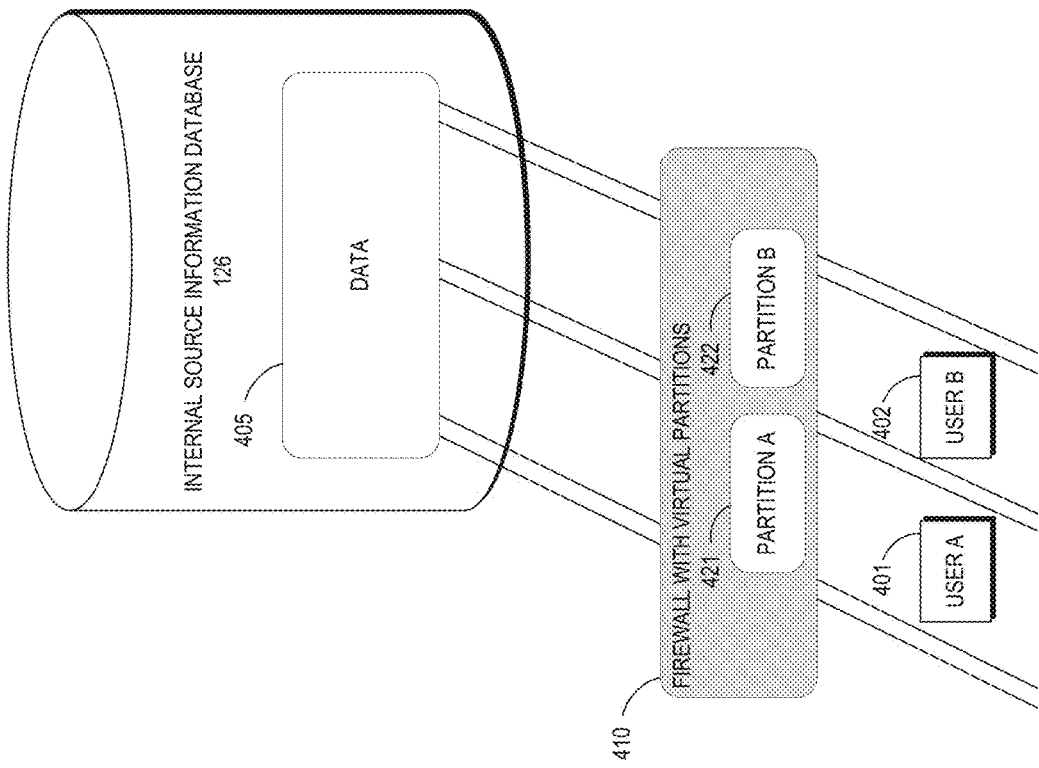

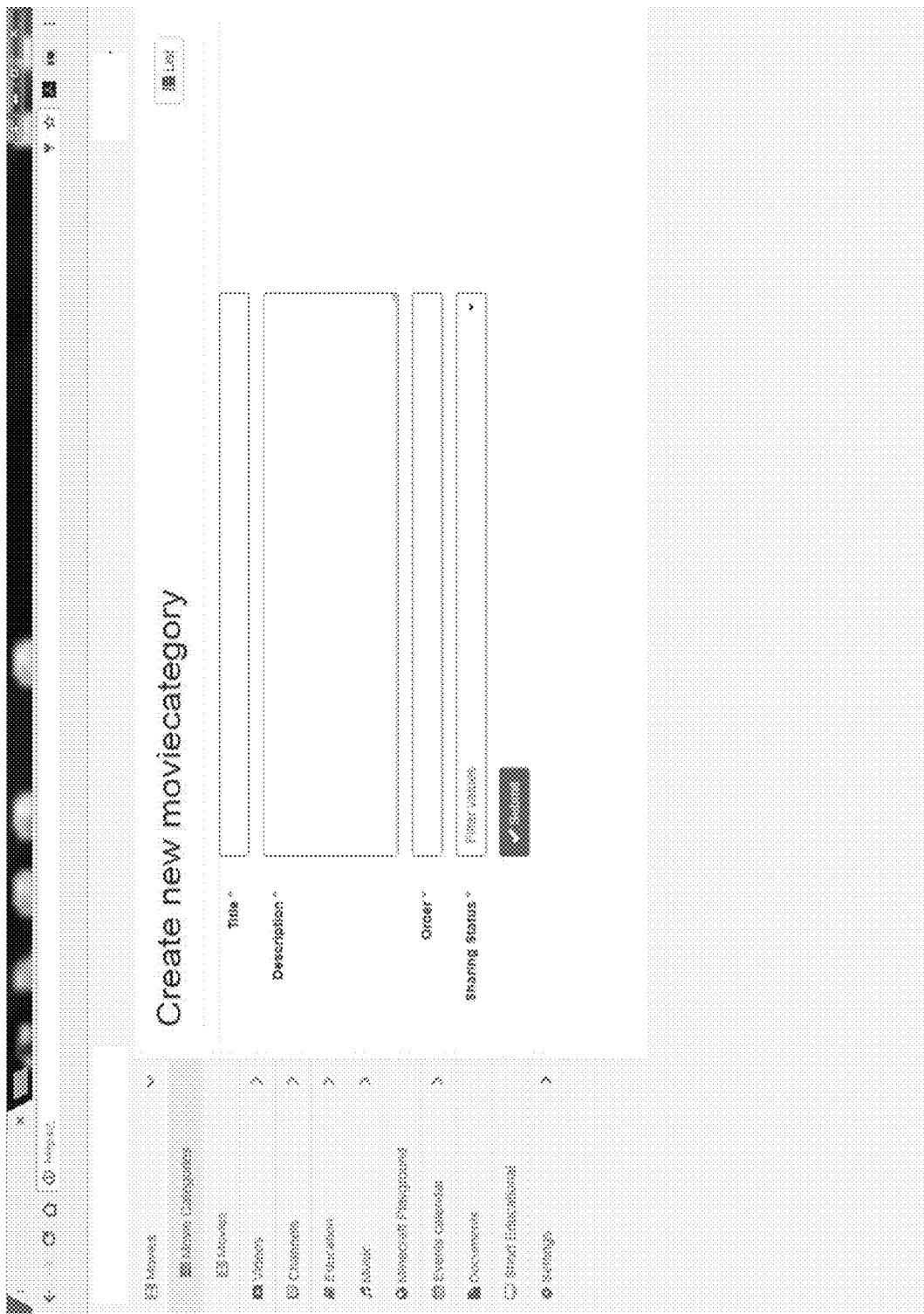

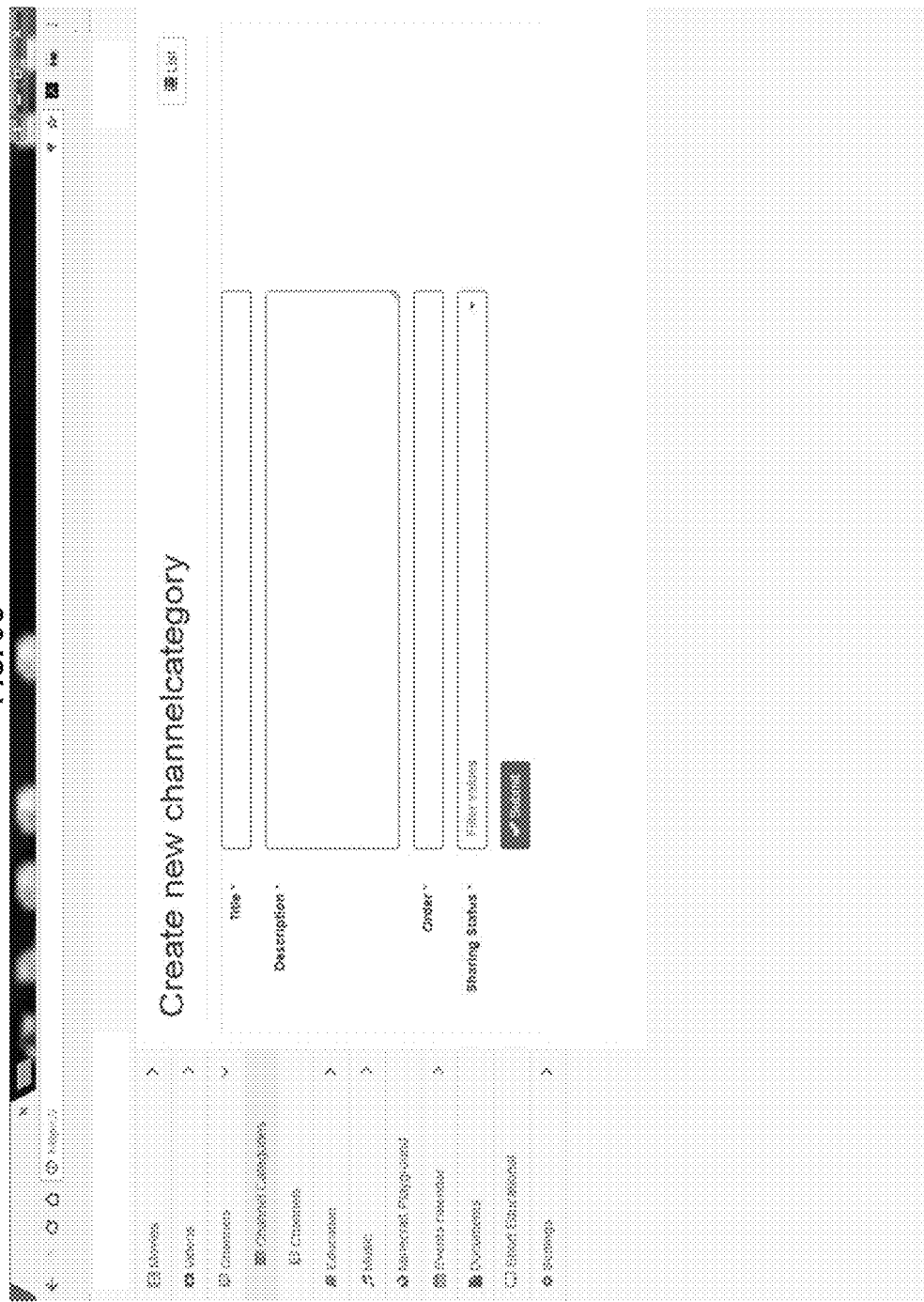

FIG. 13C

MULTI-SOURCE BROADCASTING ARCHITECTURE

This application claims the benefit of priority under 35 U.S.C. § 119(e) of U.S. Provisional Application No. 62/565,720, filed Sep. 29, 2017 and titled MULTI-SOURCE BROADCASTING ARCHITECTURE, the disclosure of which is hereby incorporated by reference in its entirety into this specification as if set forth fully herein for all purposes, for all that it contains.

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

BACKGROUND OF THE DISCLOSURE

The systems and methods relate generally to the field of privately broadcasting customized content from a variety of sources.

SUMMARY OF EXAMPLE EMBODIMENTS

Various systems and methods for providing a multi-source broadcasting platform are disclosed. The embodiments of the systems, methods, and devices of the disclosure each have several innovative aspects, no single one of which is solely responsible for the desirable attributes disclosed herein.

One embodiment of a private broadcast platform architecture is disclosed. The private broadcast platform architecture may comprise: one or more processors configured to execute software instructions and to communicate with a web server communication module, an access module, and a first external communications module; the web server communication module comprising instructions that when executed cause the one or more processors to: receive a first encrypted request data packet associated with a user device; decrypt and parse the first encrypted request data packet to determine a device fingerprint associated with the user device and identify a user device type, determine a first requested resource file identifier associated with a first resource file, and determine a user identifier associated with a first user; generate and send a first resource request message to the access module, the first resource request message comprising a user device type identifier associated with the user device type, the user identifier, and the requested first resource file identifier; the access module comprising instructions that when executed cause the one or more processors to: receive the first resource request message from the web server communication module; extract the user identifier from the first resource request message and determine an association group associated with the user identifier; extract the user device type and the first resource file identifier from the resource request message; access a local rules database to determine one or more rules associated with the first resource file associated with the first resource file identifier and associated with the association group to confirm that a user associated with the user identifier and the association group associated with the user identifier have requisite permission rights to access the first resource file associated with the first resource file identifier and the user device type; if confirmed, generate a first resource transcoding request message comprising a first external resource identifier associated with the first resource file identifier and the user device type, and a first external third party communication port associated with the first resource file identifier; the first external communications module comprising instructions that when executed cause the one or more processors to: receive the first resource transcoding request message, generate a first external resource request for the first resource file of the user device type from the first external third party communication port; receive a first encrypted data packet stream from the first external third party communication port; select a first transcoder specific to a first external third party format; initiate decrypting and transcoding of the first encrypted resource data packet stream by the first transcoder to generate a first broadcast platform resource data packet stream; and transmit the first broadcast platform resource data packet stream to the web server communications module for transmission to the user device; and select a first player execution identifier associated with the first broadcast platform resource data packet stream and a stored first executable player interface to be used to decode and display the first broadcast platform resource data packet stream in a web page for display to the first user.

One embodiment of a computer-implemented method for private broadcasting is disclosed. A computer-implemented method for private broadcasting may comprise: as implemented by one or more computing devices configured to execute software instructions: receiving a first encrypted request data packet associated with a user device; decrypting and parsing the first encrypted request data packet to determine a device fingerprint associated with the user device and identify a user device type, determine a first requested resource file identifier associated with a first resource file, and determine a user identifier associated with a first user; generating a first resource request message comprising a user device type identifier associated with the user device type, the user identifier, and the requested first resource file identifier; extracting the user identifier from the first resource request message and determining an association group associated with the user identifier; extracting the user device type and the first resource file identifier from the resource request message; accessing a local rules database to determine one or more rules associated with the first resource file associated with the first resource file identifier and associated with the association group to confirm that a user associated with the user identifier and the association group associated with the user identifier have requisite permission rights to access the first resource file associated with the first resource file identifier and the user device type; if confirmed, generating a first resource transcoding request message comprising a first external resource identifier associated with the first resource file identifier and the user device type, and a first external third party communication port associated with the first resource file identifier; generating a first external resource request for the first resource file of the user device type from the first external third party communication port; receiving a first encrypted data packet stream from the first external third party communication port; selecting a first transcoder specific to a first external third party format; initiating decrypting and transcoding of the first encrypted resource data packet stream by the first transcoder to generate a first broadcast platform resource data packet stream; transmitting the first broadcast platform resource data packet for transmission to the user device; and selecting a first player execution identifier associated with the first broadcast platform resource data packet stream and a stored first executable player interface to be used to decode and display the first broadcast platform resource data packet stream in a web page for display to the first user.

One embodiment of non-transitory, computer-readable storage media storing computer-executable instructions that, when executed by a computer system, configure a computer system to perform operations is disclosed. The non-transitory, computer-readable storage media storing computer-executable instructions that, when executed by a computer system, configure the computer system to perform operations of at least: receiving a first encrypted request data packet associated with a user device; decrypting and parsing the first encrypted request data packet to determine a device fingerprint associated with the user device and identify a user device type, determine a first requested resource file identifier associated with a first resource file, and determine a user identifier associated with a first user; generating a first resource request message comprising a user device type identifier associated with the user device type, the user identifier, and the requested first resource file identifier; extracting the user identifier from the first resource request message and determining an association group associated with the user identifier; extracting the user device type and the first resource file identifier from the resource request message; accessing a local rules database to determine one or more rules associated with the first resource file associated with the first resource file identifier and associated with the association group to confirm that a user associated with the user identifier and the association group associated with the user identifier have requisite permission rights to access the first resource file associated with the first resource file identifier and the user device type; if confirmed, generating a first resource transcoding request message comprising a first external resource identifier associated with the first resource file identifier and the user device type, and a first external third party communication port associated with the first resource file identifier; generating a first external resource request for the first resource file of the user device type from the first external third party communication port; receiving a first encrypted data packet stream from the first external third party communication port; selecting a first transcoder specific to a first external third party format; initiating decrypting and transcoding of the first encrypted resource data packet stream by the first transcoder to generate a first broadcast platform resource data packet stream; transmitting the first broadcast platform resource data packet for transmission to the user device; and selecting a first player execution identifier associated with the first broadcast platform resource data packet stream and a stored first executable player interface to be used to decode and display the first broadcast platform resource data packet stream in a web page for display to the first user.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings. The accompanying drawings, which are incorporated in, and constitute a part of, this specification, illustrate embodiments of the disclosure.

Throughout the drawings, reference numbers are re-used to indicate correspondence between referenced elements. The drawings are provided to illustrate embodiments of the subject matter described herein and not to limit the scope thereof.

FIG. 1A is a block diagram of a computing environment that includes a multi-source broadcasting system, according to one embodiment.

FIG. 1C is a block diagram showing the embodiment of the video-on-demand streaming components of FIG. 1B in more detail, according to one embodiment.

FIG. 2A is a block diagram showing the embodiment of FIG. 1A and an exemplary data flow among the external sources, the cloud-based multi-source broadcasting system, the web server and a super admin user, according to one embodiment.

FIG. 2B is a block diagram showing the embodiment of FIG. 1A and an exemplary data flow among the external sources, the cloud-based multi-source broadcasting system, the web server and a local admin user, according to one embodiment.

FIG. 3B is a block diagram which illustrates a logical flow diagram for one embodiment of an example process for responding to a request for content from a user.

FIG. 4 depicts one embodiment of a partitioning solution that allows a plurality of users to access the internal source information database.

FIGS. 7A-7F are screen shots depicting embodiments of example local admin user interfaces associated with the TV & Movies category.

FIGS. 9A-9D are screen shots depicting embodiments of example local admin user interfaces associated with the Channels category.

FIGS. 13A-13D are screen shots depicting embodiments of example local admin user interfaces associated with the Events/Calendar.

DETAILED DESCRIPTION OF VARIOUS EMBODIMENTS

Figure 1B:
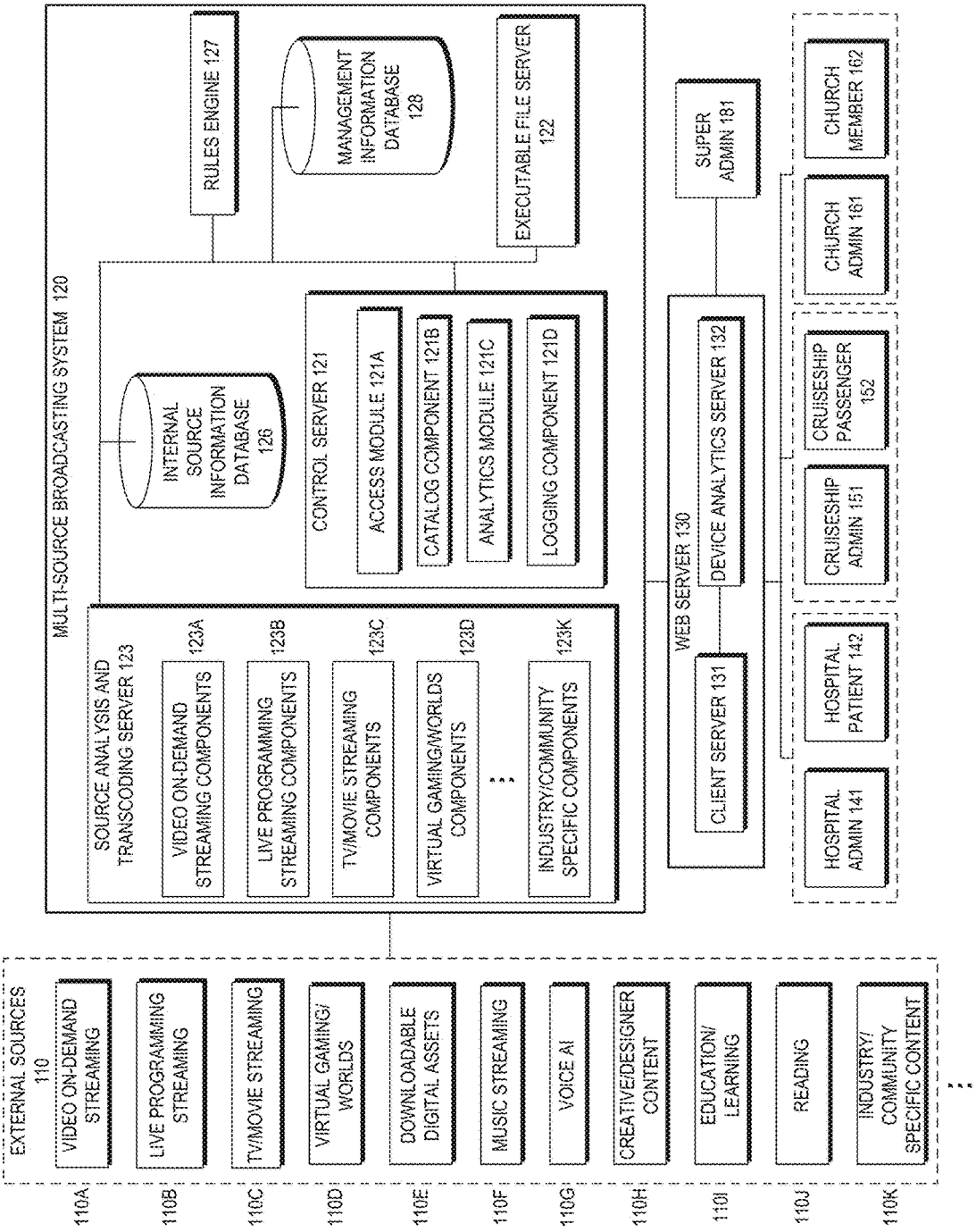
FIG. 1B is a block diagram showing the embodiment of the multi-source broadcasting system of FIG. 1A in more detail, according to one embodiment.

Embodiments of the disclosure will now be described with reference to the accompanying figures. The terminology used in the description presented herein is not intended to be interpreted in any limited or restrictive manner, simply because it is being utilized in conjunction with a detailed description of embodiments of the disclosure. Furthermore, embodiments of the disclosure may include several novel features and/or advantages, no single one of which is solely responsible for its desirable attributes or which is essential to practicing the embodiments of the disclosure herein described. For purposes of this disclosure, certain aspects, advantages, and novel features of various embodiments are described herein.

I. Overview

As global content is created at an evenly growing speed, it has become more and more difficult for community or enterprise groups to effectively find and share content with their members. Further, as content distribution moves towards a streaming model, users desire the option of using multiple devices for content consumption. Some traditional systems depend on cumbersome technology stacks, are associated with complex business arrangements, and offer a limited range of content that may be dissonant from the interests of the users served.

Embodiments of the systems and methods disclosed herein provide a multi-source private broadcasting system to support and distribute a wide range of resources including streaming media, live programming, and popular entertainment offerings from a cloud-based system, curated for specific communities. In some embodiments, the system is based on cloud-based technology, allowing users access to the system over wired or wireless networks from any web-enabled device. The platform may also provide administrative users with a dashboard of robust controls to customize a solution for their respective community's or enterprise's need for resources and to filter out unwanted resources. Embodiments of the system leverage innovations across a wide range of technologies, including, for example, artificial intelligence (AI) voice control, virtual reality (VR), augmented reality (AR), private virtual playgrounds, multi-platform programming, downloadable asset marketplaces, and digital badges to allow administrative users to customize the resources available to their enterprise/community and to enable the member users access to the selected resources.

In one embodiment, for a pediatric hospital enterprise, the multi-source broadcast platform may be used to include, for example, selected live-stream programming featuring popular celebrities, garners, creators and luminaries; intelligently designed educational materials and clinical-based content associated with the pediatric hospital; a comprehensive library of gaming options designated for pre-selected age groups including custom virtual environments and exclusive game servers, such as for example, Minecraft servers; video-on-demand with popular television, movies and documentaries; music content and downloadable software.

In other embodiments, the platform may be customized to provide content to other communities, such as, for example, extended health care facilities, faith groups, universities, hotels, cruise lines, sports organizations, and the like.

II. Overview of a Computing Environment

In some embodiments, a multi-source broadcasting platform or system ("MSBP") is included within a computing environment that allows human operators to interface with the MSBP via a user device or system. The MSBP may include a variety of communication interface modules which enable the MSBP to communicate with various sources of resources including different types of content, different resource providers, and different device-specific resources. Various types of administrators may customize and filter such content to be made available to different users and/or devices, according to different characteristics associated with such users and devices. The MSBP can then provide access to such customized and filtered content to respective authorized users and devices. The authorized users may interface with the MSBP to retrieve or upload the customized and filtered content.

FIG. 1A is a block diagram depicting one embodiment of an architecture 100 for providing an MSBP. The architecture 100 shown in FIGS. 1A-1C and FIGS. 2A-2C includes a MSBP 120 including an internal source information database 126. As indicated in FIG. 1A, the MSBP 120 may be a cloud-based system whose processing resources are shared by multiple entities and users. The MSBP is in communication with example devices 141, 142, 151, 152, 161, 162 and 181 accessed by administrators and users of the MSBP 120, and a web server 130 providing an interface to each of the various administrators and users to access the MSBP. In one embodiment, the web server 130 may be configured to present a graphical interface or dashboard of the MSBP's resource options available to different administrators and users, along with user interface features, such as, for example features that allow an administrator to submit resources or links to resources to the system and make customizations to associate rules with the resource, and for a user to view such resource, and so forth. The MSBP is also in communication with various types of resources available through external sources 110 via a network 170. The network 170 may provide a public or a private connection to one or more of the external sources 110, as described in further detail below.

While the embodiment of FIG. 1A shows the web server 130 as a separate system from the MSBP 120, it is recognized that in some embodiments, the web server 130 may be part of the MSBP 120 and could be implemented as a non-web portal, such as, for example, a server side system receiving requests from a user application other than a web browser.

In some embodiments, the administrator and user may each be a solitary person, a group of people, a company, or combination thereof. It is recognized that the MSBP may be utilized by a variety of types of administrators, which may include, for example, super administrators, which may be associated with the highest level of privileges to control access to users and content associated with the MSBP, as well as local administrators associated with different enterprises or groups of users, such as, for example, hospital administrators, cruise ship administrators, church administrators, educational administrators and so forth. Moreover, it is recognized that the MSBP may be utilized by a variety of types of users, which may include, for example, hospital patients, cruise ship passengers, church members, students, and so forth.

External Sources

As shown in FIG. 1A, the external sources 110 include sources for various types of content or other resources, such as for example, video on-demand streaming 110A, live programming streaming 110B, TV/Movie streaming 110C, virtual gaming/worlds 110D, downloadable digital assets 110E, music streaming 110F, voice/artificial intelligence (AI) 110G, creative/designer content 110H, education/learning content 110I, reading content 110J, industry/community specific content 110K, and so forth. In addition to the external sources, super administrators and entities may also upload other resources to the MSBP, and such resources may be stored in the internal source information database 126. The MSBP may be used to access a wide variety of resources from a wide variety of third parties, and can be updated to support new resource types and/or new third party providers. Example user interfaces depicting the administrators' dashboards to manage the external and internal sources, resources and categories are shown and described in relation to FIGS. 5 through 15 below.

In some embodiments, the video on-demand streaming 110A may include content from, for example, Vimeo, YouTube, or other video files. For example, the other video files may include content created by the different entities for their entity. In one embodiment, a hospital may create videos with kid-friendly content including clinical/medical content, 24-hour live-stream videos, educational videos, popular YouTubers and celebrity influencers, gaming, creative and music focused, animal and nature. In some embodiments, entities may be provided access to the full library of video content uploaded onto MSBP 120 by super administrators, content partners of MSBP 120, as well as other entities. This sharing of information is enabled through the use of virtual partitioning of the internal source information database 126, described further below in reference to FIG. 4. Users can sort approved videos by video categories. While watching videos, users can rate the video content, they can add comments via a "Chat" feature.

In some embodiments, the live programming streaming 110B may include content from, for example, Twitch, Facebook Live, YouTube, Mixer, and so forth. In one embodiment, patients of a hospital may view live-stream broadcast content from popular online celebrities and YouTube stars, professional gamers, artists, musicians, other creative content, educational and training videos, and so forth. Users can view approved live stream channels by category/type of content. While watching approved live streams, users can interactively chat with the streamers of content, as well as with other users.

In some embodiments, the TV/Movie streaming 110C may include content from, for example, YouTube, Vimeo, DirecTV. Administrators and content partners may also upload video files and online video content to internal source information database 126. The appropriate components of the source analysis and transcoding server are used to generate the appropriate code to enable streaming of the TV/Movies in a video player displayed on the users' devices.

In some embodiments, the virtual gaming/worlds 110D may include resources from, for example, Mineplex Minecraft Server, Apple AR, HoloLens, and so forth. In some embodiments, end users may be provided with redemption codes to install paid games for free on their devices. In some embodiments, the game files may include a downloadable executable game file. In other embodiments, the game may be an HTML5 browser type of game. In some embodiments, a custom Minecraft server may be created for an entity, which is private and only available to that entity's users. In some embodiments, users may use their pre-established usernames to access Minecraft. In some embodiments, celebrities may join the private server to play with an entity's users.

In some embodiments, the downloadable digital assets 110E may include content from, for example, Amazon Fire Store, Unity, Amazon App Store, iTunes App Store Google Play Market, Steam®, and so forth.

In some embodiments, the music streaming 110F may include content from, for example, Custom HTML5 Music Player, YouTube, Spotify, Pandora, other audio files, and so forth. Using the appropriate transcoding components of the source analysis and transcoding server, the music may be retrieved and the appropriate code is generated to play stream audio files in custom music players on the users' devices. End users can create their own playlists and sort music by genre and popularity. Entities may also upload their own music files to the internal source information database 126 using, for example, *.mp3 or *.wav files. Such music files may be created by the local administrators or even the end users. Administrators may also create custom music-based categories. In some embodiments, users may listen to music while browsing other pages on their dashboard.

In some embodiments, the voice/AI 110G may include resources from, for example, Amazon Alexa, and so forth. In some embodiments, the creative/designer content 110H may include content from, for example, 3D sculpting tools, music creation software, animation tools, and so forth. In some embodiments, the education learning content 110I may include content from, for example, curriculums, language tools, learn how to program/tech skills, and so forth. In some embodiments, the reading content 110J may include content from, for example, ebooks, digital comics and magazines, and so forth. In some embodiments, the industry/community specific content 110K may include from, for example, clinical content (for healthcare, for example), corporate documents and resources (for enterprises, for example).

The sources of content described above are merely examples. Other sources of content may easily be added to communicate with the MSBP 120 in other embodiments, due to the modular nature of the MSBP 120. For each category of source added, and for each sub-type of category, the appropriate analysis and transcoding server components would be added to the MSBP 120 to receive the new type and category of content, and to generate the appropriate code to enable display of the new type and category of content on the users' dashboards.

III. System Components

FIG. 1B is a block diagram showing the embodiment of the multi-source broadcasting system of FIG. 1A in more detail, according to one embodiment. As indicated in FIG. 1A, the architecture 100 includes a MSBP 120 in communication with devices 141, 142, 151, 152, 161, 162 and 181, and a web server 130. The MSBP 120 is also in communication with external sources 110 via a network 170. Each of these components is described in further detail below.

While FIG. 1B shows one MSBP 120, it is recognized that multiple MSBP 120 could be used. For example, a hospital organization may have its own MSBP 120 to allow access by all of its hospitals, hospital administration and patients. In another embodiment, a single MSBP 120 could be not associated with a particular organization, but instead, provide access to resources on behalf of a variety of unaffiliated organizations such as, a public school, a cruise ship and a family household.

A. MSBP

The cloud-based MSBP 120 embodiment of FIG. 1B includes the internal source information database 126, a source analysis and transcoding server 123, a control server 121, a management information database 128, a rules engine 127, and an executable file server 122.

1. Internal Source Information Database

The internal source information database 126 embodiment of FIG. 1B may be used to store content and other resources. A more detailed diagram of an embodiment of the internal source information database 126 is shown in FIG. 4B, and described further below. In addition to providing access to externally available resources, the MSBP 120 allows entities and users to create and store their own resources. For example, entities may wish to add branding to the dashboard provided to their patients. Such branding information may be saved on the internal source information database 126. Additionally, a hospital may also wish to create its own content, such as for example describing their institution, their staff, their news, and so forth. Such content is also stored on the internal source information database 126. The hospital may set parameters of the virtual partition to allow other communities or groups to have the option of utilizing the content or the hospital may only allow the content to be utilized by members associated with the hospital.

2. Control Server

The control server 121 embodiment of FIG. 1B includes an embodiment of an access module 121A, a catalog component 121B, an analytics module 121C, and a logging component 121D.

i. Access Module and Catalog Component

The access module 121A controls access associated with different administrators and users. The MSBP 120 may be accessed by super administrators, local administrators, and authorized users. The access module 121A also ensures that unauthorized users do not access the MSBP 120 unless and until they subscribe as authorized users.

The catalog component 121B creates and manages a catalog of content available to different administrators and users.

Super administrators are operators associated with the MSBP 120 who are authorized with managing access and content for all entities and end users communicating with the MSBP 120. Super administrators set up access rules for different levels of users via the access module 121A. Super administrators are associated with access and control to all content available to local administrators and users. Super administrators set up access for local administrators of different entities using the access module 121A. In addition, super administrators can use the access module 121A to define rules associated with content to be made available to different types of devices used to connect to the MSBP 120. For example, content characteristics may need to be adjusted to be properly displayed on various types of devices. Content may be optimized depending on the type of device used to connect—for example, content may be adjusted according to a desktop computer, a laptop computer, a mobile device, or a tablet. Such optimization information is entered by super administrators using the access module 121A.

As described further below in reference to FIGS. 5A through 15B, the categories available for display to users of the MSBP 120 may include: video/TV/movies and other streaming content, live streams, games, educational videos, games, Minecraft server, music, broadcast events, documents, frequently asked questions (FAQ), or calendars. The catalog component 121B may include features for managing, including adding, editing and deleting, resources via the catalog component 121B. For example, for Minecraft users, the features may allow a super administrator to manage users' access to a private server or to upload and make available to users redemption codes for end users to install paid games for free. The information entered by super administrators may also include descriptions of the content. The features may also allow super administrators to manage resource age ratings, and to create custom categories to sort the resources into appropriate groups. They can also provide content ratings for users or local administrators to rate content on a scale, such as for example on a 1-5 scale. The features enable super administrators to manage scheduling of offline and live streamed broadcast events, educational videos, FAQ, terms and conditions, and feedbacks. In some cases, advertisements may be added to video content, which end users see before watching selected videos. In addition to the above, the features may enable super administrators to preview content uploaded from local administrators of entities or from content providers or receive notifications, for example by email, when new content is added by local administrators.

Local administrators are operators associated with respective entities communicating with the MSBP 120. For example, each hospital, church, cruise ship or educational institution may have a local administrator. Such local administrators manage the content for only their own entity, including adding, editing and deleting such content, again, using the catalog component 121B. They also control making individual content files visible or invisible to respective entity users via the access module 121A. They also manage content age rating for their entity. Local administrators can manage scheduling offline and live broadcast events for their entity, and educational videos for their entity.

Based on the rules established by the super and local administrators using the access module 121A, authorized users of entities may then browse content catalogs for the entity for which they have been established as an authorized user. The authorized users can then select videos/movies/live broadcasts to watch, games to download and/or play, music to listen to, chat to other authorized users, get access to internal Minecraft servers, browse calendars for offline and live broadcast events scheduled. Examples of authorized users, also referred to as users or end users herein, include, for example, patients of a hospital, passengers on a cruise ship, members of a church, students and staff at educational institutions, and so forth.

Any user attempting to access the MSBP 120 who has not been established as an authorized user by a super or a local administrator will be denied access and is referred to as an unauthorized user herein. Such unauthorized users need to request authorization from administrators through, for example, a subscription request.

ii. Analytics Module and Logging Component

The logging component 121D embodiment of FIG. 1B tracks usage and traffic, such as for example, number of page views, time spent on various pages or sites in the dashboard, type of devices used for access, types of web browsers used for access by the different administrators and users of the MSBP 120. The logging component 121D may also track attempted access to the MSBP 120 by unauthorized users. For example, IP addresses associated with such users, or other device information may be logged for such attempts. The logging component 121D may gather this information from one or more of the client server 131 and the device analytics server 132 described in further detail below. The logging component 121D may also track end users' content ratings, as well as track, for example, active views on live-broadcasts, views of videos, active views on live-stream channels.

The analytics module 121C may be used to create custom reports for the super administrator and/or each entity's administrator based on the usage and traffic logged by the logging component 121D. In some embodiments, the analytics module 121C may interface with external systems, such as for example, Google Analytics servers to collect and exchange analytics data.

3. Management Information Database

The management information database 128 embodiment of FIG. 1B is in communication with the access module 121A and the catalog components 121B of the control server 121 to establish and store rules to be used by the rules engine 127 to determine and provide the appropriate access, content and functionality to different users and devices connecting to the MSBP 120.

4. Rules Engine

The rules engine 127 embodiment of FIG. 1B uses the rules stored in the management information database 128 to grant or deny access to users wanting to access the MSBP 120. The rules engine 127 also uses the rules to determine which features and functionality of content to make available to different types of users and devices based on their affiliated organization. For example, the rules engine may permit a user to access content A when the user accesses the MSBP 120 using login related to a first organization, but may prevent the same user from accessing content A when the user is accessing the MSBP 120 using a login related to a different organization. In other embodiments, the rules engine 127 may correlate or link login accounts that relate to the same user and/or may issue only a single login to a user regardless of the user's organizations and instead tie the single login to multiple organizations.

5. Executable File Server

The executable file server 122 embodiment of FIG. 1B enables users to view resources available from one or more of the internal or external sources of content on their devices. For example, in one embodiment, the executable file server 122 in communication with components of the source analysis and transcoding server 123, executes the code generated by the appropriate transcoder to embed content in a video player executable code module made available to the user on their device, for example, embedded within a web page. Also in communication with the device analytics server 132, the video content is optimized according to the type of device the user uses to connect to the MSBP 120. In another embodiment, the executable file server 122 may execute code to embed content for a music player, and so forth.

B. Super Admin/Admin/User Devices

The MSBP 120 is in communication with user devices 141, 142, 151, 152, 161, 162 and 181 accessed by administrators and users of the MSBP 120. In the example embodiment shown in FIG. 1B, the administrators and users are associated with a hospital, a cruise ship and a church. Each of the hospital admin, the hospital patient, the cruises ship admin, the cruise ship passenger, the church admin and the church member interfaces with the MSBP 120 using the respective user devices 141, 142, 151, 152, 161, 162, via the web server 130. The super admin also accesses the MSBP 120 via the web server 130 using user device 181.

In various embodiments, the user devices may include, for example, a desktop computer, a laptop computer, a smart phone, a tablet, a smart watch, a car console, or any other computing device. Although FIG. 1B includes one user device by user, it is recognized as a plurality of user devices (of the same or different types) may be used to interface with the MSBP 120. For example, there may be more than one local hospital administrator and more than one hospital patient who each use their own device to interface with the MSBP 120. In addition, there may be other entities, including for example educational institutions, although not shown, who may also access the MSBP 120 in similar fashion as described herein.

C. Web Server

The MSBP 120 functions on any type of web-enabled device, such as, for example, phones, tablets, laptop computers, desktop computers, and so forth. These devices can access the MSBP 120 via the web server 130, which includes a client server 131 and a device analytics server 132.

In some embodiments, the web server 130 is provided as a browser-based interface that is accessed by the user devices 141, 142, 151, 152, 161, 162 and 181 via a standard Internet browser. The executable file server 122 provides the necessary instructions for displaying the proper interfaces within the Internet browser of the user devices. In other embodiments, the web server 130 may be provided as a downloadable application that can be run in part or in full on the user devices.

The client server 131 provides administrators and users with a dashboard. The administrative dashboard, also referred to herein as resource management site ("RMS"), allows super administrators and local administrators to customize a resource solution for the users associated with their entity. The user dashboard (also referred to herein as client website) allows the users to access such customized resources on their devices. In some embodiments, the MSBP 120 leverages cloud-based technology, such that no additional hardware is required for users to access it on their devices via, for example, a wireless network. The client server 131 may provide, in addition to content, reports, user interface tools, and so forth.

The device analytics server 132 communicates with user devices 141, 142, 151, 152, 161, 162 and 181 to determine the characteristics of the device requesting access and/or content from the MSBP 120. The device characteristics determined may include one or more of the device's IP information, the device type (for example, desktop computer, laptop computer, tablet, mobile device), the device screen size, and the like.

D. Source Analysis and Transcoding Server

The source analysis and transcoding server 123 embodiment of FIG. 1B includes components to receive, analyze, and/or transcode content from external. In some embodiments, the source analysis and transcoding server 123 includes video on-demand streaming components 123A, live programming streaming components 123B, TV/Movie streaming components 123C, virtual gaming/worlds components 123D, downloadable digital assets components 123E (not shown), music streaming components 123F (not shown), voice/artificial intelligence (AI) components 123G (not shown), creative/designer content components 123H (not shown), education/learning content components 123I (not shown), reading content components 123J (not shown), industry/community specific content components 123K, and so forth. The analysis and transcoding server 123 is also in communication with the internal source information database 126, and includes components in order to analyze and transcode content from the internal source information database 126 as well.

For each category of source, and for each type of source within each category, the MSBP 120 accesses and initiates transcoding components in the source analysis and transcoding server 123 to obtain data packets and streams from the respective external source or internal source information database 126, retrieve information about the respective resource, generate or execute the appropriate code to be executed by the executable file server 122 to make the resource available to be displayed to, or otherwise accessed by, authorized users via the web server 130.

One example of such receiving and transcoding components is described below in reference to FIG. 10.

FIG. 10 is a block diagram showing an embodiment of the video-on-demand streaming components 123A of the source analysis and transcoding server 123 of FIG. 1B in more detail, according to one embodiment. FIG. 10 is one example showing that for each category of external source 110, there is an equivalent structure of components 123. In the example shown, for video on-streaming 110A, there is a video on-demand streaming components 123A including a separate component for each type of video on-streaming which is customized to communicate with the specific third party communication port and transcode data provided in the third party's specific format. In some embodiments, the same transcoder may be used by one or more components that refer to the same data type, for example an MP3 music file stored on Facebook, an MP3 music file stored on a third party website or an MP3 music file stored locally by a hospital. For example, there is a Vimeo component, a YouTube component, other file component, and so forth. As described above, due to the modular nature of the MSBP 120, other types of video on-streaming can easily be supported by adding the necessary component for the additional type. Similarly, other sources of content can be added.

Using the video on-demand streaming components 123A as the example, each type of video component comprises a respective receiver and a transcoder. The respective receiver communicates with one of the video on-demand streaming source 110A or the internal source information database 126 to retrieve information about the video being accessed, and then the transcoder uses the information retrieved by the receiver to generate the appropriate code in order for the video to be properly displayed on an embedded video player executed by the executable file server 122.

IV. Exemplary High-Level Data Flows

1. Super Administrator

FIG. 2A is a block diagram showing the embodiment of FIG. 1A and an exemplary data flow among the external sources, the cloud-based multi-source broadcasting system, the web server and a super administrator ("admin"), according to one embodiment.

In some embodiments, a super admin 181 requests access to the MSBP 120 by entering login information including a username and password via the client server 131 of the web server 30 (A). The device analytics server 132 collects device information associated with the super admin user device 181, and the login and device information are sent to the control server 121 (B). The login and device information are then sent to the rules engine 127 to determine the appropriate level of access to provide to the user, as well as the subset of resources to make available (C). Then, the rules engine 127, in communication with the management information database 128, determines the level of access and resources to make available to the super admin 181 (D). For example, using information in the management information database 128, the rules engine 127 determines that the login information provided is associated with a user with super admin privileges.

Then, the super admin 181 is presented with the super admin resource management site on the dashboard (E). Then, depending on what action the super admin would like to perform, the data flow sequence may be slightly different. In the example shown in FIG. 2A, the super admin 181 would like to preview resources from an external source 110 in order to associate the appropriate features and functionality to the resources (F). This request is communicated to the control server (G). Then, the control server 121 communicates with one of the source analysis and transcoding server components 123A-123H (H) to interface with the appropriate source 110 (I). In other embodiments, the resource to be accessed may be stored on the local internal source information database 126 (shown in dotted line). Then, the appropriate resource from the respective external source 110 (or the internal source information database 126) is received by the source analysis and transcoding server 123 (J), and, for example, in the case of the video on-streaming content, one of the video on-demand streaming components 123A is used to transcode the streamed video content received to generate the appropriate code for the video to be displayed to the super admin device 181 (K). Once the code is received by the control server 121, the appropriate executable file is selected from the executable file server 122 (L). The appropriate executable file, as well as the device formatting information determined in (C) are then transmitted to the web server 130 in order for the video content to be displayed (M). Then, the content transcoded and formatted as appropriate is made available for display on the super admin device (N).

2. Local Administrator

FIG. 2B is a block diagram showing the embodiment of FIG. 1A and an exemplary data flow among the external sources, the cloud-based multi-source broadcasting system, the web server and a local admin user, according to one embodiment.

In some embodiments, a hospital admin 141 requests access to the MSBP 120 by entering login information including a username and password via the client server 131 of the web server 30 (A). The device analytics server 132 collects device information associated with the hospital admin user device 141, and the login and device information are sent to the control server 121 (B). The login and device information are then sent to the rules engine 127 to determine the appropriate level of access to provide to the user, as well as the subset of resources to make available (C). Then, the rules engine 127, in communication with the management information database 128, determines the level of access and resources to make available to the hospital admin 141 (D). For example, using information in the management information database 128, the rules engine 127 determines that the login information provided is associated with a user with local admin privileges. More specifically, the rules engine 127 may further determine which hospital from a plurality of hospitals that the hospital admin 141 is associated with. For the specific hospital determined, the hospital admin 141 will have associated privileges to manage certain categories of resources, and also to view certain categories of resources, as stored in the management information database 128.

Then, the hospital admin 141 is presented with the resource management site on the dashboard, displaying only the categories of resources that are accessible to that hospital's administration (E). Then, depending on what action the hospital admin 141 would like to perform, the data flow sequence may be slightly different. In the example shown in FIG. 2B, the hospital admin 181 would like to add video content to the internal source information database, to assign the appropriate features and functionality available to different users of the content, and to then preview such content (F). These actions can be entered by the hospital admin via a user interface on the dashboard, some examples of which are described below in reference to FIGS. 6-15. The actions entered by the hospital admin 141 are communicated to the control server 121 (G). The control server 121 then interfaces with the internal source information database to store the content and to also assign the appropriate category and other information associated with the content (H). Then, for the hospital admin 141 to preview the content, one of the components of the source analysis and transcoding server 123 is used to transcode the content and to generate the appropriate code for the content to be displayed to the local admin device 141 (I). Once the code is received by the control server 121 (J), the appropriate executable file is selected from the executable file server 122 (K). The appropriate executable file, as well as the device formatting information determined in (C) are then transmitted to the web server 130 in order for the video content to be displayed (L). Then, the content transcoded and formatted as appropriate is made available for display on the hospital admin device 141 (M).

3. End User

Figure 2C:
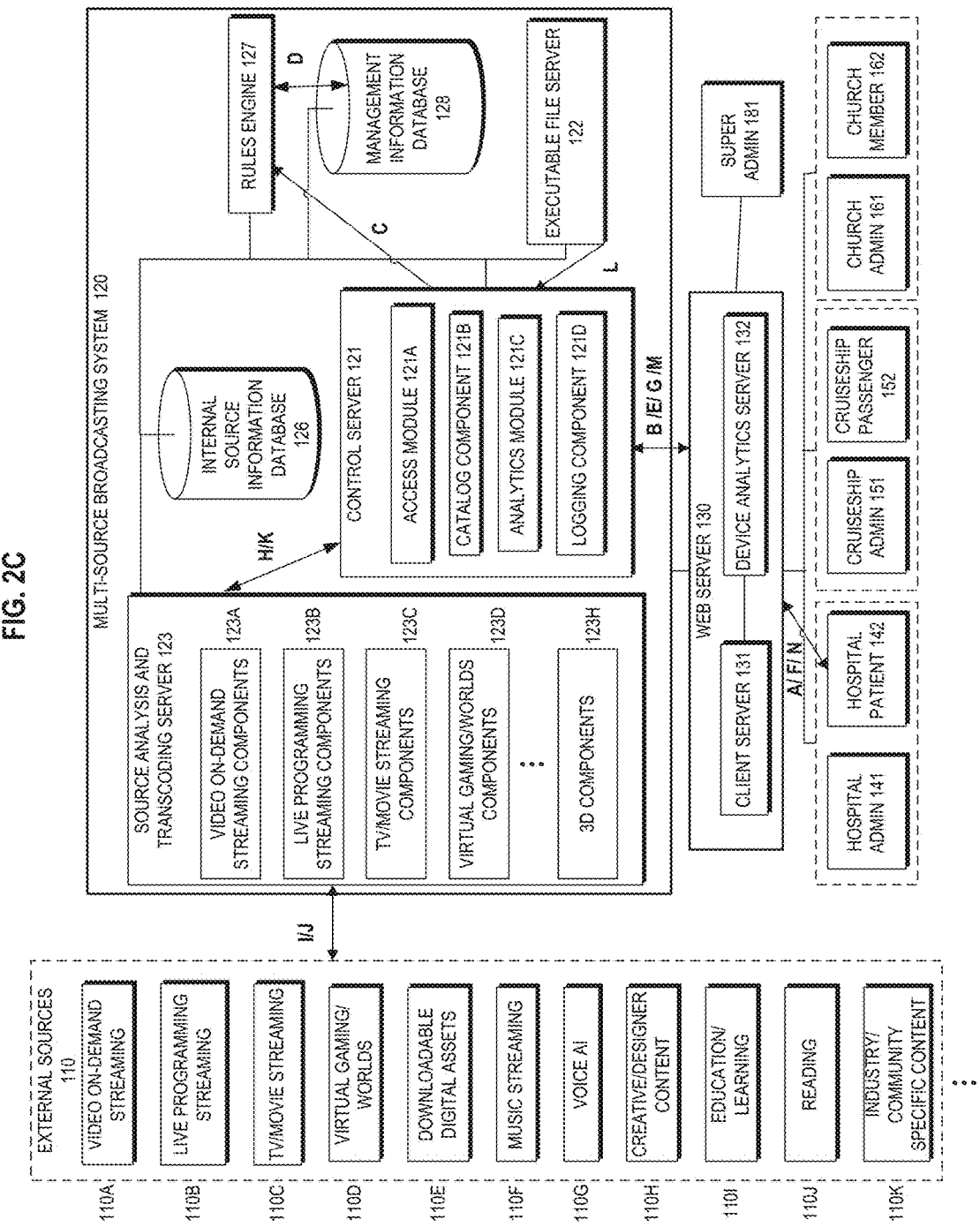
FIG. 2C is a block diagram showing the embodiment of FIG. 1A and an exemplary data flow among the external sources, the cloud-based multi-source broadcasting system, the web server and an end user, according to one embodiment.

FIG. 2C is a block diagram showing the embodiment of FIG. 1A and an exemplary data flow among the external sources, the cloud-based multi-source broadcasting system, the web server and an end user, according to one embodiment.

In some embodiments, a hospital patient 142 requests access to the MSBP 120 by entering login information including a username and password via the client server 131 of the web server 30 (A). The device analytics server 132 collects device information associated with the hospital patient user device 141, and the login and device information are sent to the control server 121 (B). The login and device information are then sent to the rules engine 127 to determine the appropriate level of access to provide to the user, as well as the subset of content to make available (C). Then, the rules engine 127, in communication with the management information database 128, determines the level of access and resources to make available to the hospital patient 142 (D). For example, using information in the management information database 128, the rules engine 127 determines that the login information provided is associated with an end user. More specifically, the rules engine 127 may further determine which hospital from a plurality of hospitals that the hospital patient 142 is associated with, as well as the patient's age, and possibly the patient's diagnosis, and so forth. For the user characteristics determined, the hospital patient 142 will have access to certain categories of resources.

Then, the hospital patient 142 is presented with the user dashboard, displaying only the categories of resources that are accessible to that patient (E). Then, the hospital patient 142 selects a specific type of resource from one of the categories presented (F). An example of the user dashboard is described below in reference to FIG. 18. The selection of a resource made by the hospital patient 142 is communicated to the control server 121 (G). For purposes of this example, the hospital patient 142 may select a streamed movie. Then, the control server 121 communicates with the movie components from the TV/movie streaming components 123C (H). The movie components of the TV/movie streaming components 123C then interface with the TV/movie streaming source 110C (I). Then, the patient's selected movie is received by the transcoder of movie components of the TV/movie streaming components 123C (J). The transcoder then transcodes the streamed movie received to generate the appropriate code for the movie to be displayed to the hospital patient 142 (K). Once the code is received by the control server 121, the appropriate executable file is selected from the executable file server 122 (L). The appropriate executable file, as well as the device formatting information determined in (C) are then transmitted to the web server 130 in order for the movie to be displayed (M). Then, the movie is made available for display on the hospital patient device 142 using the executable file, such as for example an embedded video player (N).

V. Multi-Source Broadcasting System Processes

1. User Access Process

Figure 3A:
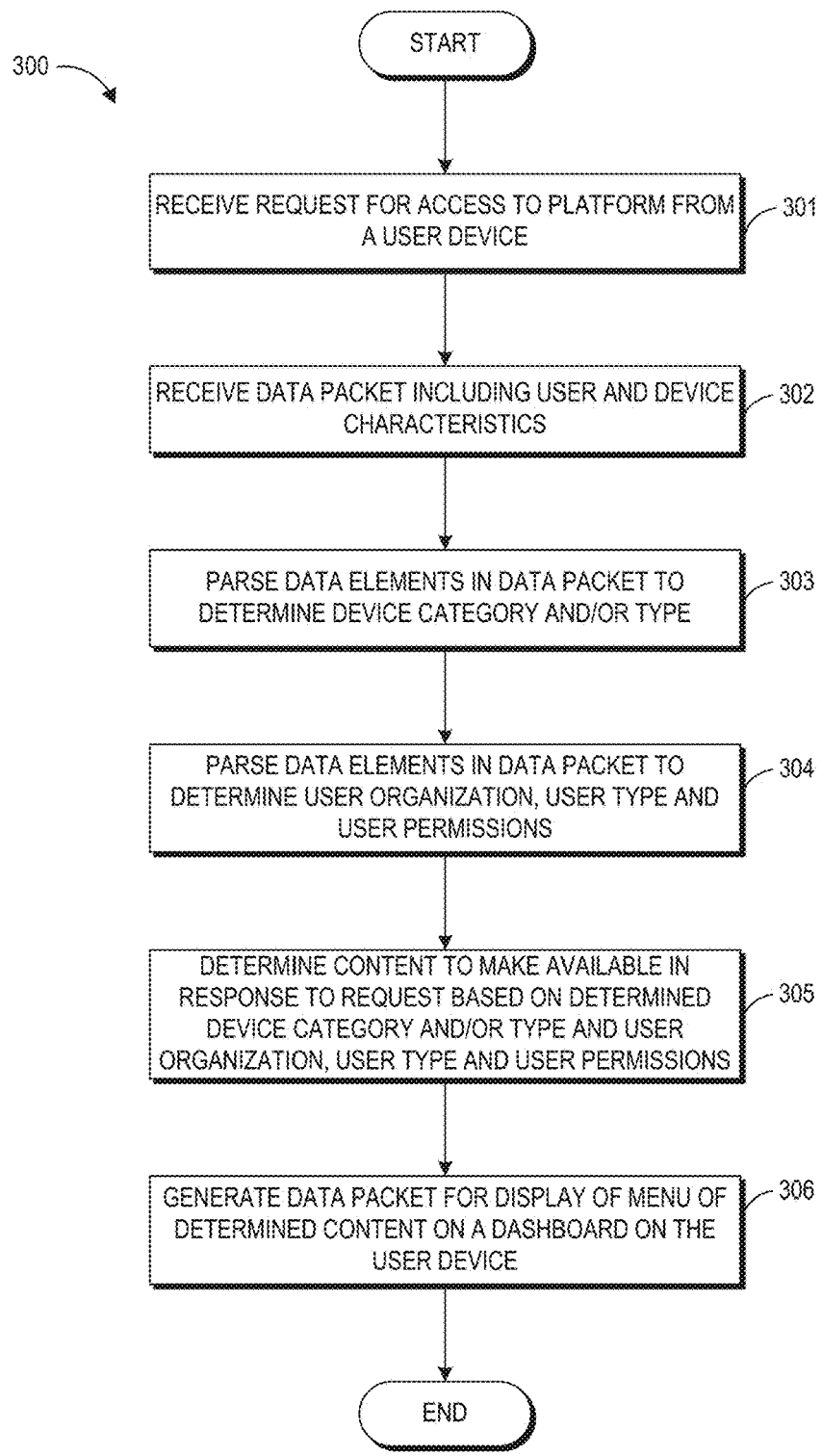
FIG. 3A is a block diagram which illustrates a logical flow diagram for one embodiment of an example process for responding to a request for access from a user.

FIG. 3A is a block diagram which illustrates a logical flow diagram for one embodiment of an example process for responding to a request for access from a user. While FIG. 3A refers to content, it is recognized that the process may be used to access other types of resources.

In block 301, the MSBP receives a request for access to the platform from a user device.

In block 302, the MSBP receives a data packet including user and device characteristics. The information received may include one or more of the user's login name, password, name and age, as well as one or more of the device's IP address, MAC address, a network protocol associated with software agents on the device, the application type of the software agent, the operating system of the device, the software vendor or the software agent, and/or software revision. The data packet may be formatted as unstructured data, including free text data, or structured data. The information may be directly uploaded by a user, or may be received from an external database.

In block 303, the MSBP parses data elements of the data packet received in block 302 to determine device category and/or type. For example, the device associated with the user request may be one of: a desktop computer, a laptop computer, a tablet, a handheld device, a mobile phone, a smart phone, a smart watch, a personal digital assistant, a car system, a tablet, or other computing device.

In block 304, the MSBP parses data elements of the data packet received in block 302 to determine user organization, user type, and user permissions. For example, based on the login information received, the MSBP may determine whether the user is an authorized or unauthorized user. Then, for authorized users, the MSBP may determine whether the user is a super admin, a local admin, or an end user. For local admin and end users, the entity or organization associated with the admin and user is determined. Finally, for each type of user determined, the appropriate permissions for access and management are determined.

In block 305, the MSBP determines content to make available in response to request based on determined device category and/or type and user organization, user type, and user permissions. In one embodiment, the MSBP makes available via the dashboard the appropriate interface for the user, depending on the type of device and user category. For example, the dashboard resources to be made available to a super admin will be different than the dashboard resources to be made available to a local admin or a user. Similarly, for each type of user, the dashboard resources to be made available is customized based on the device type determined from the request. For example, the dashboard resources to be made available on a mobile phone will be selected and optimized differently than the dashboard resources to be made available on a tablet.

In block 306 the MSBP generates a data packet for display of a menu of determined resources on a dashboard on the user device.

Once the menu of determined resources is displayed on a user device, a user may make selections from the menu to request resources from the MSBP.

2. Response Process

FIG. 3B is a block diagram which illustrates a logical flow diagram for one embodiment of an example process for responding to a request for resources from a user. While FIG. 3B refers to content, it is recognized that the process may be used to access other types of resources.

In block 351, the MSBP receives a selection data packet from a user device. The selection data packet may include information regarding type of resource requested, as well as information about the user device used to interact with the MSBP.

In block 352, the MSBP parses the selection data packet to determine data identifier and device identifier. As described above, for example, the device associated with the user request may be one of: a desktop computer, a laptop computer, a tablet, a handheld device, a mobile phone, a smart phone, a smart watch, a personal digital assistant, a car system, a tablet or other computing device.

In block 353, the MSBP performs a lookup of the data identifier to determine data content, type and source. For example, the data identifier may determine whether the data is associated with a third party source, whether the data is a streamed video, live programming, streamed TV show, streamed movie, virtual gaming/world, a downloadable digital asset, streamed music, commands for voice activated artificial intelligence device, creative/design content, educational/learning content, reading content, industry/specific community content, and so forth.

In block 354, the MSBP determines whether the content source is a third party.

If it is determined that the content source is a third party, then in block 355A, the MSBP 120 initiates a request for data to one of the third party content sources by automatically initiating appropriate receiver module.

If it is determined that the content source is not a third party, then in block 355B, the MSBP 120 accesses an internal source information database.

In block 356, the MSBP 120 receives data content from the appropriate source identified in block 354, either one of the received modules or the internal source information database.

In block 357, based on the data identifier and the device identifier received, the MSBP 120 automatically initiates the appropriate transcoder module to reformat the data. As described above, depending on the type of data requested, the transcoder associated with the appropriate source generates code to be executed by the executable file server to make available for display the content in the appropriate player, such as for example thorough an embedded video player. In addition, depending on the type of device identified, the information to be displayed may be optimized for best viewing on the device.

In block 358, the MSBP 120 prepares a stream of the transcoded data to present to the user device.

In block 359, the MSBP 120 provides data packet for display of streamed data on user device with appropriate embedded player.

3. Other Processes

It is recognized that the MSBP may include other processes not described above or included in the Figures. For example, in some embodiments, the MSBP is configured to allow administrators to preview content made available from the external or internal sources. The MSBP is also configured to allow administrators to also add or delete content. Additionally, the MSBP is configured to allow new types of content to be interfaced with by adding the appropriate receiver and transcoder for the new types of content.

VI. Partitions

FIG. 4 depicts one embodiment of a partitioning solution that allows a plurality of users associated with different entities to access the internal source information database 126, without corrupting or having access to one another's data. The partitioning solution is also configured to allow the plurality of users associated with different entities to share one another's data, if appropriate.

The MSBP 120 may provide administrators and users with data made available by the super administrators, content partners, or local administrators of specific entities via the internal source information database 126. The data may include entity specific information, and/or may be information appropriate to more than a single entity. The permissions associated with the data may be assigned by the super administrator, or each local administrator uploading information specific to their entity may define additional access permissions for other entities, if desired. Then the local administrators of those other entities may additionally define access privileges to that shared data for their own users. Permissions may be on a per user basis, or on a user category basis, such that all users in a specific category receive the same access privileges.

As depicted in FIG. 4, the generic data available to all users is depicted as data 405, and the proprietary data exclusive to individual user A 401 and user B 402 are depicted as Partition A 421, Partition B 422.

FIG. 4 shows that each partition is accessible only to its respective user, and is shielded from access or use by other users by a system of partitions. The partition plan depicted in FIG. 4 allows a plurality of users to access the internal source information database 128 simultaneously or nearly simultaneously. In one embodiment, the MSBP 120 allows for from hundreds or thousands of users to access the same internal source information database 126, including the shared data and each user's partitioned data, simultaneously. In other embodiments, the MSBP 120 may provide multiple internal source information databases 128 for use by one or more users.

Starting at the bottom of FIG. 4, user A 401 and user B 402 access the internal source information database 126. A firewall 410 allows access to the MSBP 120 for users with approved credentials and protects computers used by the individual clients from improper access by others.

The users 401, 402 access the internal source information database 126 and are given access to their respective partitions. In some embodiments, the users 401, 402 can connect using a Virtual Private Network (VPN) and/or can use other specific user credentials. In one embodiment, access to the MSBP 120 is controlled by a password or other identifier to correctly authenticate a user wishing to access the MSBP 120, as will be understood by one of ordinary skill in the art in light of the present disclosure. The MSBP 120 accesses the data stored in the internal source information database 126 if such internally created or stored content is requested by the users.

In some embodiments, the internal source information database 128 can be implemented using an open-source cross-platform document-oriented database program, such as a Mongo dB, a relational database, such as IBM DB2, Sybase, Oracle, CodeBase and Microsoft® SQL Server as well as other types of databases such as, for example, a flat file database, an entity-relationship database, and object-oriented database, and/or a record-based database.

Thus, users gain the benefits typically associated with a proprietary database system associated with the entity that includes their own data as well as other entities' data without a substantial delay for database build time and without the very costly up-front financial investment that are typically associated with proprietary databases.

Furthermore, in addition to having access to different proprietary data, different clients may also be provided with access to different portions of the common data in the internal source information database 128. For example, one or more users may be allowed access a portion of the data associated with a different entity than their own. In one embodiment, access control to the data in the internal source information database 128 for the various users is implemented, at least in part, using the various privileges and controls associated with different administrator level users.

VII. User Interfaces

In some embodiments, the computing environment, including the MSBP, includes modules for providing graphical user interfaces that allow a user to interact with the MSBP via a user device accessing the web server or another application. The modules may include, but are not limited to, an application on the user's device, a cloud-based program, a remote application, or a web-based interface. Example embodiments are described as follows.

In the example user interfaces described below in reference to FIGS. 5A through 16B, the entity illustrated is a hospital. As described above, the hospital is only one example of a type of entity that may interact with the MSBP. Although not shown, the disclosure is intended to cover the embodiments of user interfaces associated with other types of entities, including and not limited to, for example, cruise ships, churches, educational institutions, households, companies, and the like. In addition, while the example interfaces sometimes refer to content, it is recognized that other resources may be used.

Figure 5A:
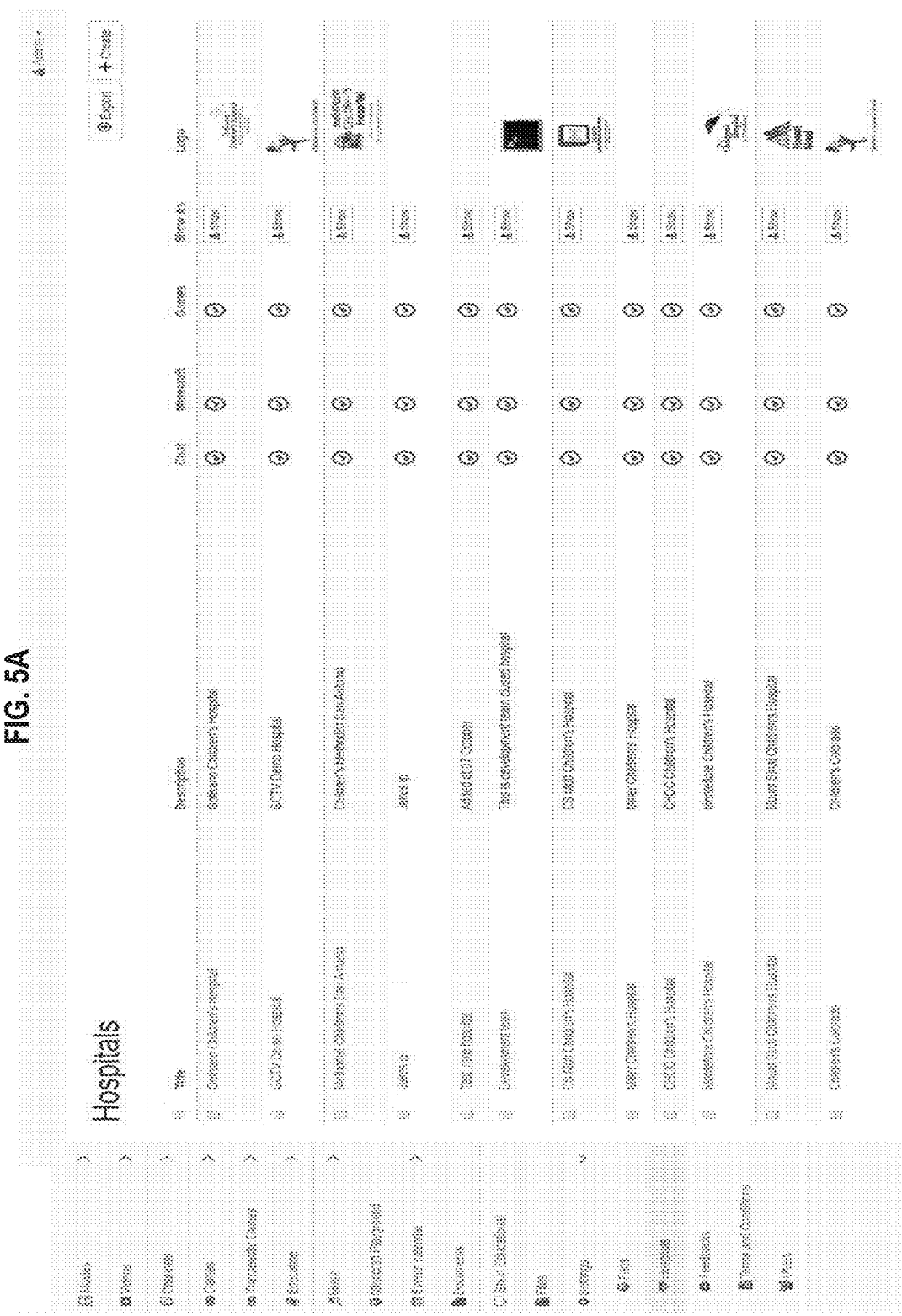
FIG. 5A is a screen shot depicting one embodiment of an example super admin user interface, displaying a list of categories on the left hand side, and the details of different hospitals and their associated privileges in the main section.

FIG. 5A is a screen shot depicting one embodiment of an example super admin user interface, displaying a list of categories on the left hand side, and the details of different hospitals and their associated privileges in the main section. The list of categories on the left includes sections available for adding or removing content for super administrator users. The sections include Movies, Videos, Channels, Games, Therapeutic Games, Education, Music, Minecraft Playground, Events Calendar, Documents, Short Educational, Files, and Settings. Within Settings, there are sub-categories for FAQs, Hospitals, Feedbacks, Terms and Conditions, and Users.

Most of these sections are also available to local administrator users, and will be described herein in reference to local administrator interfaces. However, some of the sections are only available to super administrator users, and those sections are described in reference to FIGS. 5A-5E.

For example, as seen in FIG. 5A, using the Hospitals sub-category, the super admin can add different entities such as hospitals as a high level field in the settings for MSBP. The super admin can then assign access rights to chat, Minecraft and Games for each of the different hospitals. For each hospital, the super admin may also select whether or not to show the hospital in the list. By selecting the hospital to view, the super admin can view all of the hospital's sites and content available across all of the sites. For example, a hospital may have several local administrators selecting various content for their site, and the super admin may access all of those through a single view. The super admin may also add a logo or graphic associated with the respective hospitals. Also shown in FIG. 5A is a button for the super administrator to export the list.

Figure 5B:
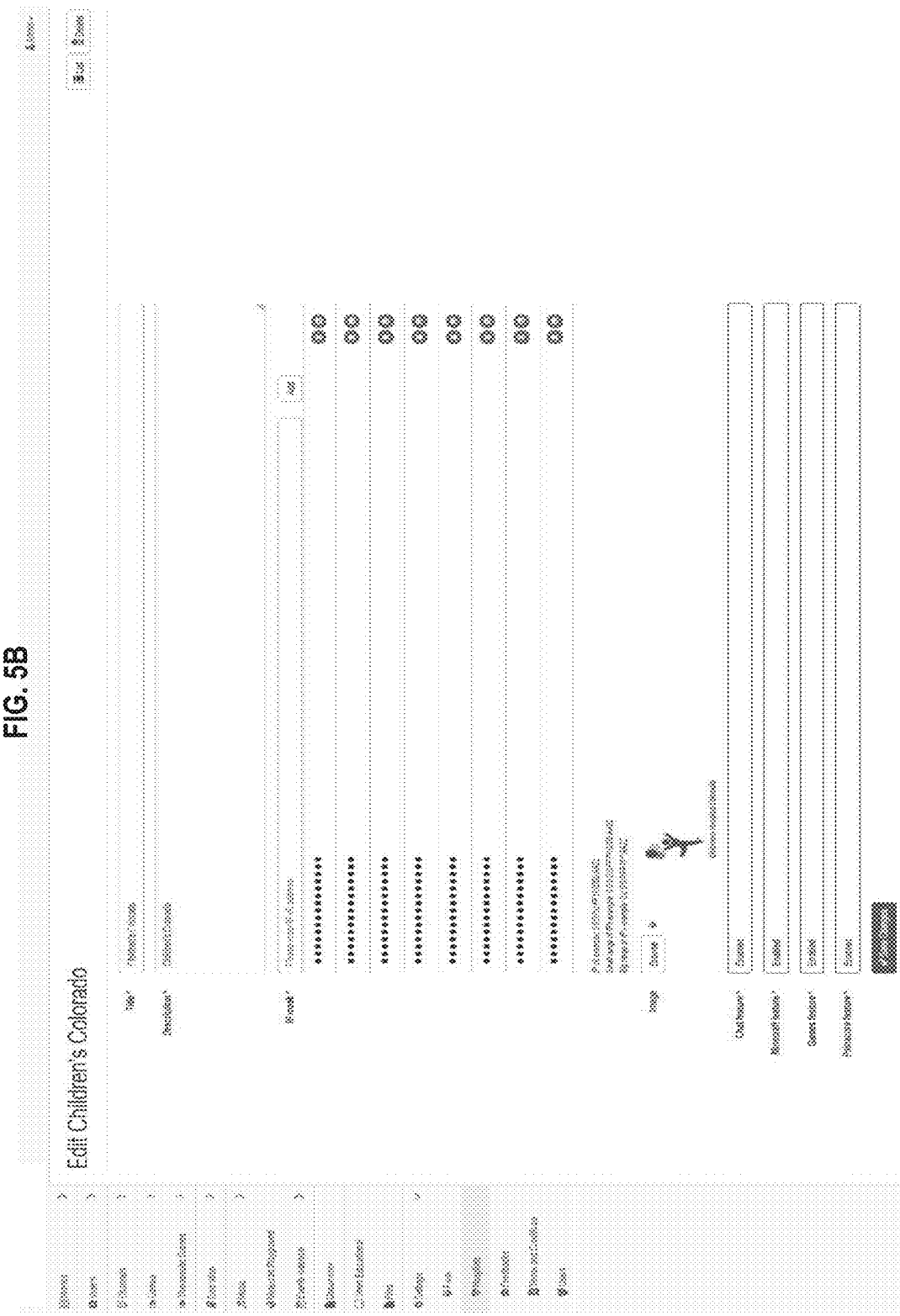
FIG. 5B is a screen shot depicting one embodiment of an example super admin user interface, displaying the details of editable fields associated with an example hospital.

FIG. 5B is a screen shot depicting one embodiment of an example super admin user interface, displaying the details of editable fields associated with an example hospital. The super admin has the ability to add entities, such as hospitals into the MSBP 120. The fields associated with an entity may include the entity's title, a description, IP addresses associated with the entity, an image such as for example, the entity's logo. FIG. 5B also shows in more detail how the features and/or functions of chat, Minecraft, Games and PainScore may be enabled or disabled for each hospital. FIG. 5B also shows a button for the super administrator to view a list of hospitals.

Figure 5C:
FIGS. 5C-5E are screen shots depicting embodiments of example super admin user interfaces associated with the Games category.
Figure 5D:
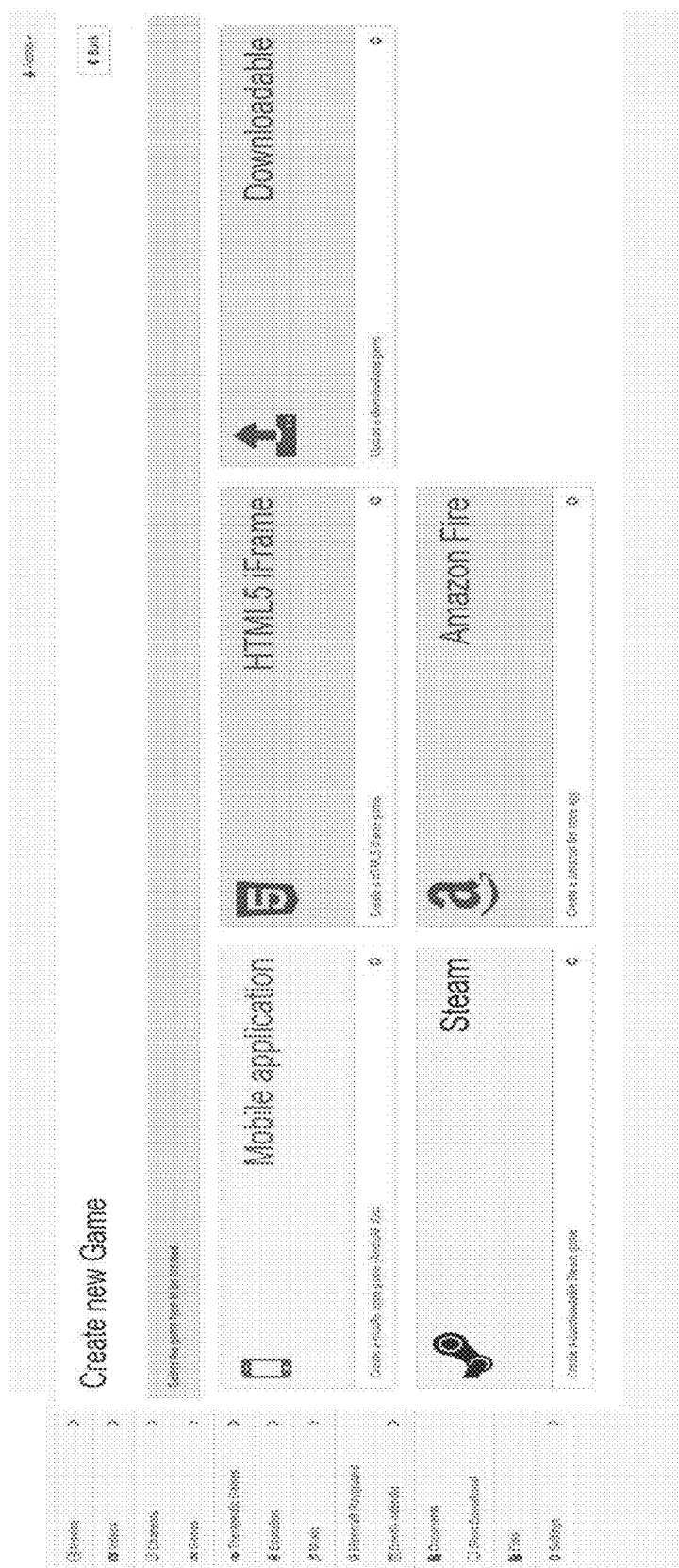
Figure 5E:
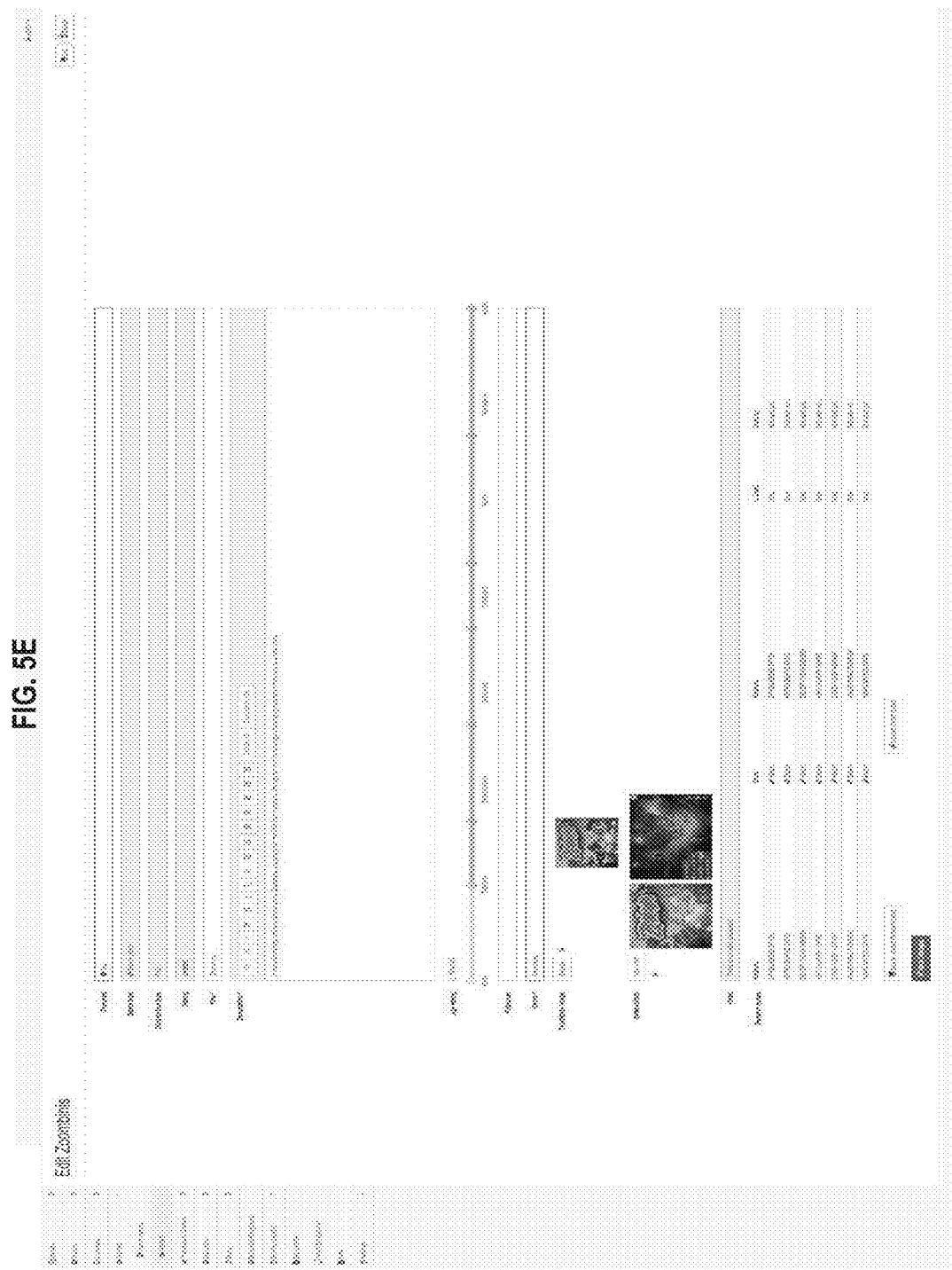

FIGS. 5C-5E are screen shots depicting embodiments of example super admin user interfaces associated with the Games category.

FIG. 5C shows a list of all games available and added to the MSBP by the super admin user. For each game, there is a tile associated with the game, an indication of whether the game is a featured one, a user rating, a genre type, a sharing status, an entity, a preview image, and actions such as creating.

FIG. 5D shows details of how a super admin can add a new game by selecting the types of games from, for example, a mobile application, an HTML5 iFrame, a downloadable .exe file, a steam application, or an Amazon fire application.

FIG. 5E shows details associated with a game and the fields that can be edited by the super admin. For example, for the Zoombinis game, the super admin may provide whether or not the game will be featured, the game type (as selected from the screen shown in FIG. 5D, for example), the distribution type (whether paid or free, for example), the rating associated with the game (unrated, or rated based on user ratings tracked), the title of the game, a description of the game to be made available to interested users, an age rating for the game (shown on a scale, for example, including babies, toddlers, preschoolers, schoolers, childhood, tweens, teenagers, and adults), a publisher associated with the game, a genre for the game (for example, adventure, sports, action, strategy, puzzle, education, racing, arcade, music, role playing, platformer, and the like), one or more thumbnail images to include with the game selection for a user, one or more screenshots to include with the game selection for a user, whether and/or which video is to be presented in association with the game, and, if applicable, a list of redeem codes available to user to use to claim a copy of a paid game for free. The MSBP manages the inventory of codes to track which codes have been redeemed/used, or are still available.

Figure 5F:
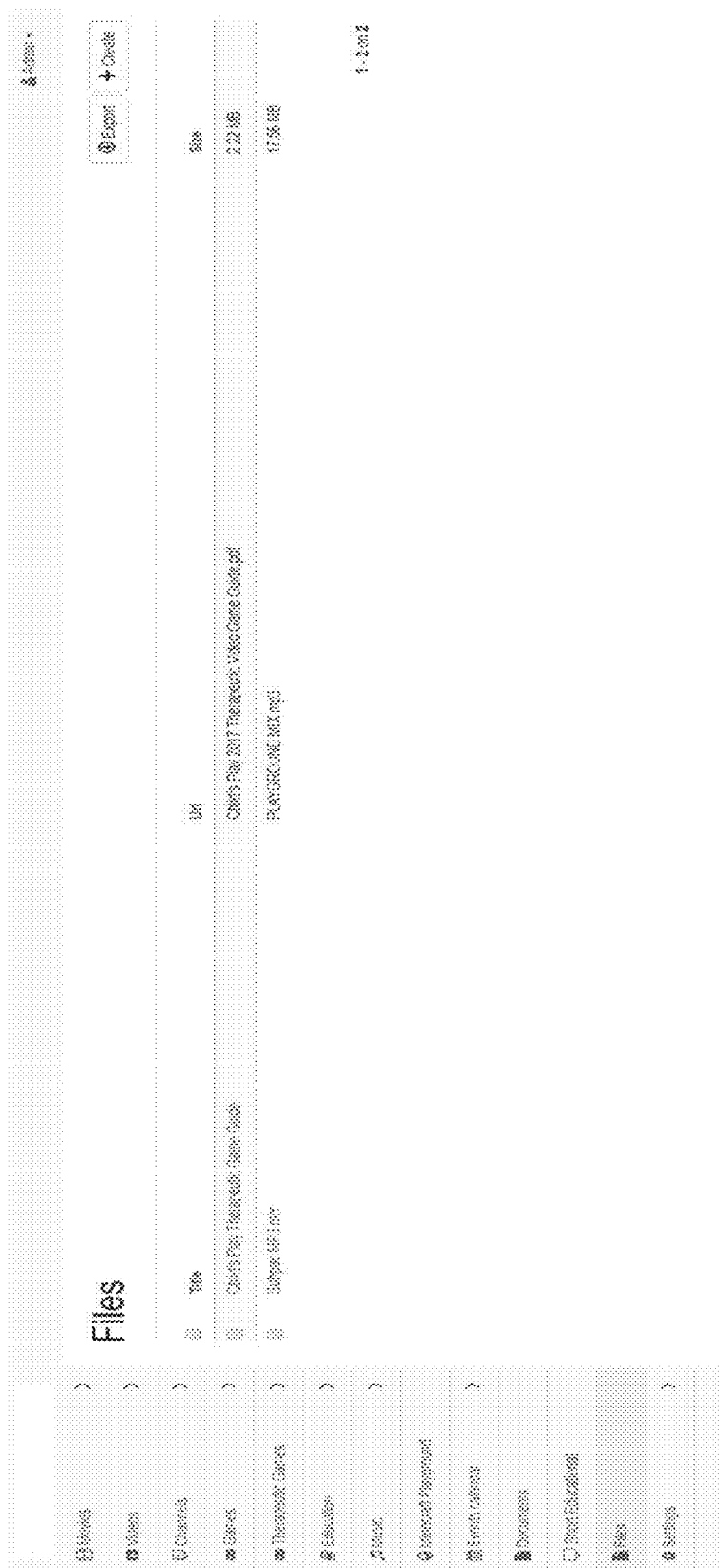
FIG. 5F is a screen shot depicting an embodiment of an example super admin user interface associated with the Files category.

FIG. 5F is a screen shot depicting an embodiment of an example super admin user interface associated with the Files category. Super administrator users can use this user interface, for example, to upload new files and/or documents to be downloaded by local administrators and end users. As shown in this example interface, the files may be of any type, including pdf files, mp3 files, and the like.

Figure 6:
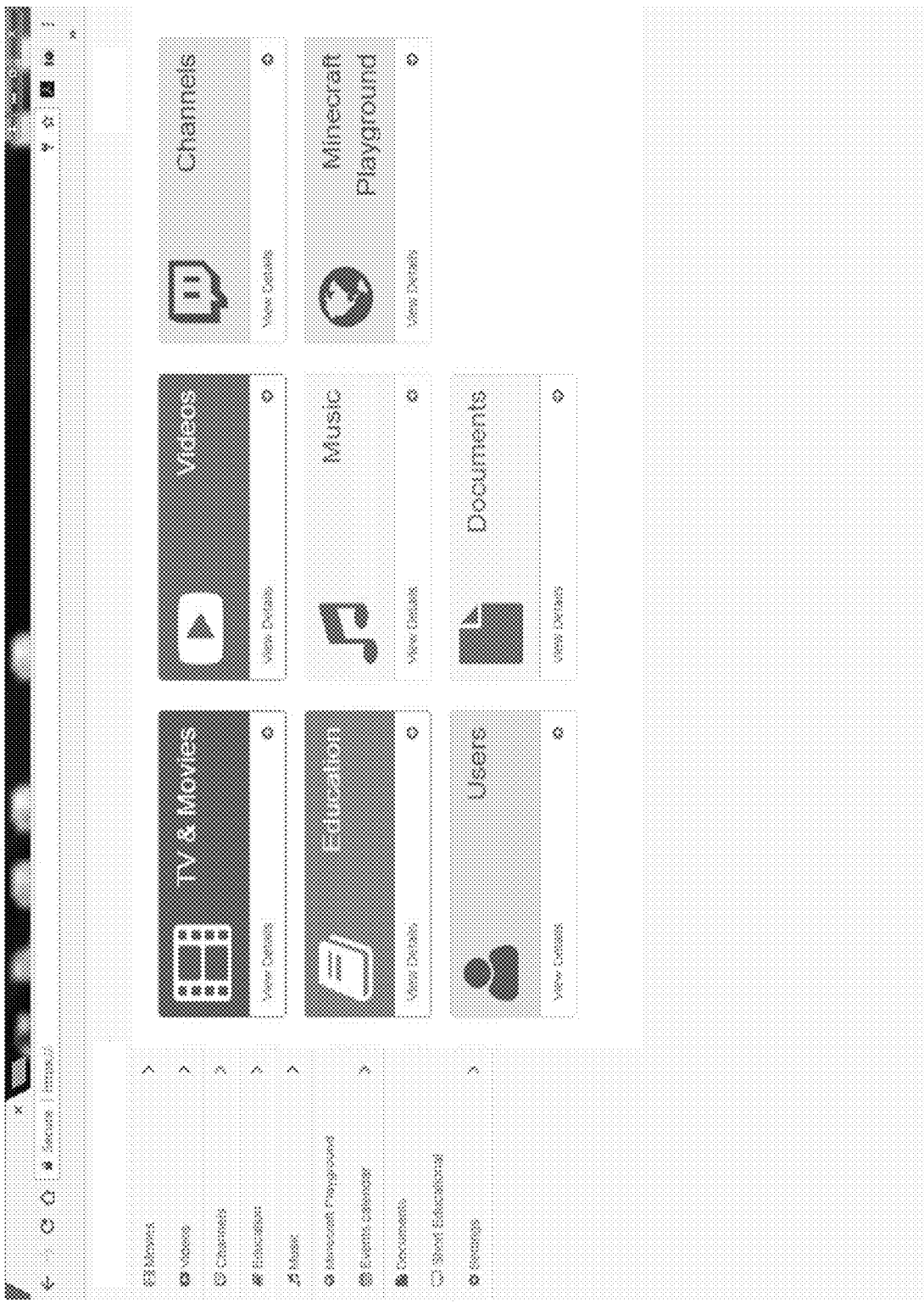
FIG. 6 is a screen shot depicting one embodiment of an example user interface for the high-level dashboard that may be available to a local administrator user

FIG. 6 is a screen shot depicting one embodiment of an example user interface for the high-level dashboard that may be available to a local administrator user. The high-level dashboard shows the content management site (CMS) for the local or the super administrator, with the different categories of content or resources enabled for their entity. In the example shown, the categories shown are TV & Movies, Videos, Channels, Education, Music, Minecraft Playground, Users and Documents. In addition, on the left-hand side, there are selections for Events/Calendar, Short Educational and Settings for local admin users. The categories and some of the other selections shown are described in more detail in reference to FIGS. 7A through 15B below.

FIGS. 7A-7F are screen shots depicting embodiments of example local admin user interfaces associated with the TV & Movies category. The user interfaces could also be used by a super admin.

Figure 7A:

In FIG. 7A, the list of TV and movies currently available on the system is displayed in the main section. For each item, a title, a rating, a category, a source, a sharing status, visibility, associated entity such as for example a hospital, and a preview may be available. As seen in the example of FIG. 7A, a user rating may not yet be available for different items. For category, some examples are sports documentaries, video game movies and documentaries, nature documentaries, top movies, and so forth. The source of the TV or movie may be Vimeo, YouTube, or an uploaded file, in some examples. The sharing status of an item may be set to public, private or custom, in different examples. The visibility of the item may also be set. If the item has been created by an entity, an indication of the entity may be included. Finally, a preview including a short clip of the item may be available. Also shown in FIG. 7A are buttons for the local administrator to add filters to the TV and movie files, as well as to export the files.

Figure 7B:
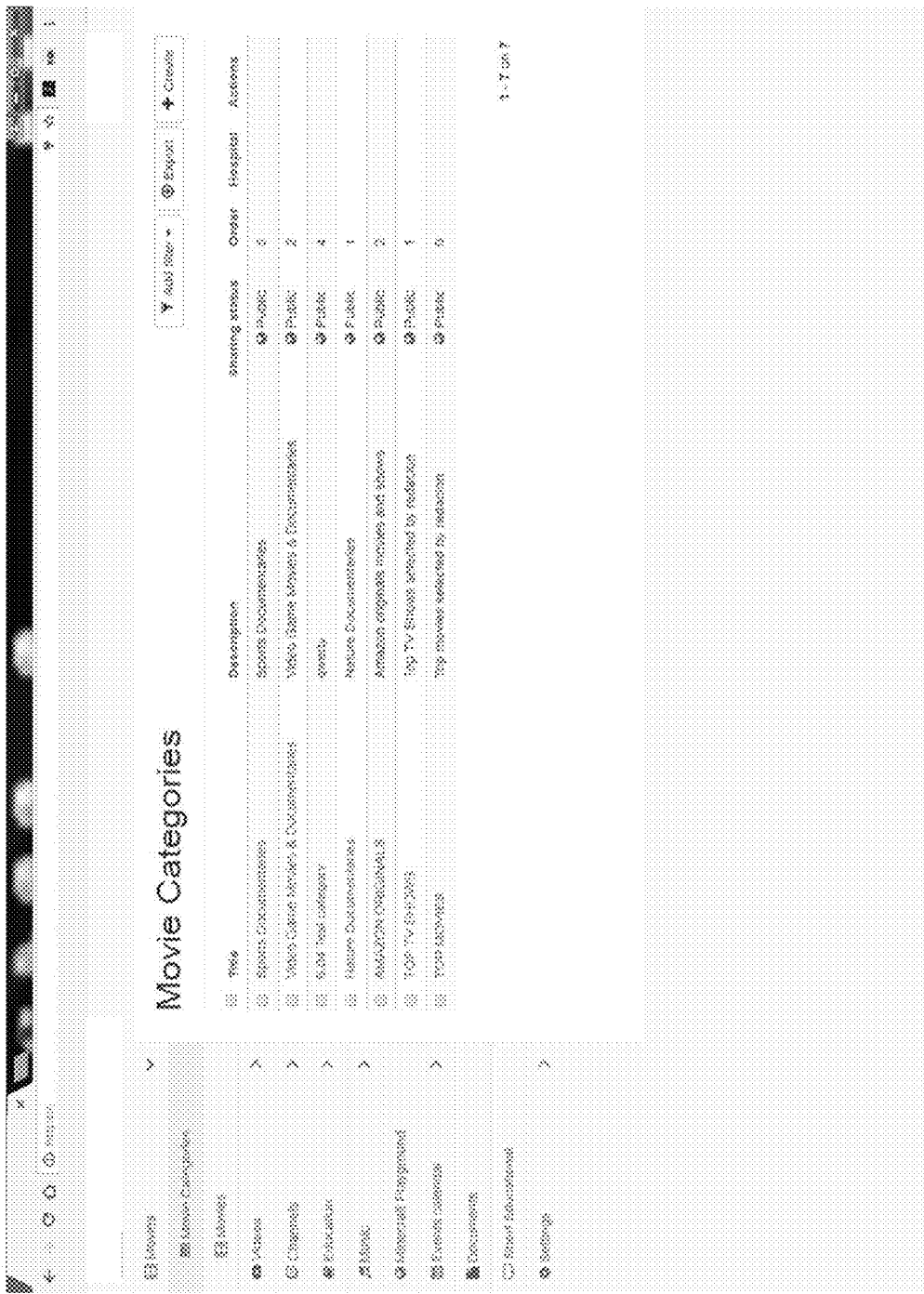

FIG. 7B shows more details of an example interface on how the local admin user may add categories of movies to be made available for movie items uploaded. For each category added, in addition to a title and description of the category, a sharing status and an order for viewing may be assigned to the category. In addition, as in FIG. 7A, If the item has been created by an entity, an indication of the entity may be included. Finally, actions associated with the category can also be added. Also shown in FIG. 7B are buttons for the local administrator to add filters to the TV and movie categories, as well as to export the categories.

FIG. 7C shows details of an example local admin user interface for creating a new movie category, including the fields of the title, the description, the order and the sharing status. FIG. 7C also shows a button for the local administrator to view a list of movie categories.

Figure 7D:
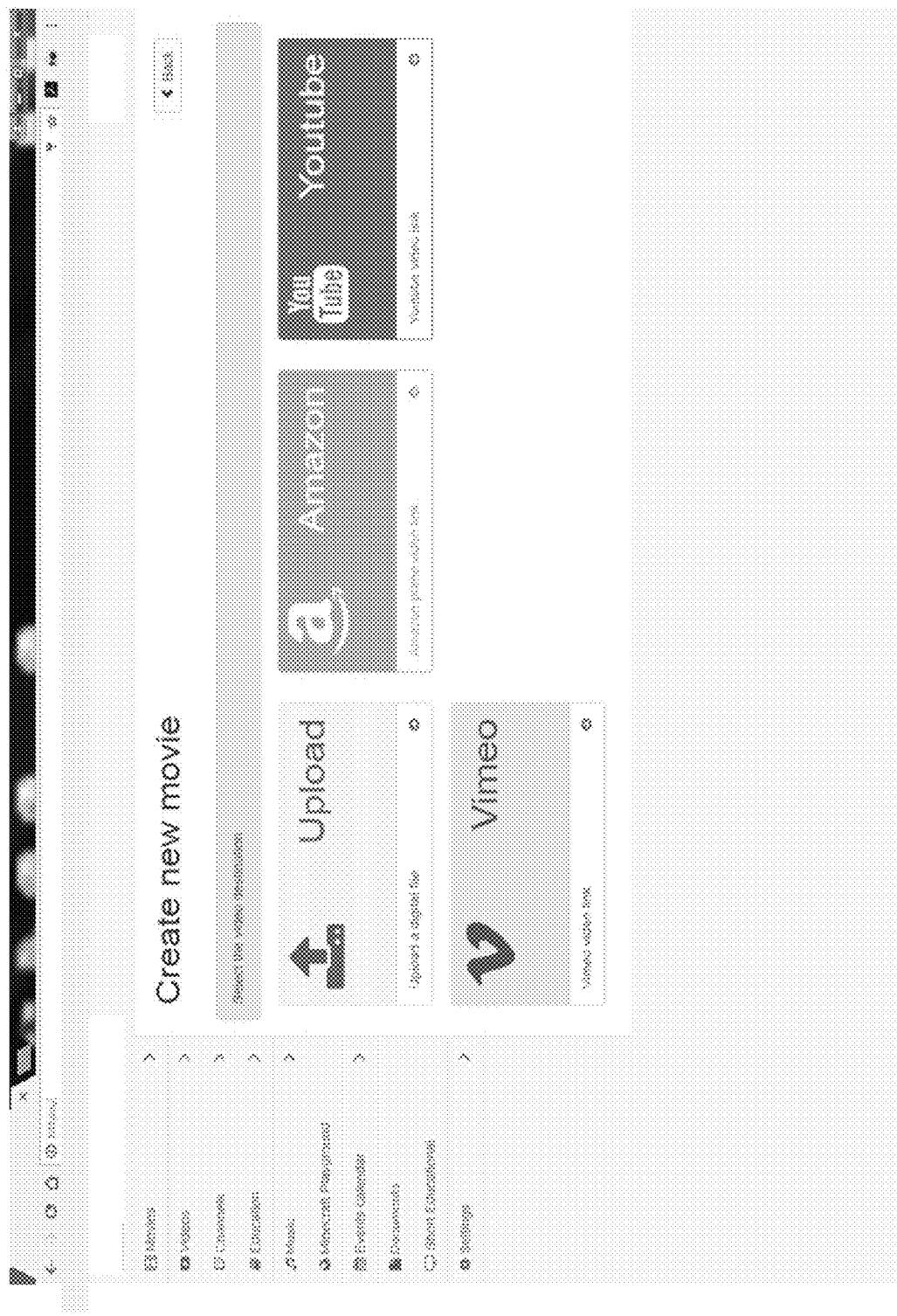

FIG. 7D shows details of an example local admin user interface for creating a new movie. As seen in FIG. 7D, the first step for the local administrator is to select a video destination from, for example, one of uploading a digital file, uploading an Amazon prime video link, uploading a YouTube video link, or uploading a Vimeo video link.

Figure 7E:
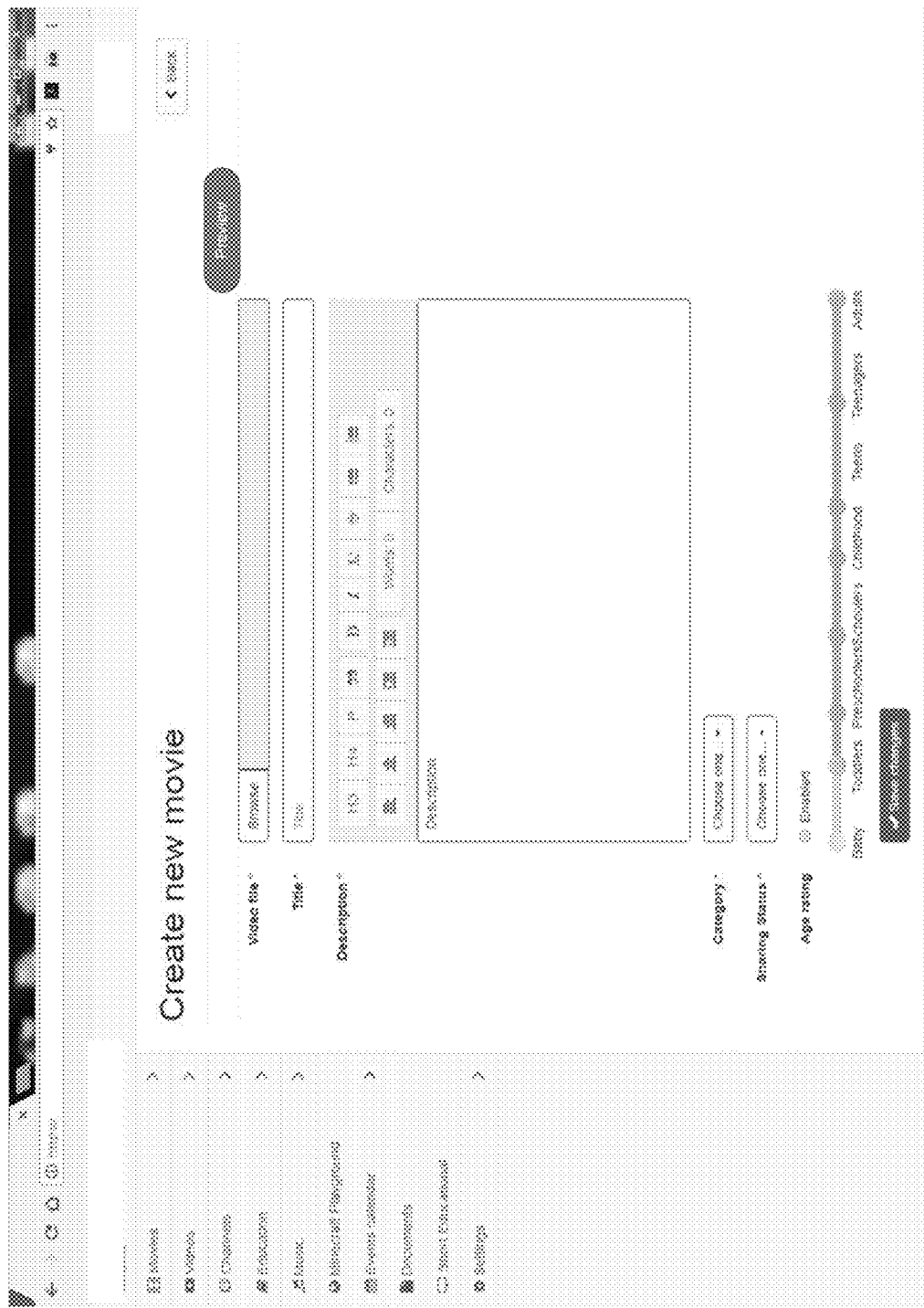

FIG. 7E shows an example user interface displayed to the local administrator user when the option for uploading a digital file is selected in the previous screen shown in FIG. 7D. For the digital file to be uploaded, the local administrator selects the video file from a browseable directory, then inputs a title, a description (which can also be formatted), selects a category, a sharing status and an age rating. FIG. 7E also depicts a "Preview" button available to the local administrator to preview the video file prior to saving changes.

Figure 7F:
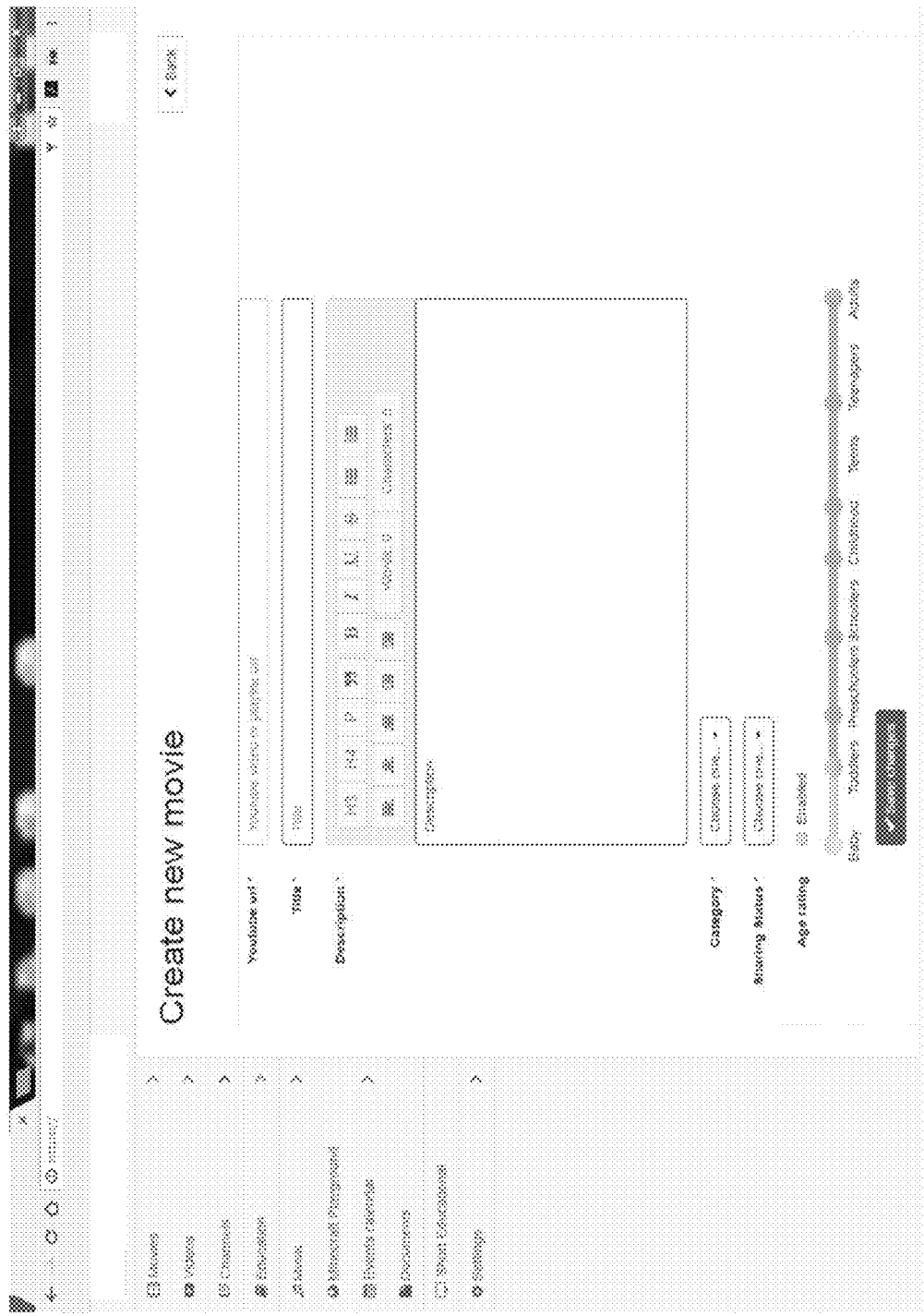

FIG. 7F shows an example user interface displayed to the local administrator user when the option for uploading a YouTube file is selected in the previous screen shown in FIG. 7D. For the YouTube file to be uploaded, the local administrator enters the appropriate URL, then inputs a title, a description (which can also be formatted), selects a category, a sharing status and an age rating. A similar user interface would be displayed to the local administrator if the local admin selects uploading an Amazon prime video link, or uploading a Vimeo video link.

Figure 8A:
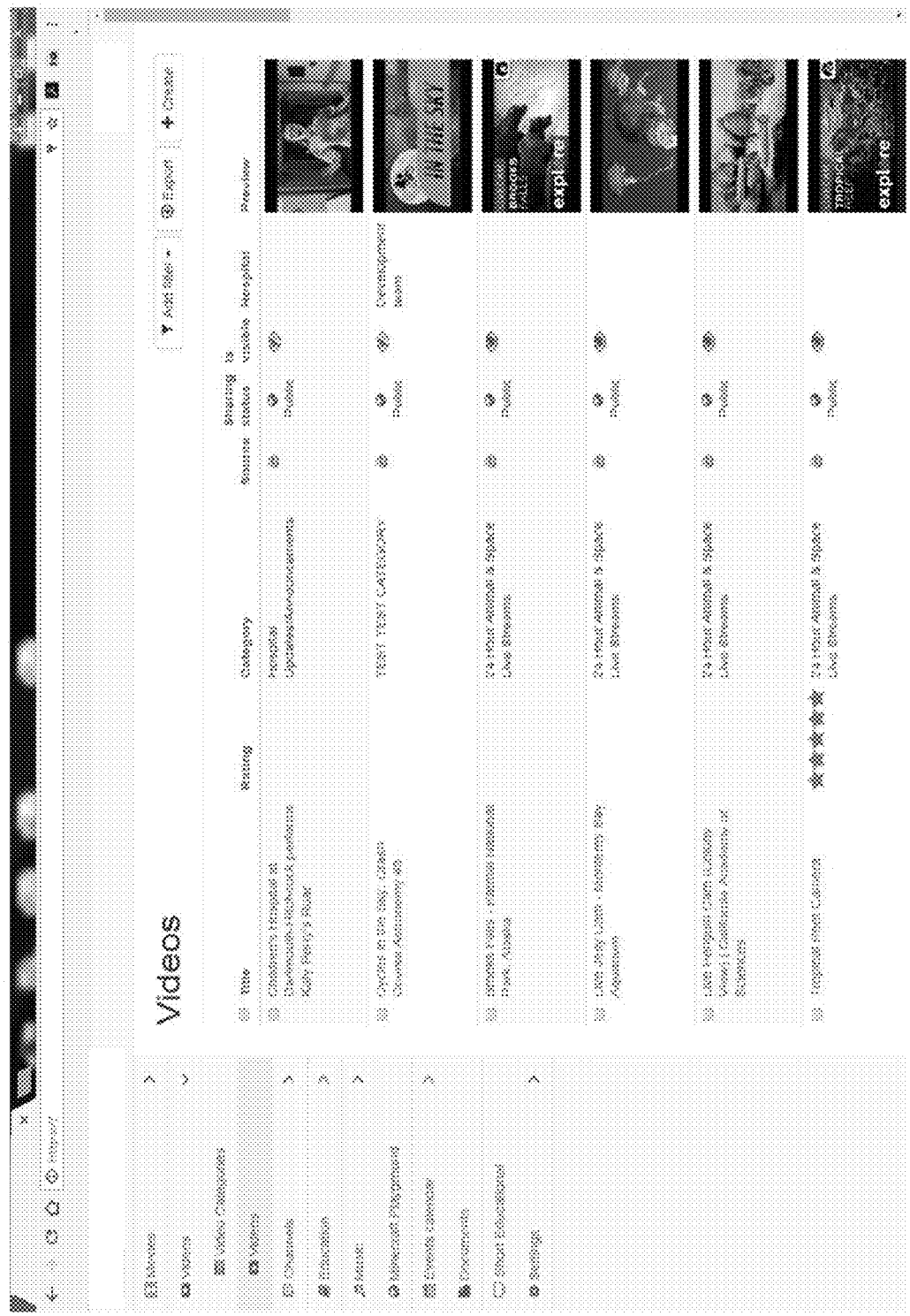
FIGS. 8A-8C are screen shots depicting embodiments of example local admin user interfaces associated with the Videos category.
Figure 8B:
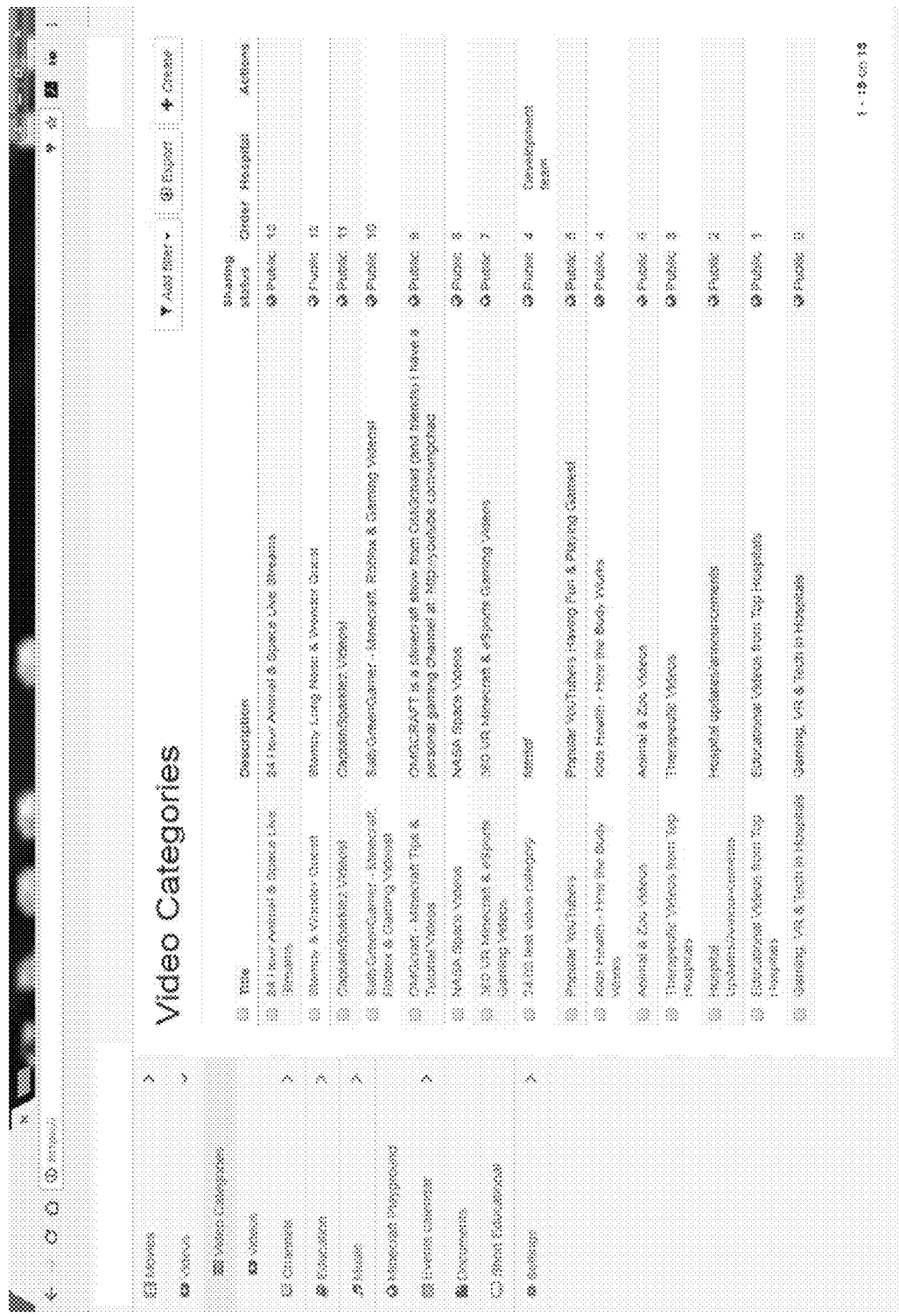
Figure 8C:
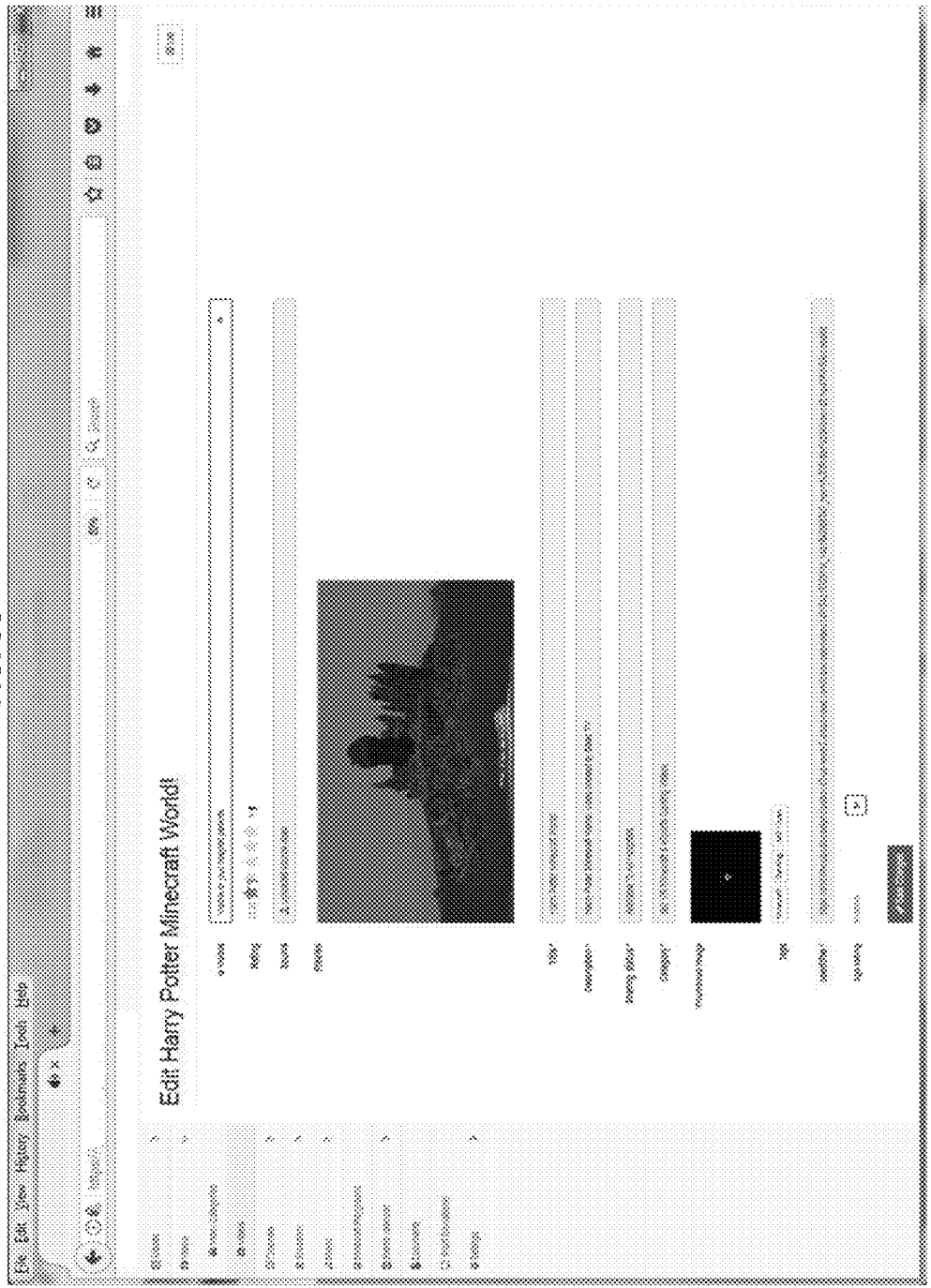

FIGS. 8A-8C are screen shots depicting embodiments of example local admin user interfaces associated with the Videos category. The user interfaces could also be used by a super admin.

In FIG. 8A, the list of videos currently available on the system is displayed in the main section. For each item, a title, a rating, a category, a source, a sharing status, visibility, associated entity such as for example a hospital, and a preview may be available. As seen in the example of FIG. 8A, a user rating may not yet be available for different items. For category, some examples are hospital updates/announcements, test category, 24-hour animal and space live streams, and so forth. The source of the TV or movie may be Vimeo, YouTube, or an uploaded file, in some examples. The sharing status of an item may be set to public, private or custom, in different examples. The visibility of the item may also be set. If the item has been created by an entity, indication of the entity may be included. Finally, a preview including a short clip of the item may be available. Also shown in FIG. 8A are buttons for the local administrator to add filters to the video files, as well as to export the files.

FIG. 8B shows more details of an example interface on how the local admin user may add categories of videos to be made available for video items uploaded. For each category added, in addition to a title and description of the category, a sharing status and an order may be assigned to the category. In addition, as in FIG. 8A, If the item has been created by an entity, an indication of the entity may be included. Finally, actions associated with the category can also be added. Also shown in FIG. 8B are buttons for the local administrator to add filters to the video categories, as well as to export the categories.

FIG. 8C shows an example user interface displayed to the local administrator user for editing the fields associated with a specific video. In the example shown in FIG. 8C, the local administrator can edit the fields of whether to make a video visible to certain users, assign a user rating, describe the source of the video, select a clip to use as a preview of the title, input a title, input a description, select a sharing status, select or enter a category, select a thumbnail image, identify tags, input an identifier and enable or disable an age rating.

FIGS. 9A-9D are screen shots depicting embodiments of example local admin user interfaces associated with the Channels category. The user interfaces could also be used by a super admin.

Figure 9A:
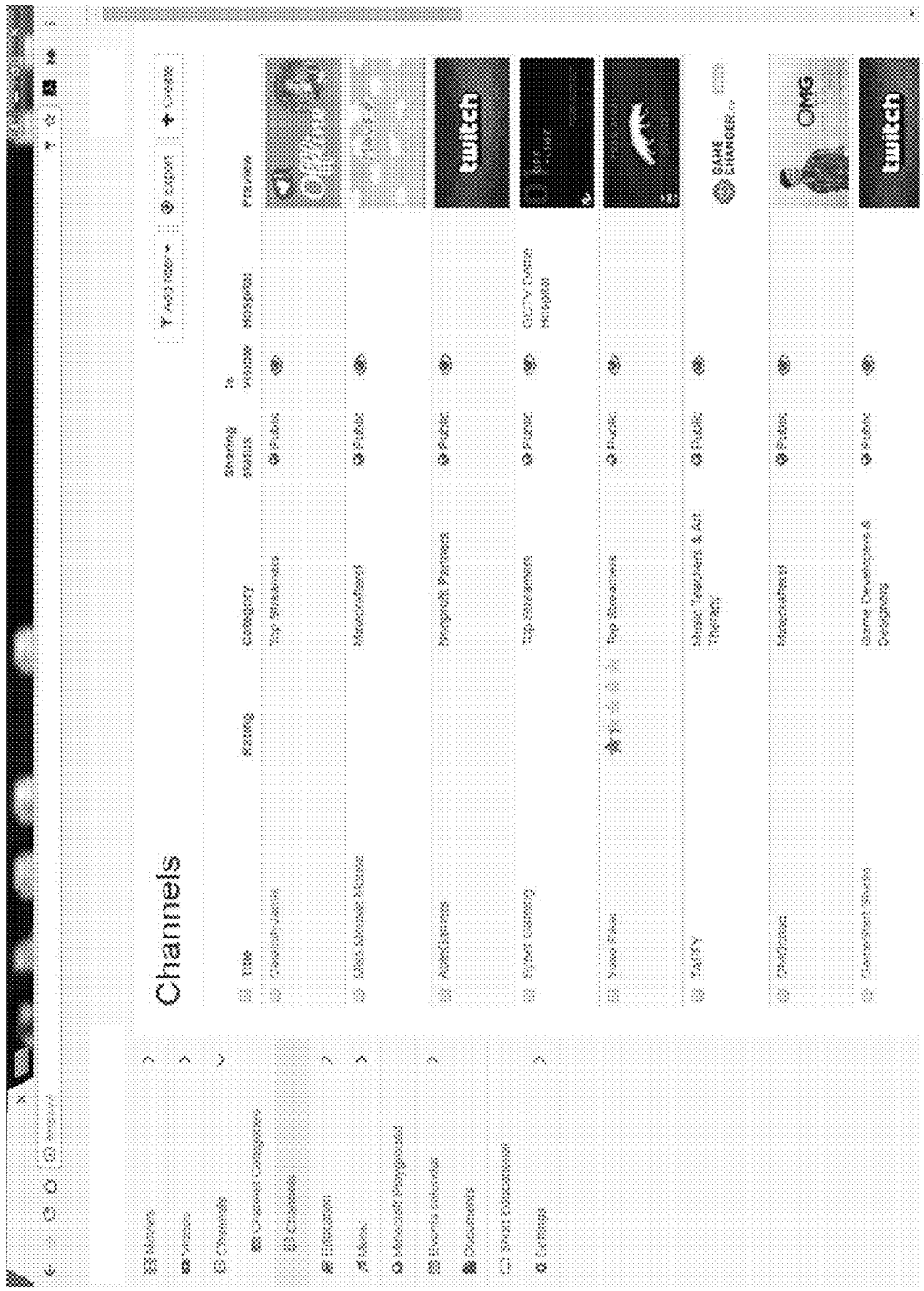

In FIG. 9A, the list of channels currently available on the system is displayed in the main section. For each item, a title, a rating, a category, a sharing status, visibility, associated entity such as for example a hospital, and a preview may be available. As seen in the example of FIG. 9A, a user rating may not yet be available for different items. For category, some examples are top streamers, Minecrafters, nonprofit partners, music teachers and art therapy, game developers and designers, and so forth. The sharing status of an item may be set to public, private or custom, in different examples. The visibility of the item may also be set. If the item has been created by an entity, an indication of the entity may be included. Finally, a preview including a short clip of the item may be available. Also shown in FIG. 9A are buttons for the local administrator to add filters to the channels, as well as to export the list of channels.

Figure 9B:
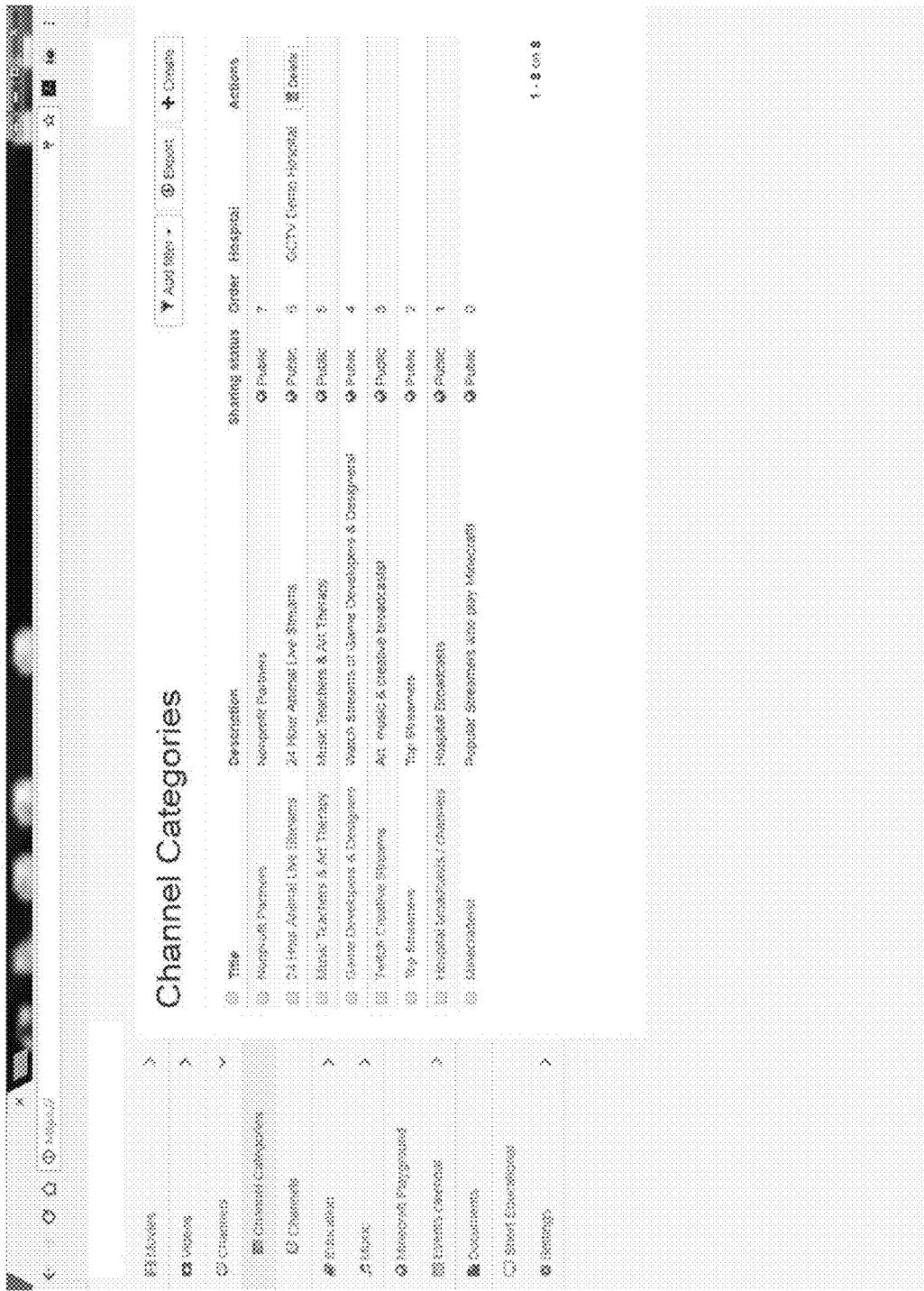

FIG. 9B shows more details of an example interface on how the local admin user may add categories of channels to be made available for channels displayed. For each category added, in addition to a title and description of the category, a sharing status and an order may be assigned to the category. In addition, as in FIG. 9A, If the item has been created by an entity, an indication of the entity may be included. Finally, actions associated with the category can also be added. Actions may include adding or deleting the categories. Also shown in FIG. 9B are buttons for the local administrator to add filters to the channel categories, as well as to export the channel categories.

FIG. 9C shows more details of an example interface on how the local admin user may add categories of channels to be made available for channels. For each category added, in addition to a title and description of the category, an order and a sharing status and may be assigned to the category. FIG. 9C also shows a button for the local administrator to view a list of channel categories.

Figure 9D:
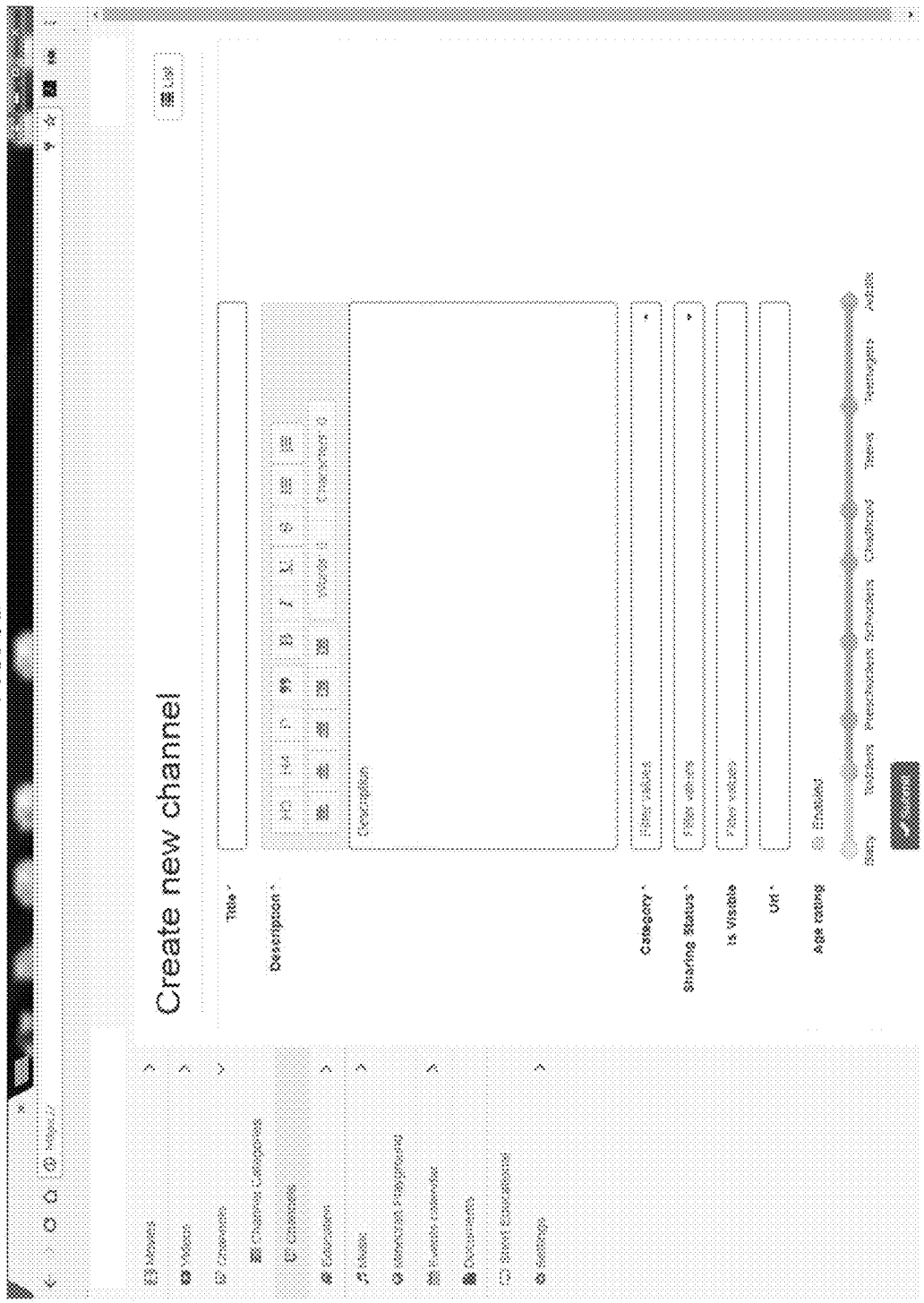

FIG. 9D shows details of an example local admin user interface for creating a new channel. The local administrator inputs a title, a description (which can also be formatted), selects a category, a sharing status, visibility of the channel, a URL associated with the channel, and an age rating. FIG. 9D also shows a button for the local administrator to view a list of channels.

Figure 10A:
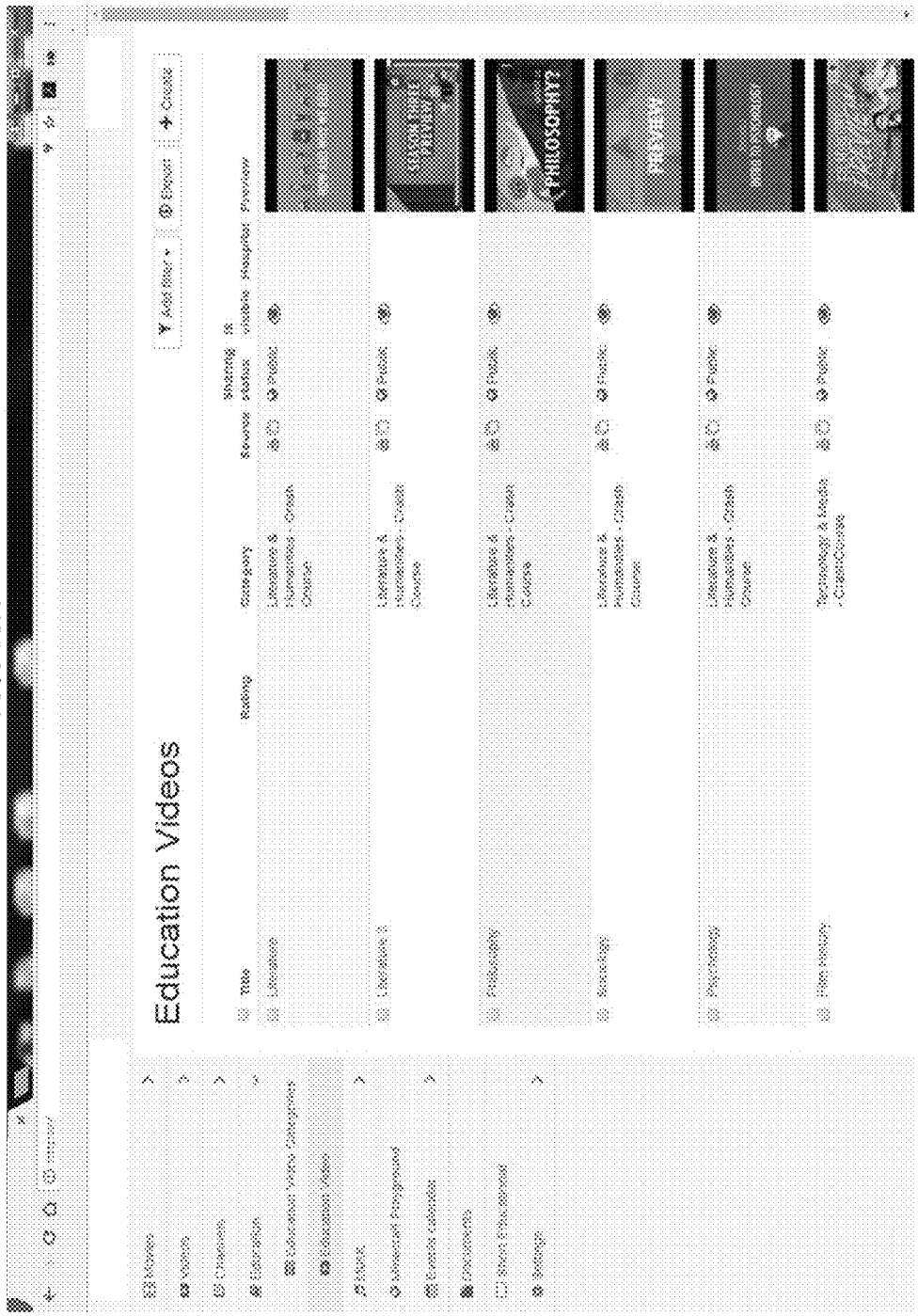
FIGS. 10A-10C are screen shots depicting embodiments of example local admin user interfaces associated with the Education category.
Figure 10B:
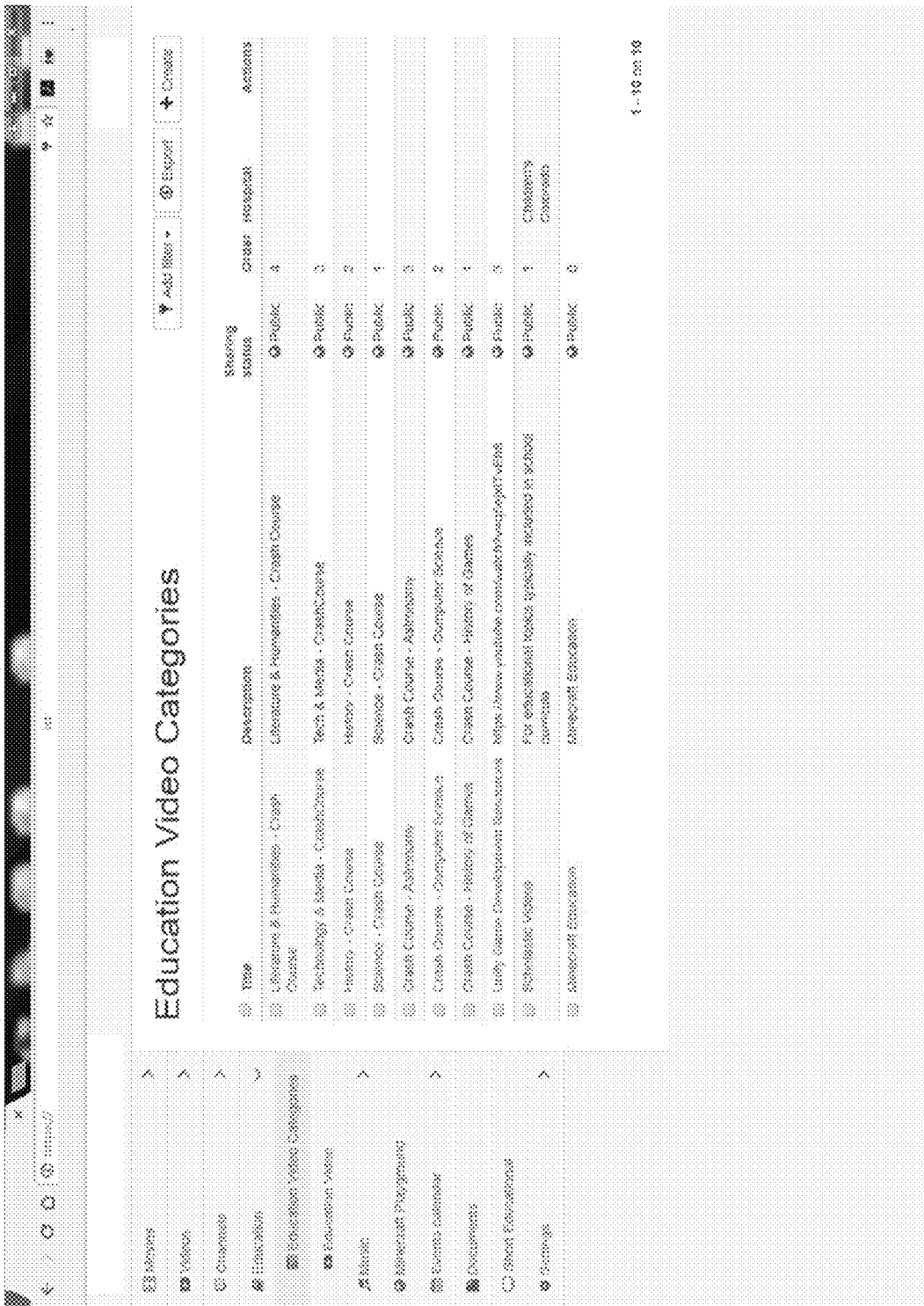
Figure 10C:
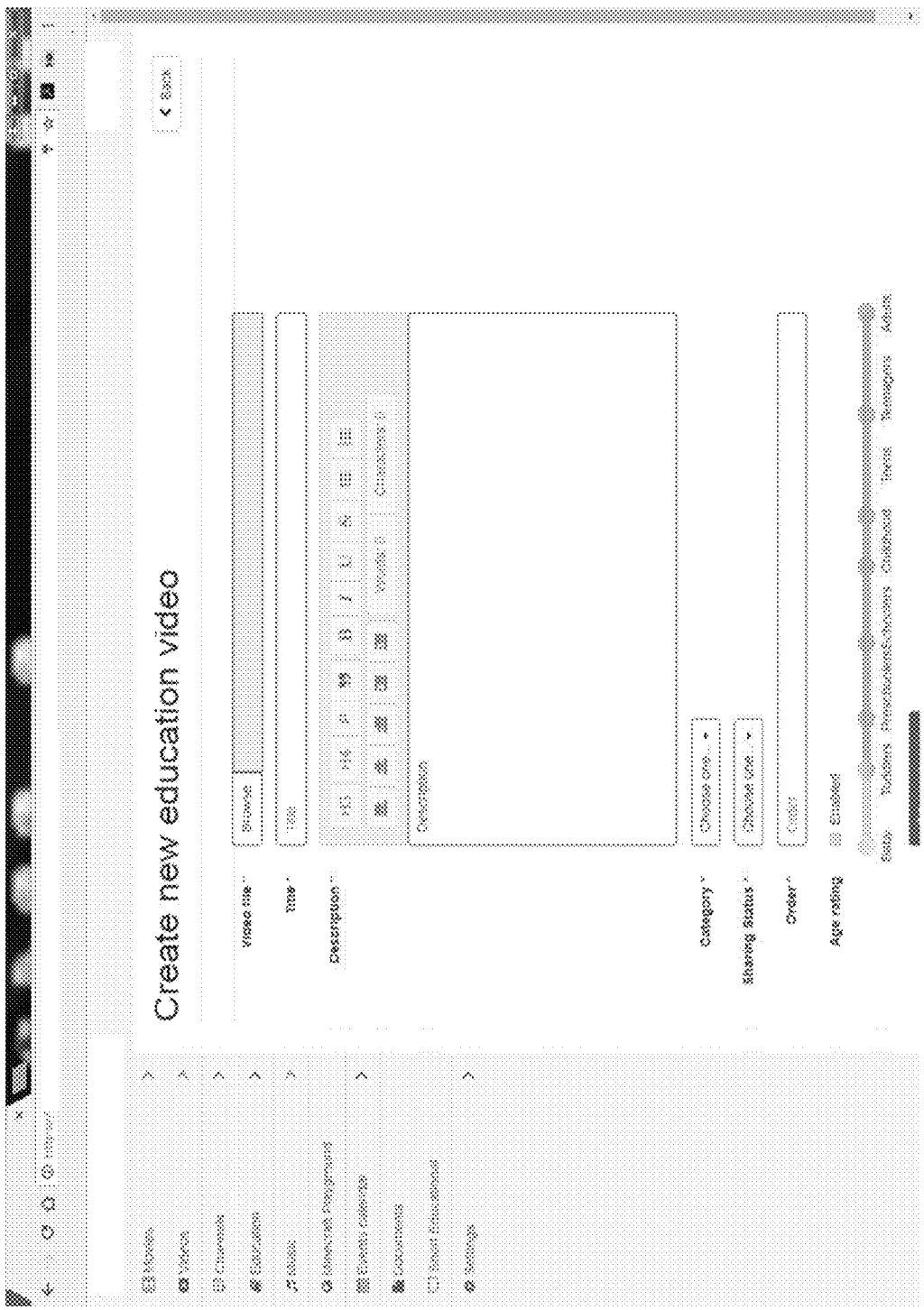

FIGS. 10A-10C are screen shots depicting embodiments of example local admin user interfaces associated with the Education category. The user interfaces could also be used by a super admin.

In FIG. 10A, the list of education videos currently available on the system is displayed in the main section. For each item, a title, a rating, a category, a source, a sharing status, visibility, associated entity such as for example a hospital, and a preview may be available. As seen in the example of FIG. 10A, a user rating may not yet be available for different items. For category, some examples are literature & humanities—crash course, technology & media—crash course, and so forth. The source of the educational video may be an uploaded file, in some examples. The sharing status of an item may be set to public, private or custom, in different examples. The visibility of the item may also be set. If the item has been created by an entity, an indication of the entity may be included. Finally, a preview including a short clip of the item may be available. Also shown in FIG. 10A are buttons for the local administrator to add filters to the education video files, as well as to export the education video files.

FIG. 10B shows more details of an example interface on how the local admin user may add categories of education videos to be made available for education video items uploaded. For each category added, in addition to a title and description of the category, a sharing status and an order may be assigned to the category. In addition, as in FIG. 10A, If the item has been created by an entity, an indication of the entity may be included. Finally, actions associated with the category can also be added. Also shown in FIG. 10B are buttons for the local administrator to add filters to the education video categories, as well as to export the education video categories.

FIG. 10C shows an example user interface displayed to the local administrator user for creating a new education video. For a digital file to be uploaded, the local administrator selects the video file from a browseable directory, then inputs a title, a description (which can also be formatted), selects a category, a sharing status, an order and an age rating.

FIGS. 11A-11D are screen shots depicting embodiments of example local admin user interfaces associated with the Music category. The music category is sub-divided into video and audio. The user interfaces could also be used by a super admin.

Figure 11A:
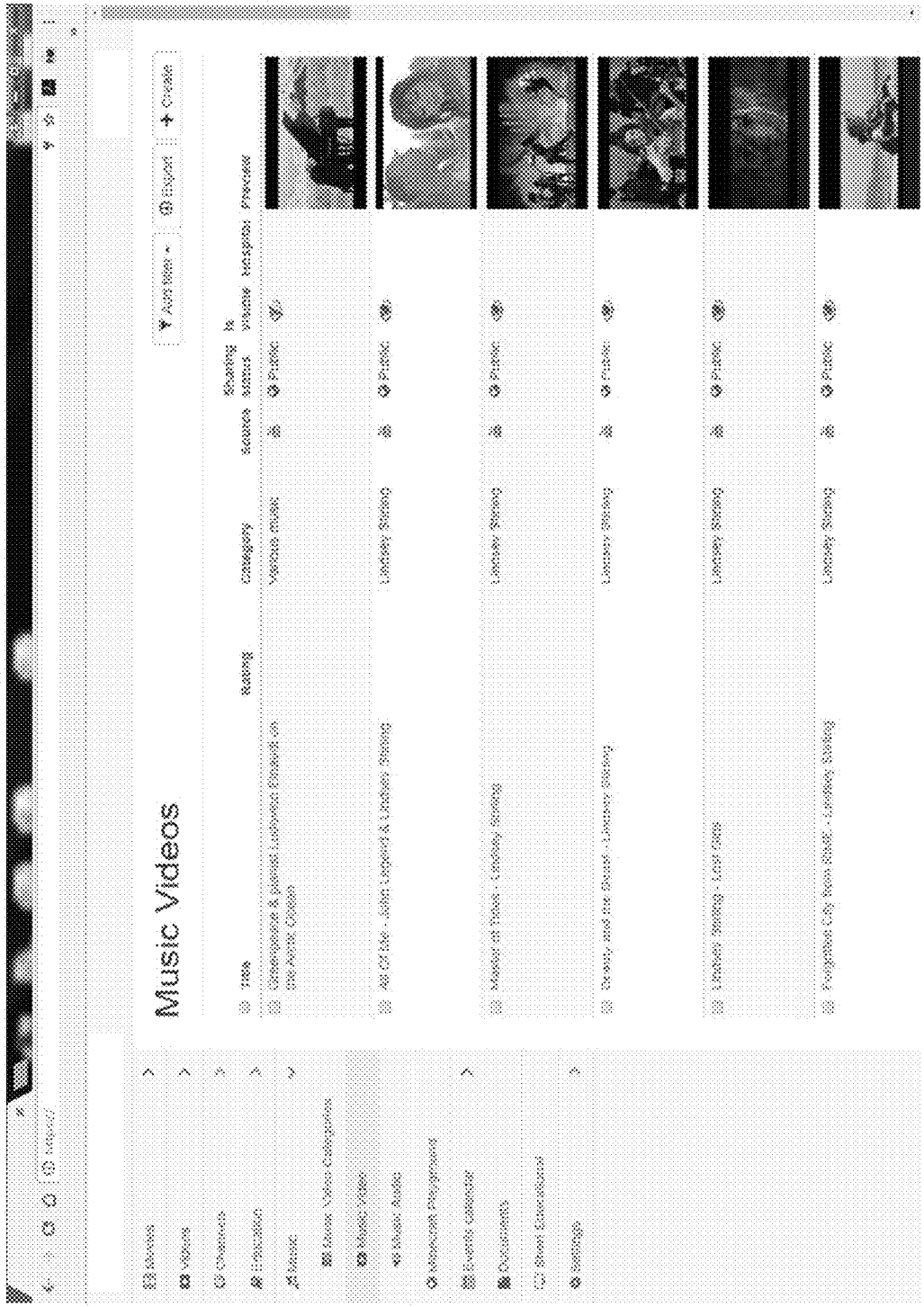
FIGS. 11A-11D are screen shots depicting embodiments of example local admin user interfaces associated with the Music category.

In FIG. 11A, the list of music videos currently available on the system is displayed in the main section. For each item, a title, a rating, a category, a source, a sharing status, visibility, associated entity such as for example a hospital, and a preview may be available. As seen in the example of FIG. 11A, a user rating may not yet be available for different items. For category, some examples are various music, artist names, and so forth. The source of the music video may be YouTube, or an uploaded file, in some examples. The sharing status of an item may be set to public, private or custom, in different examples. The visibility of the item may also be set. If the item has been created by an entity, an indication of the entity may be included. Finally, a preview including a short clip of the music video may be available. Also shown in FIG. 11A are buttons for the local administrator to add filters to the music video files, as well as to export the music video files.

Figure 11B:
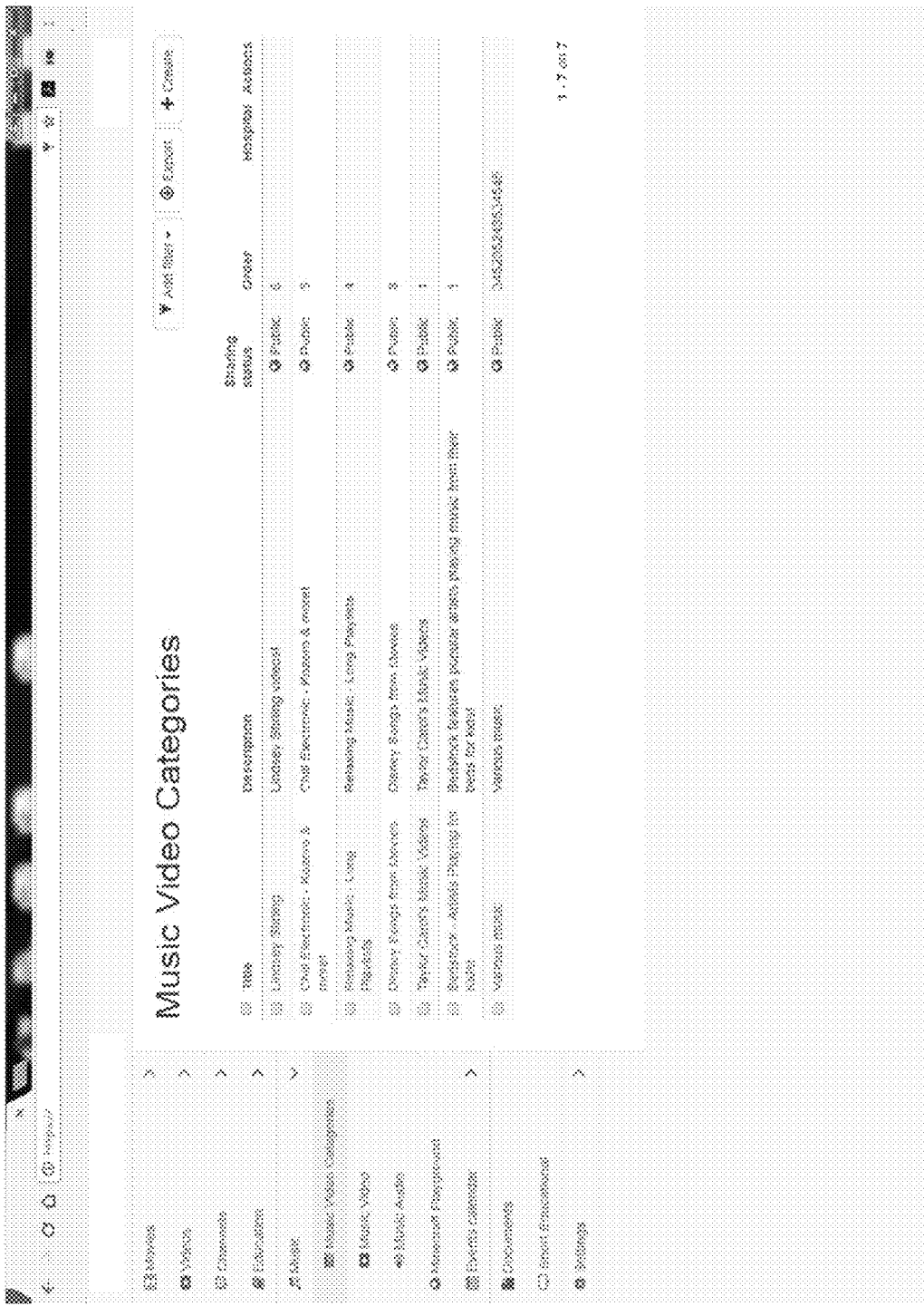

FIG. 11B shows an example interface of music video categories available for music video items uploaded. For each category, in addition to a title and description of the category, a sharing status and an order may be assigned to the category. In addition, as in FIG. 11A, if the item has been created by an entity, an indication of the entity may be included. Finally, actions associated with the category can also be added. Also shown in FIG. 11B are buttons for the local administrator to add filters to the music video categories, as well as to export the music video categories.

Figure 11C:
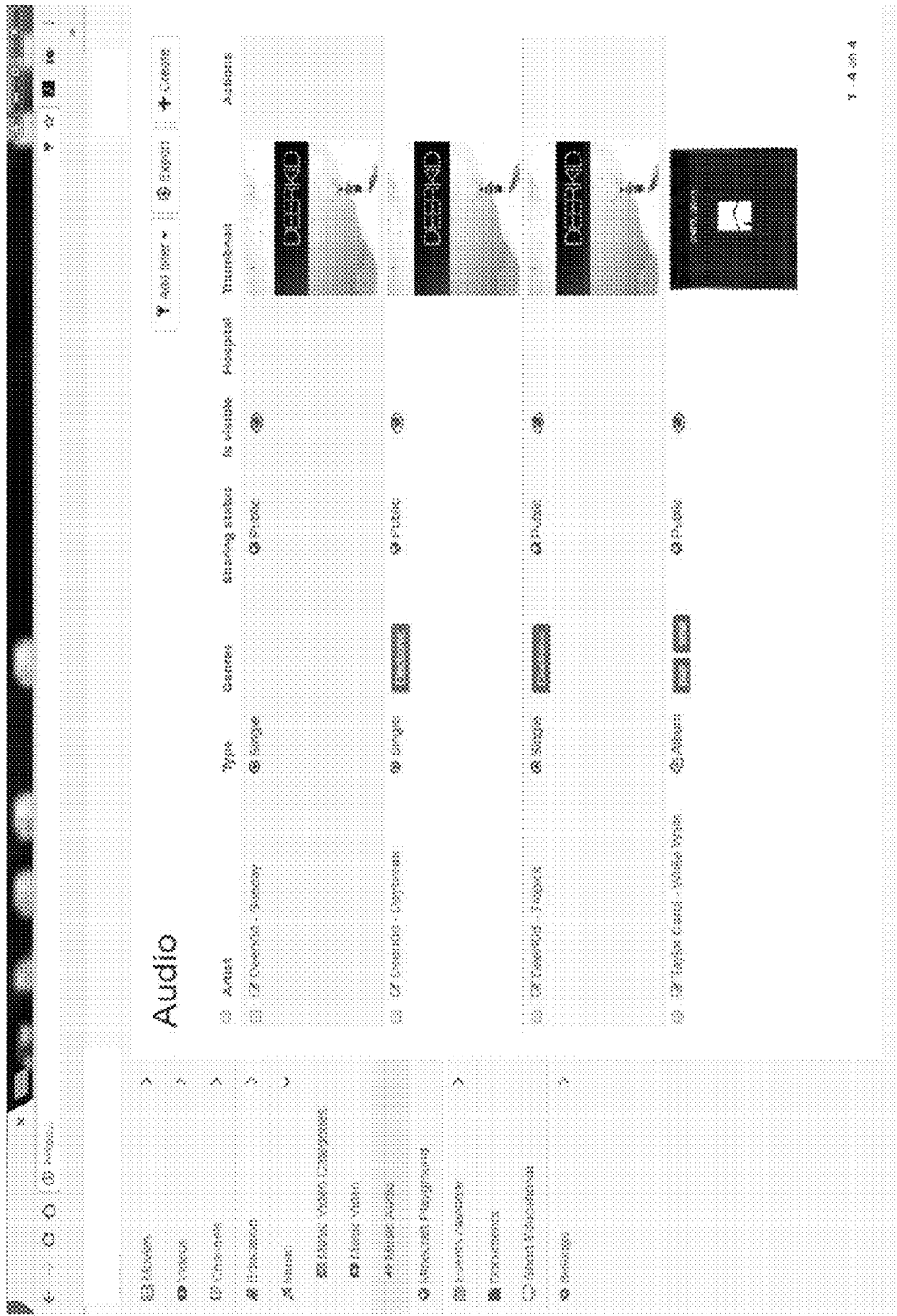

In FIG. 11C, the list of music audio currently available on the system is displayed in the main section. For each item added, an artist, a type, one or more genres, a sharing status, visibility, entity, thumbnail and actions are listed. As seen in the example of FIG. 11C, for type, the audio may be designated as a single or an album, the genres include, for example, electronic, pop, soul, and the like. As in FIG. 11A, if the item has been created by an entity, an indication of the entity may be included. A thumbnail to be displayed in conjunction with the music audio file may also be selected, and associated actions as well. Also shown in FIG. 11C are buttons for the local administrator to add filters to the music audio files, as well as to export the music audio files.

Figure 11D:
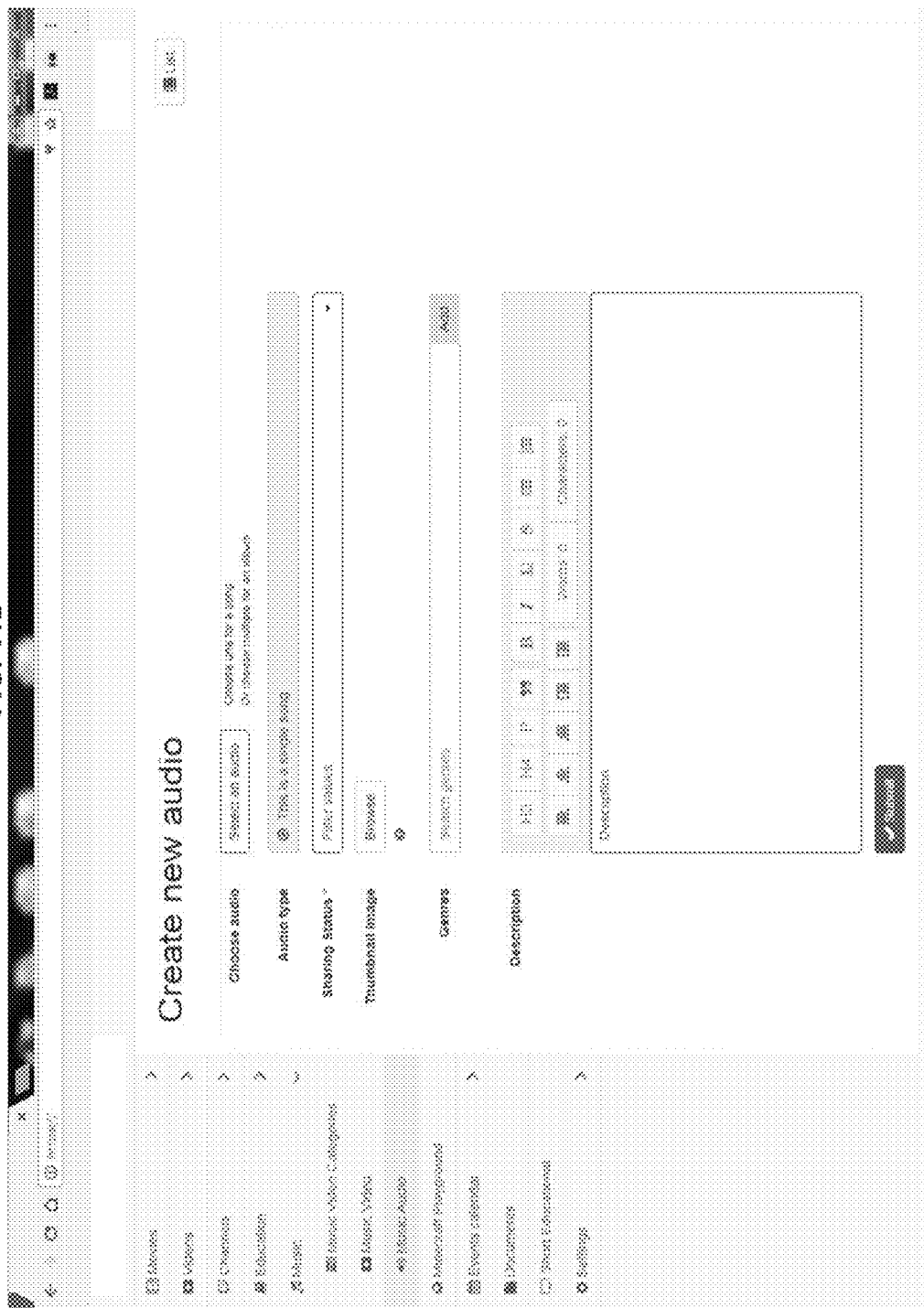

FIG. 11D shows an example user interface displayed to the local administrator user for creating a new audio file. The local administrator selects whether the audio is a song or an album. Then, a sharing status and a thumbnail image may be selected, as well as one or more genres and a description. FIG. 11D also shows a button for the local administrator to view a list of audio files.

Figure 12A:
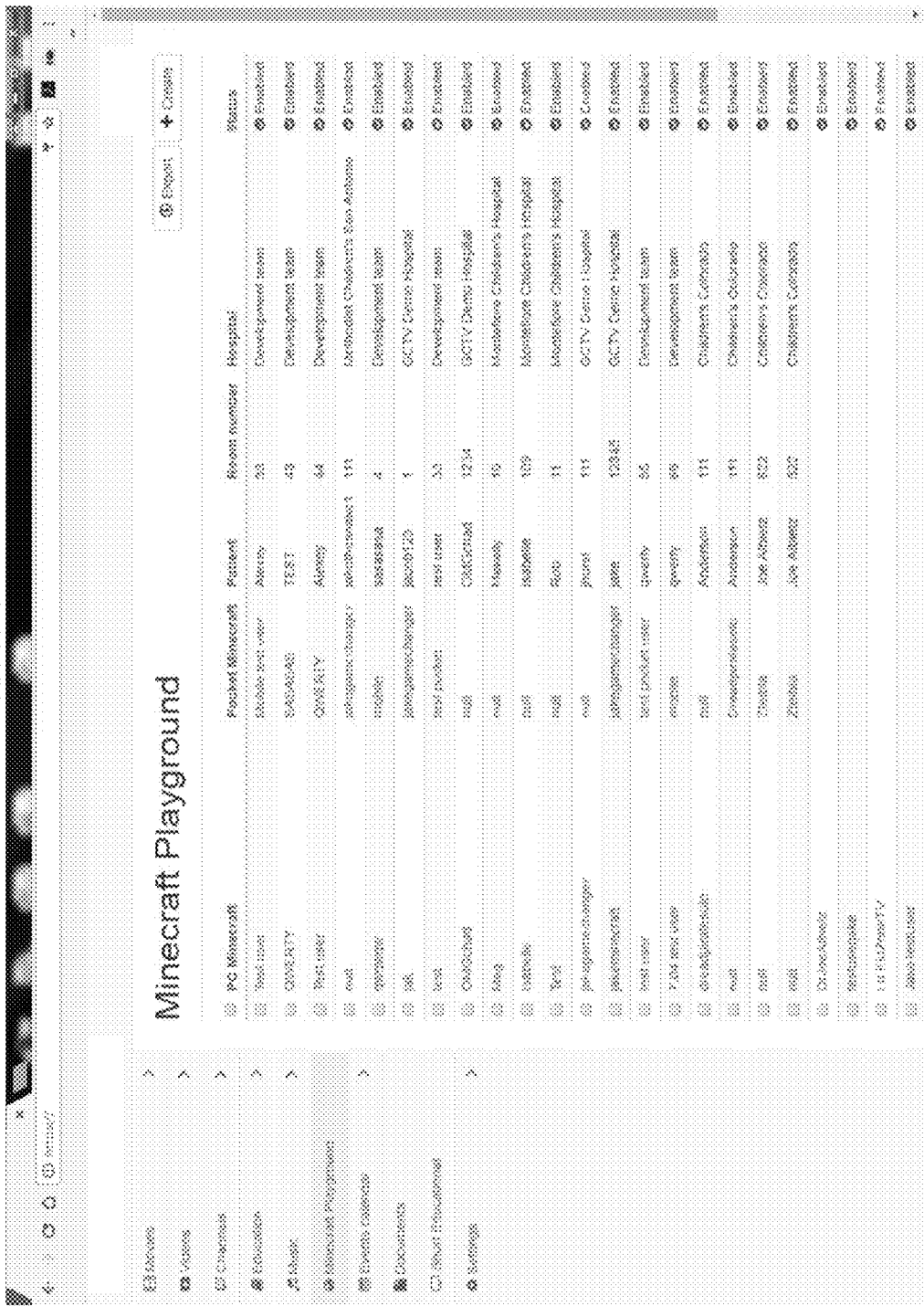
FIGS. 12A-12B are screen shots depicting embodiments of example local admin user interfaces associated with the Minecraft Playground category.
Figure 12B:
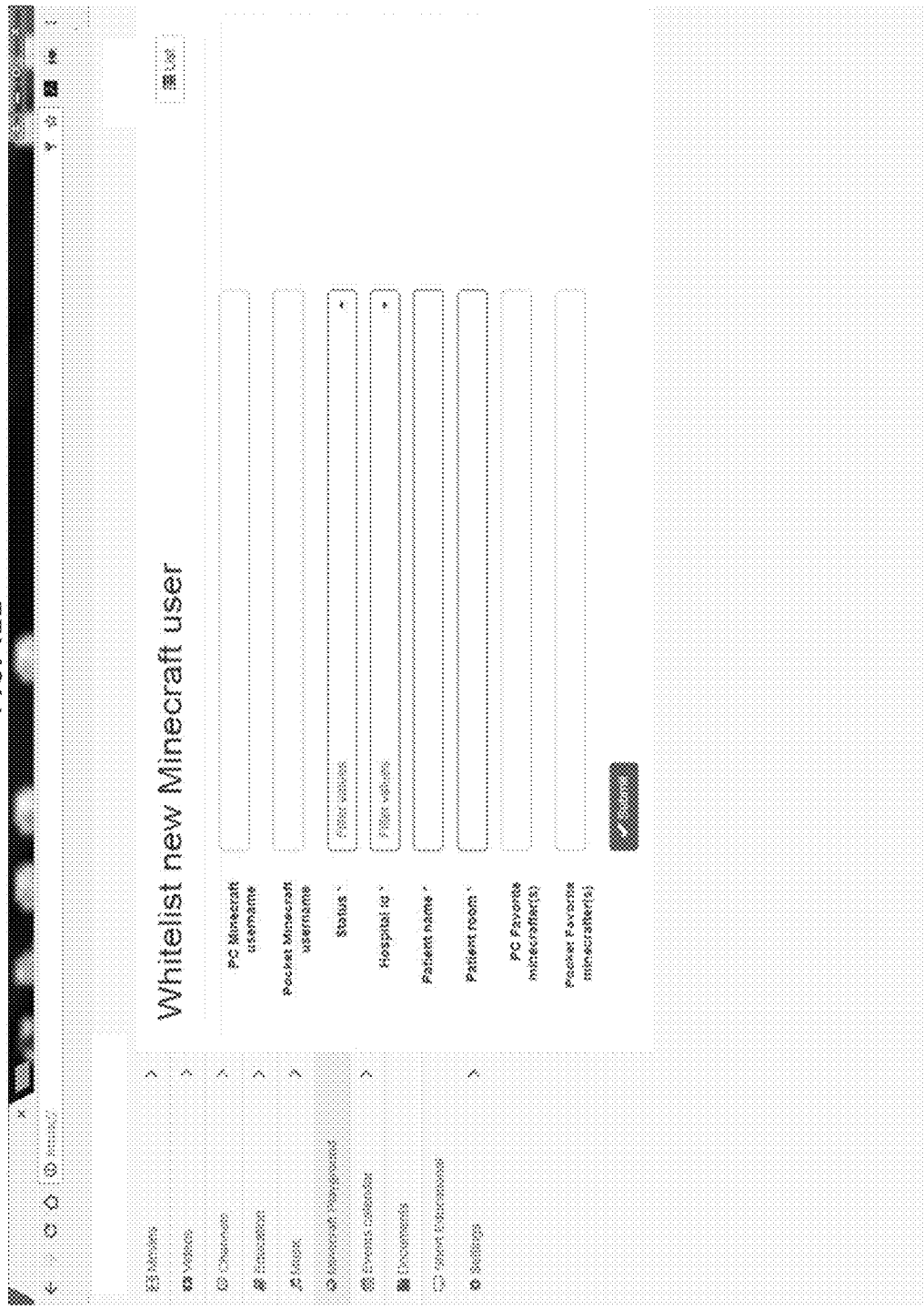

FIGS. 12A-12B are screen shots depicting embodiments of example local admin user interfaces associated with the Minecraft Playground category. The user interfaces could also be used by a super admin.

In FIG. 12A, the main section shows a list of users with their associated PC Minecraft name, Pocket Minecraft name, if applicable, patient name, room number, hospital team, and status. Also shown in FIG. 12A is a button for the local administrator to export the list of users.

In FIG. 12B, the fields presented to the local administrator for whitelisting a new Minecraft user are shown. The fields include the user's PC Minecraft username, Pocket Minecraft username, if applicable, the status, the hospital identifier, the patient's name, the patient's room number in the hospital, the user's favorite PC Minecrafters, and the user's favorite Pocket Minecrafters. FIG. 12B also shows a button for the local administrator to view a list of whitelisted Minecraft users.

FIGS. 13A-13D are screen shots depicting embodiments of example local admin user interfaces associated with the Events/Calendar. The user interfaces could also be used by a super admin.

Figure 13A:
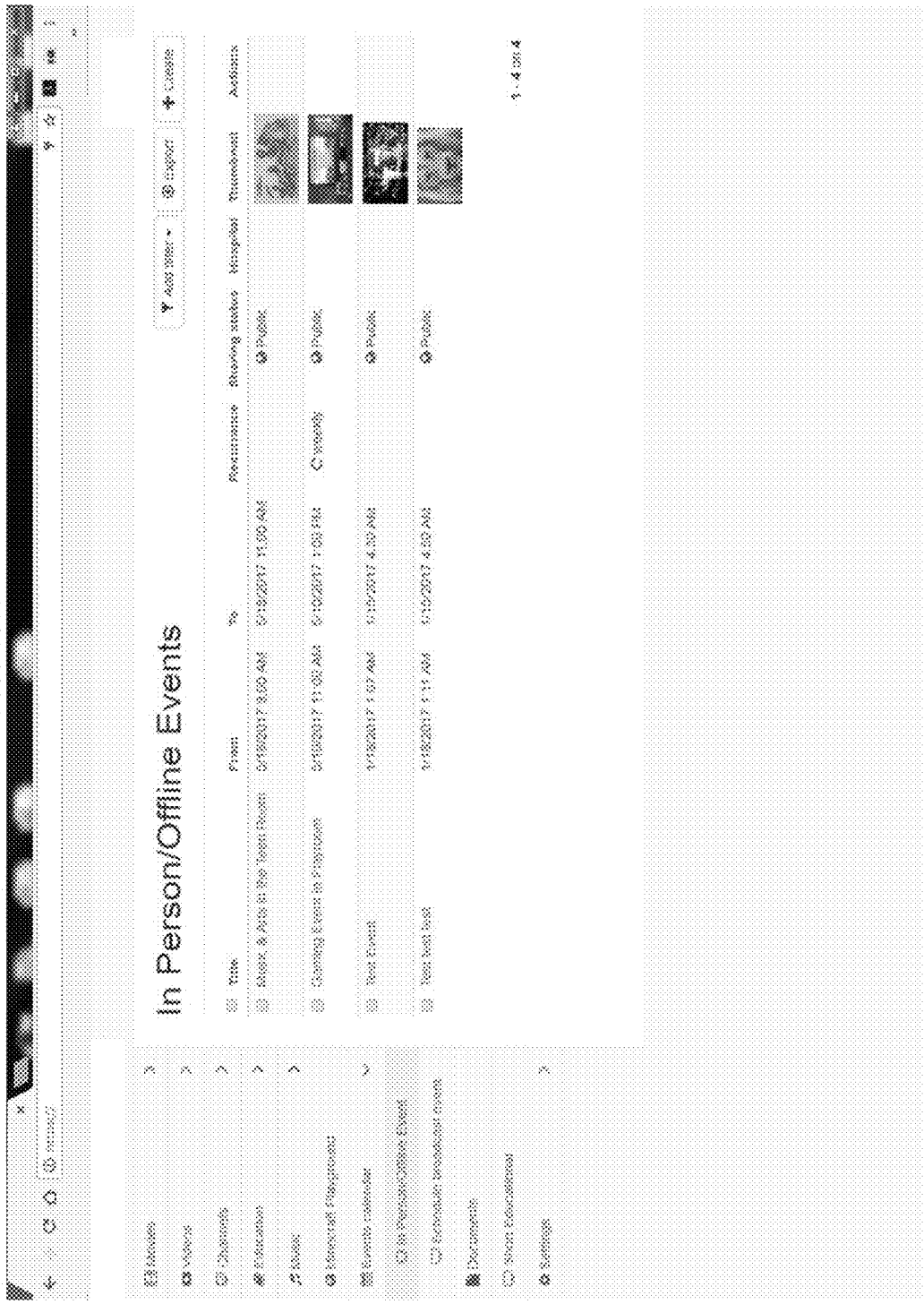

FIG. 13A shows that currently scheduled person/offline events. For each such event, displayed is a title, a start and end time, a recurrence frequency, a sharing status, an entity, a thumbnail, and actions associated with the event. Also shown in FIG. 13A are buttons for the local administrator to add filters to the list of events, and to export the list of events.

Figure 13B:
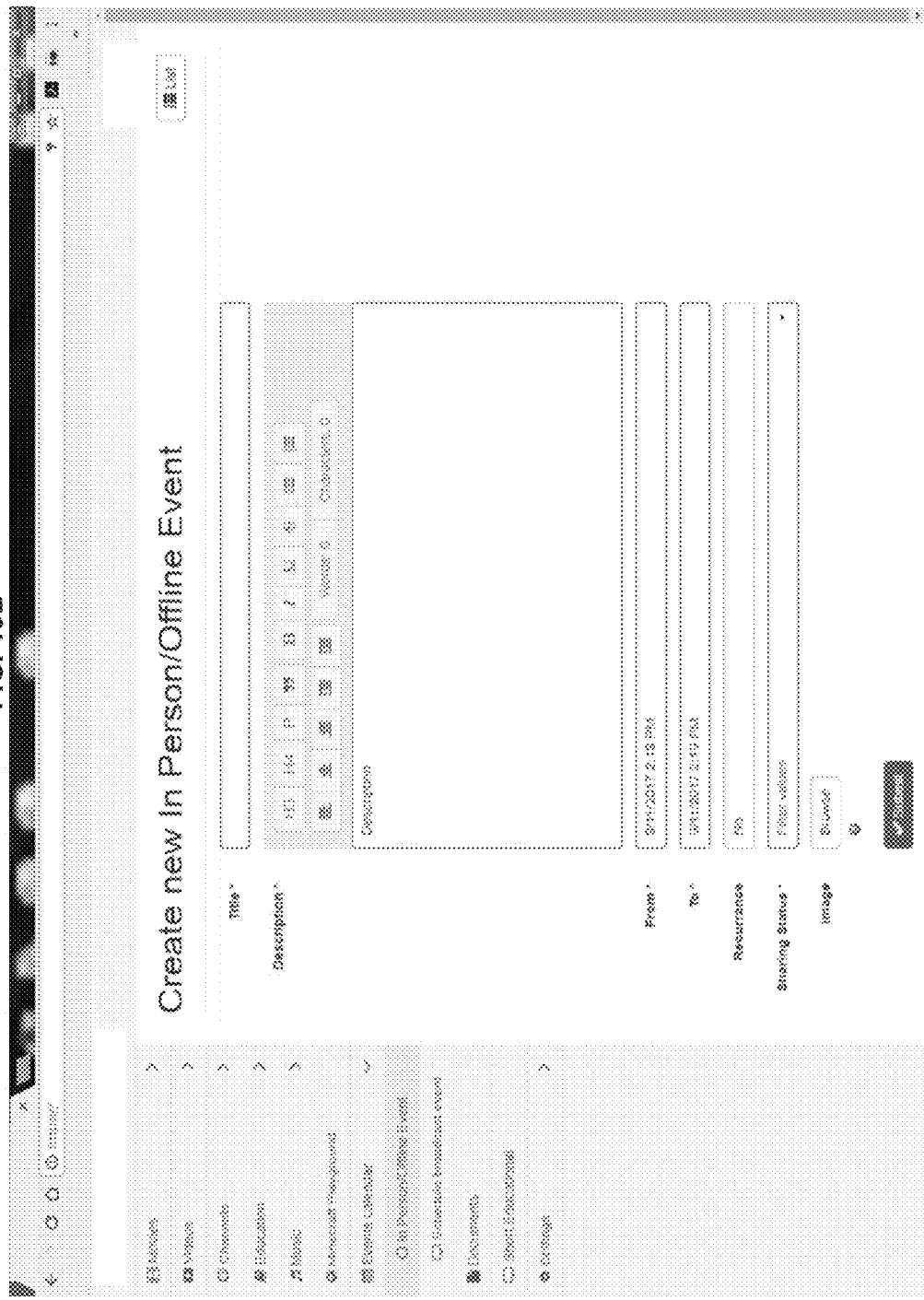

FIG. 13B shows that the local administrator has the capability to add in person/offline events. For each such event, the local administrator may input a title, a description, a start and end time, a recurrence frequency, a sharing status, and an image to use as a thumbnail in association with the event. FIG. 13B also shows a button for the local administrator to view a list of in person/offline events.

Figure 13C:
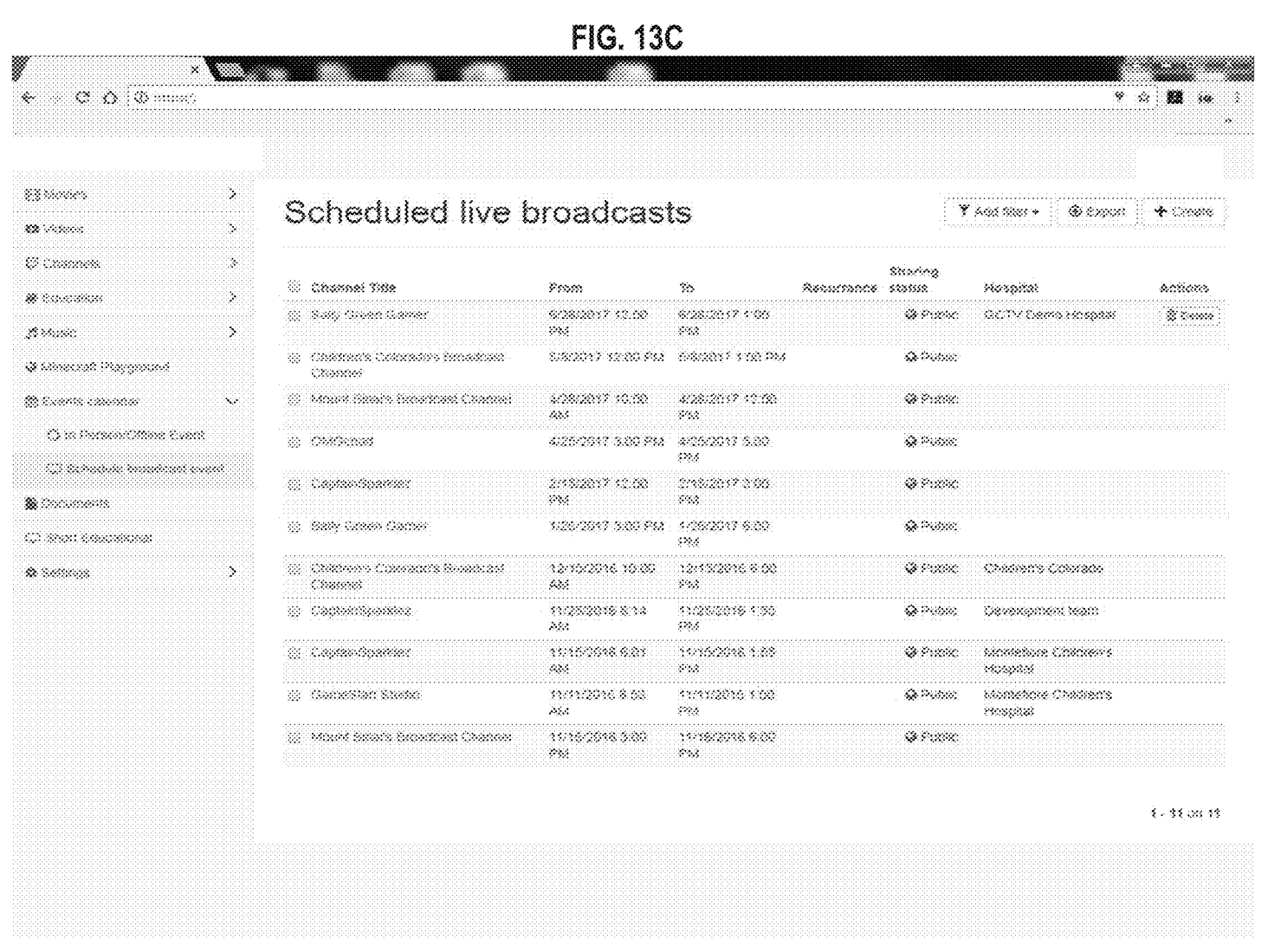

FIG. 13C shows that the currently scheduled live broadcasts. For each such scheduled live broadcast, there is a channel title, a start and end time, a recurrence frequency, a sharing status, an entity, and actions associated with the scheduled broadcast, such as to delete the broadcast, for example. Also shown in FIG. 13C are buttons for the local administrator to add filters to the list of scheduled broadcasts, and to export the list of scheduled broadcasts.

Figure 13D:
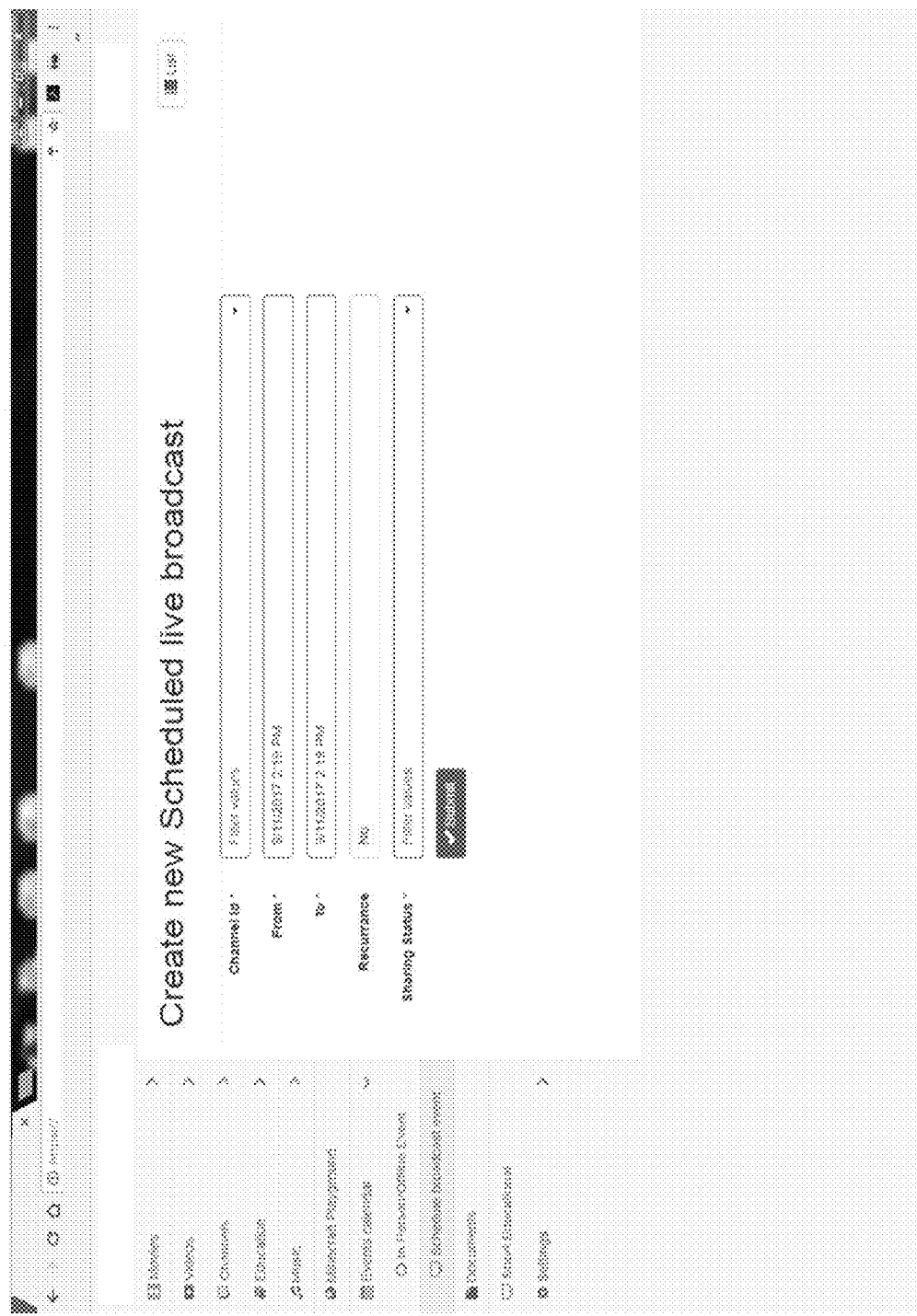

FIG. 13D shows that the local administrator has the capability to schedule live broadcasts. For each such scheduled live broadcast, the local administrator may input a channel identifier, a start and end time, a recurrence frequency and a sharing status. FIG. 13D also shows a button for the local administrator to view a list of scheduled live broadcasts.

Figure 14A:
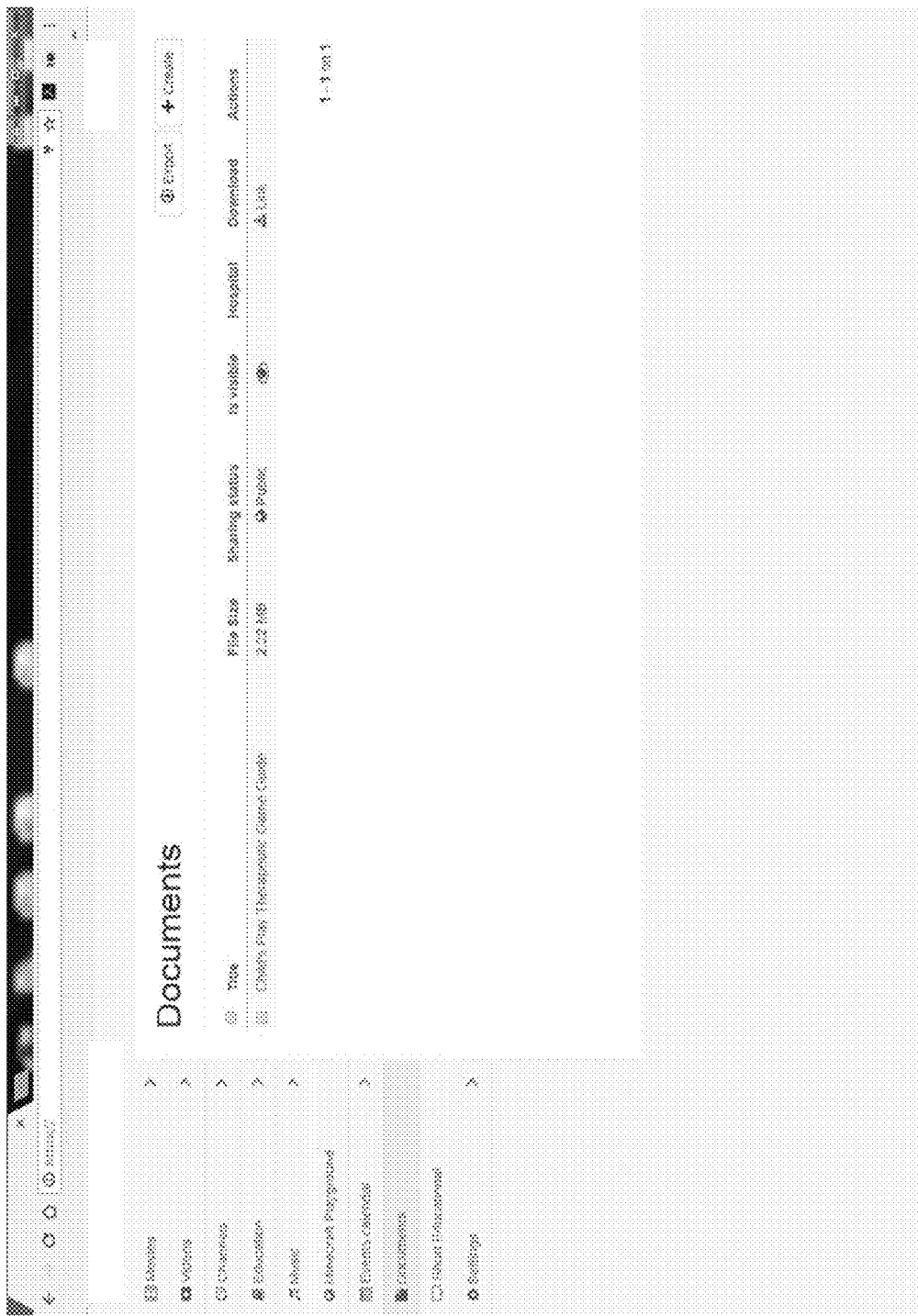
FIGS. 14A-14B are screen shots depicting embodiments of example local admin user interfaces associated with the Documents category.
Figure 14B:
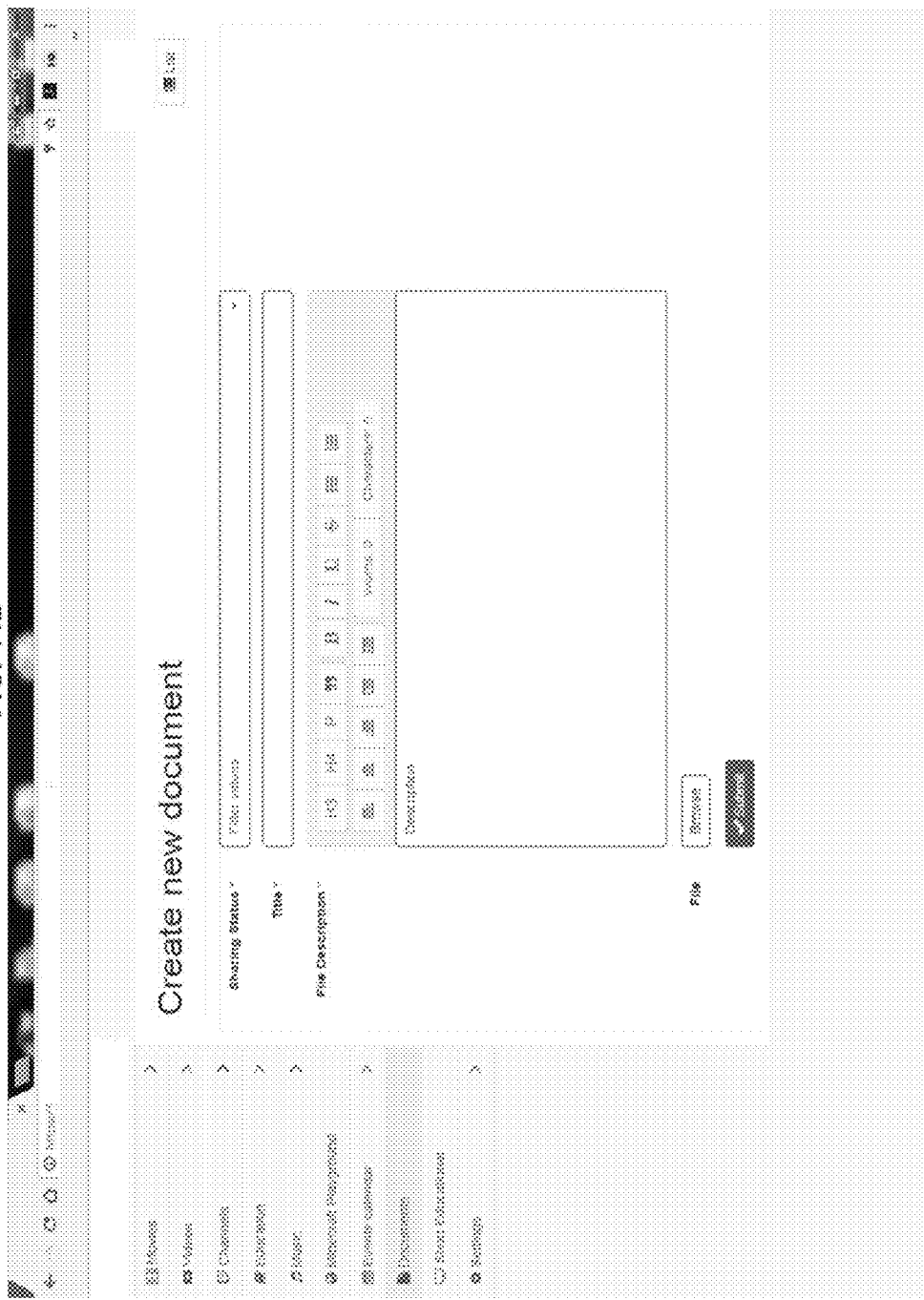

FIGS. 14A-14B are screen shots depicting embodiments of example local admin user interfaces associated with the Documents category. The user interfaces could also be used by a super admin.

FIG. 14A shows a list of document currently available. As shown in FIG. 14A, each document has a title, a file size, a sharing status, a visibility indicator, an entity, a downloading choice, and associated actions. Also shown in FIG. 14A is a button for the local administrator to export the documents.

FIG. 14B shows that the local administrator has the capability to create new documents. For each such document, the local administrator may input a sharing status, a title, a file description, and upload a file from a browseable directory. FIG. 14B also shows a button for the local administrator to view a list of documents.

Figure 15A:
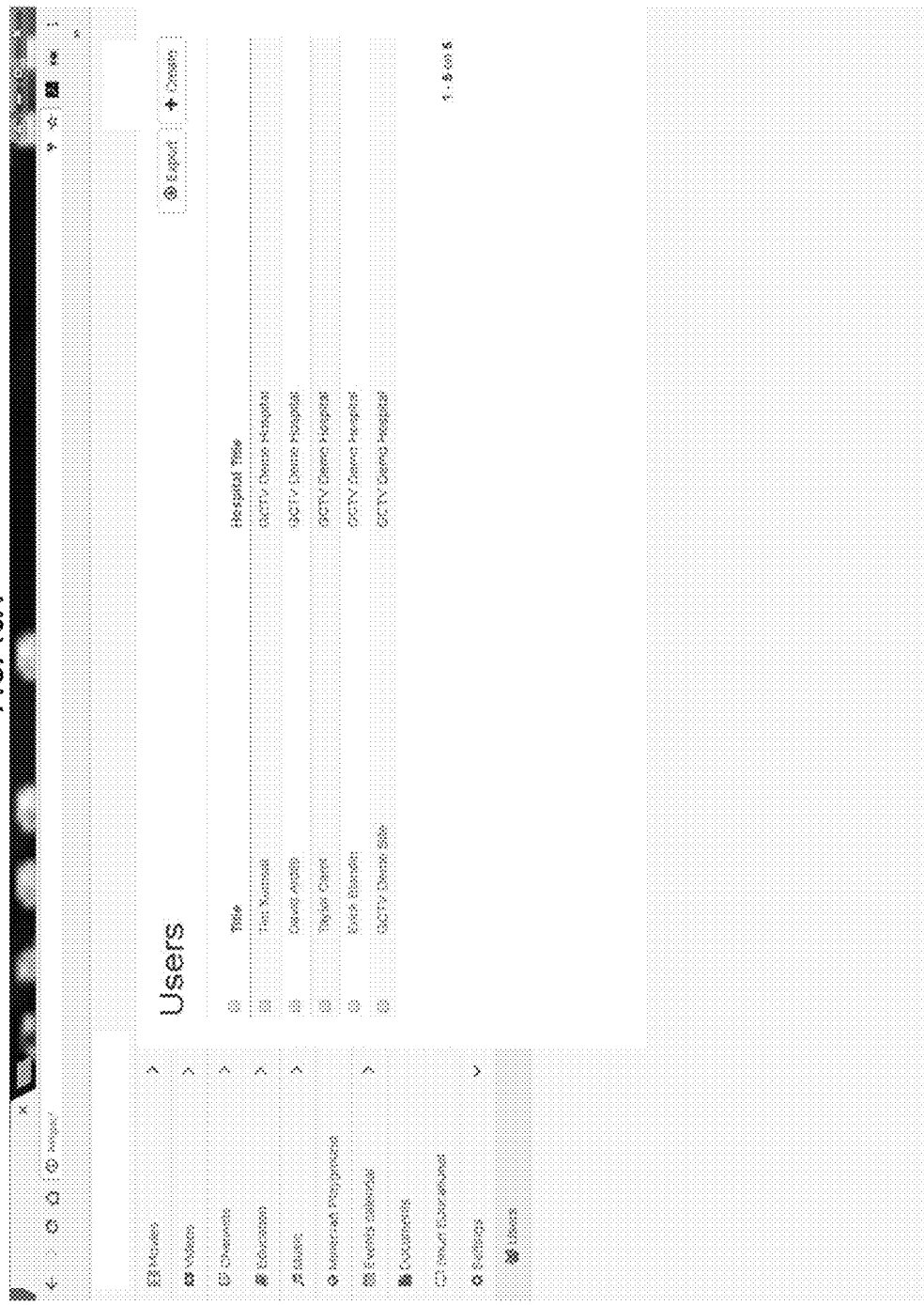
FIGS. 15A-15B are screen shots depicting embodiments of example local admin user interfaces associated with the Users category.
Figure 15B:
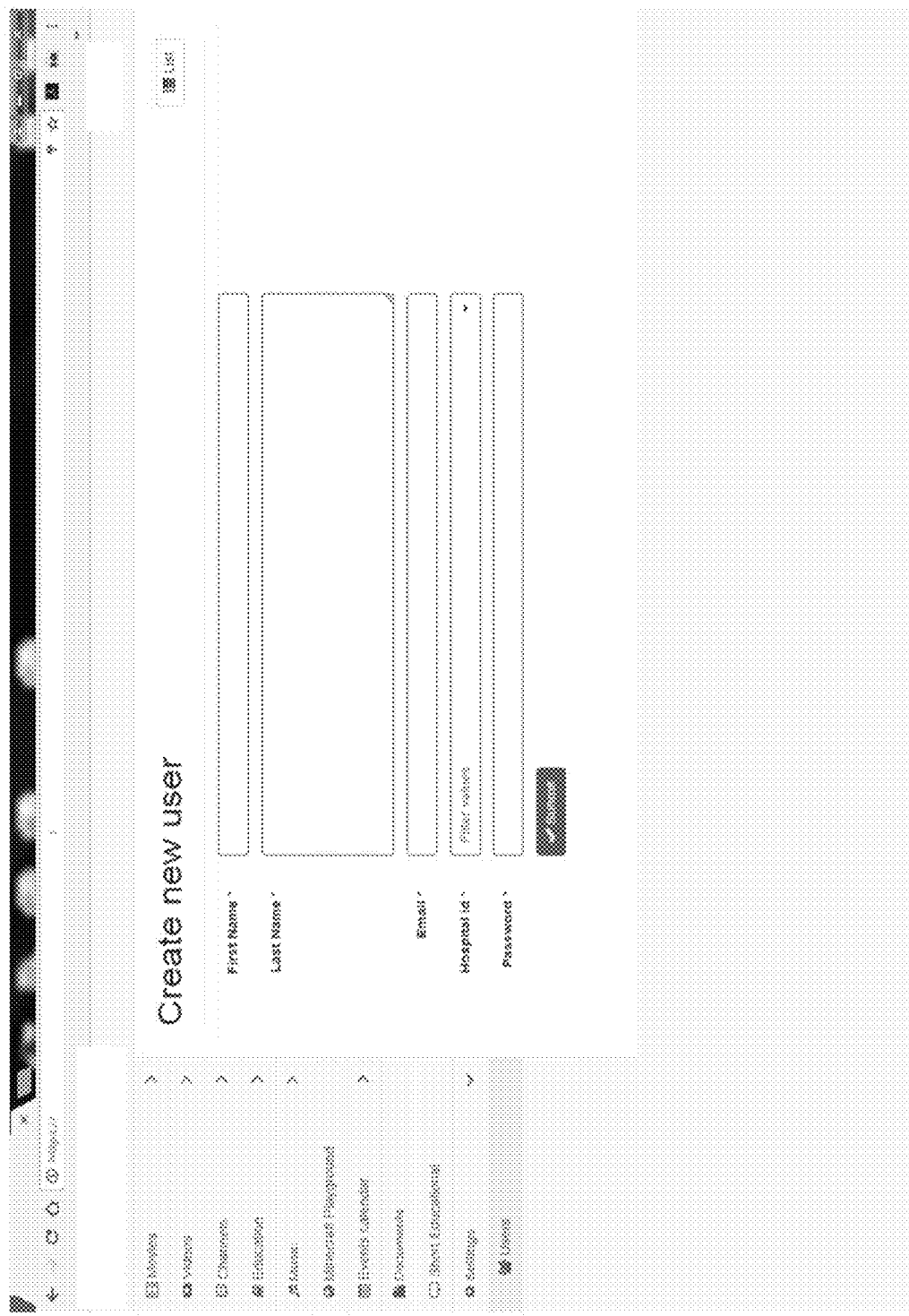

FIGS. 15A-15B are screen shots depicting embodiments of example local admin user interfaces associated with the Users category. The user interfaces could also be used by a super admin.

FIG. 15A, shows a list of users currently authorized to access the MSBP. As shown in FIG. 15A, each user has a title including their name, and a title within their entity. Also shown in FIG. 15A is a button for the local administrator to export the list of users.

FIG. 15B shows that the local administrator has the capability to create new users. For each such user, the local administrator may input a first and last name, an email address, a hospital identifier and a password. FIG. 15B also shows a button for the local administrator to view a list of users.

Figure 16A:
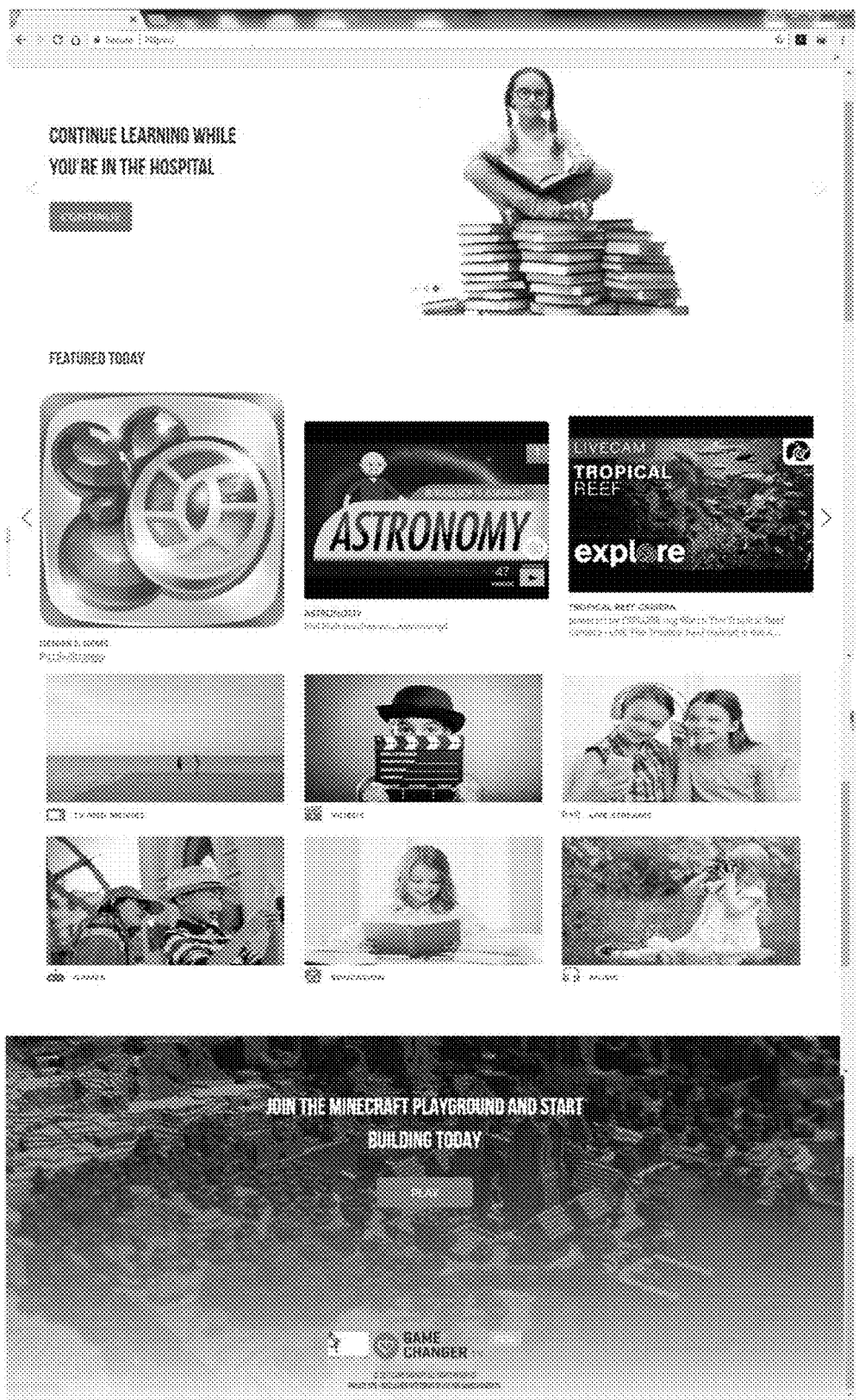
FIGS. 16A-16B are screen shots depicting embodiments of example user interfaces presented to an end user.
Figure 16B:
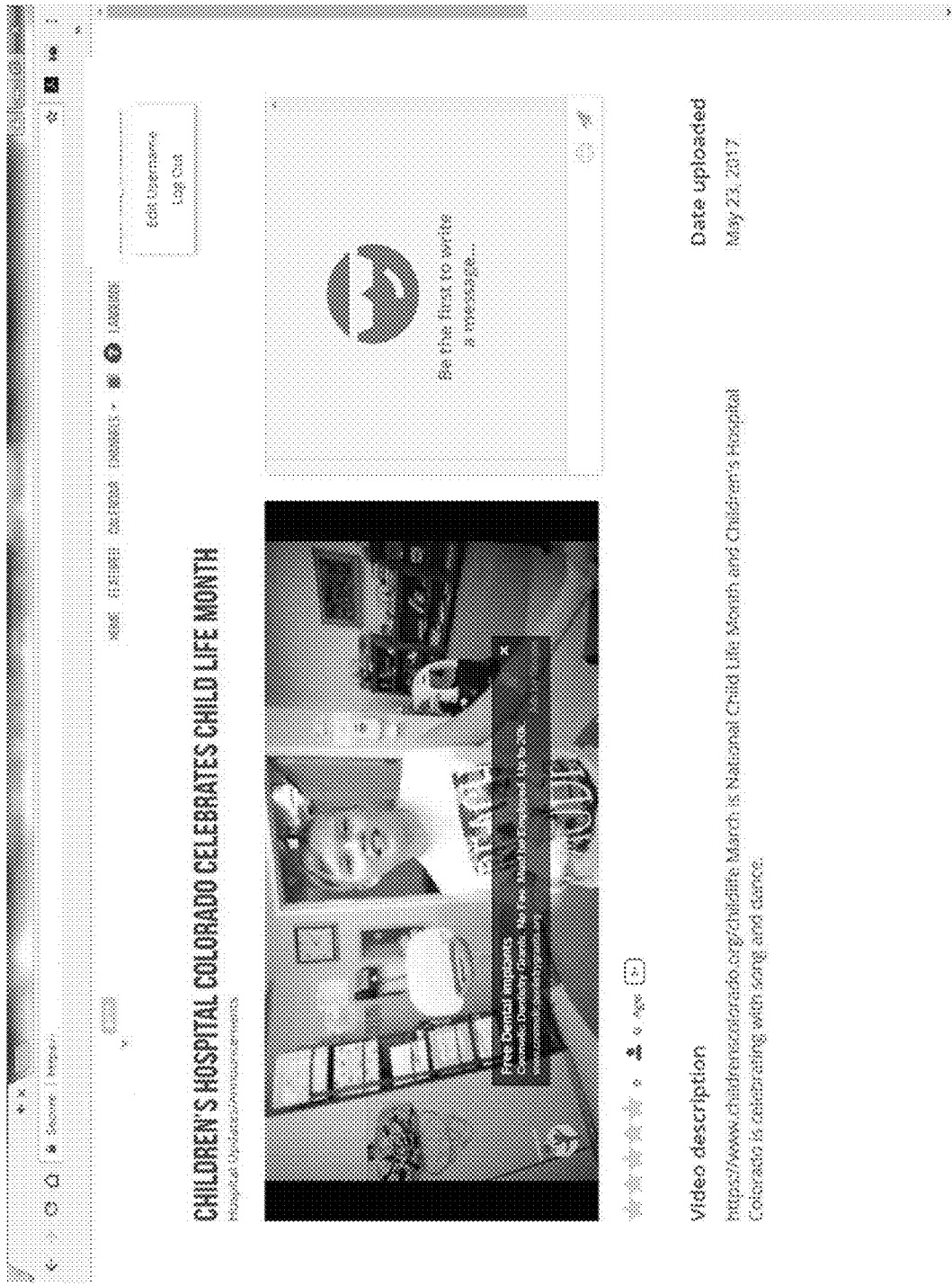

FIGS. 16A-16B are screen shots depicting embodiments of example user interfaces presented to an end user. The user interfaces could also be used by a super admin.

FIG. 16A is a screen shot depicting an embodiment of an example user interface or high-level dashboard presented to an end user. As seen in FIG. 16A, an end user, such as for example a hospital patient, after having been given access to the MSBP, may be presented with a dashboard such as the example shown, including a top section with a rotating message, a section of content from the different categories selected as featured for the day, as well as the entire content available to the user under the different categories of channels for TV and movies, videos, live streams, games, education, music and a Minecraft playground.

FIG. 16B is a screen shot depicting an embodiment of an example user interface presented to an end user after selection of a video to view. As seen in FIG. 16B, the video is displayed in an embedded video player, and the user is provided with the video's title, an option to rate the video, a recommended age for viewing the video, a video description, the date when the video was uploaded to the system, and an option to write a message.

VIII. Computing System

Figure 17:
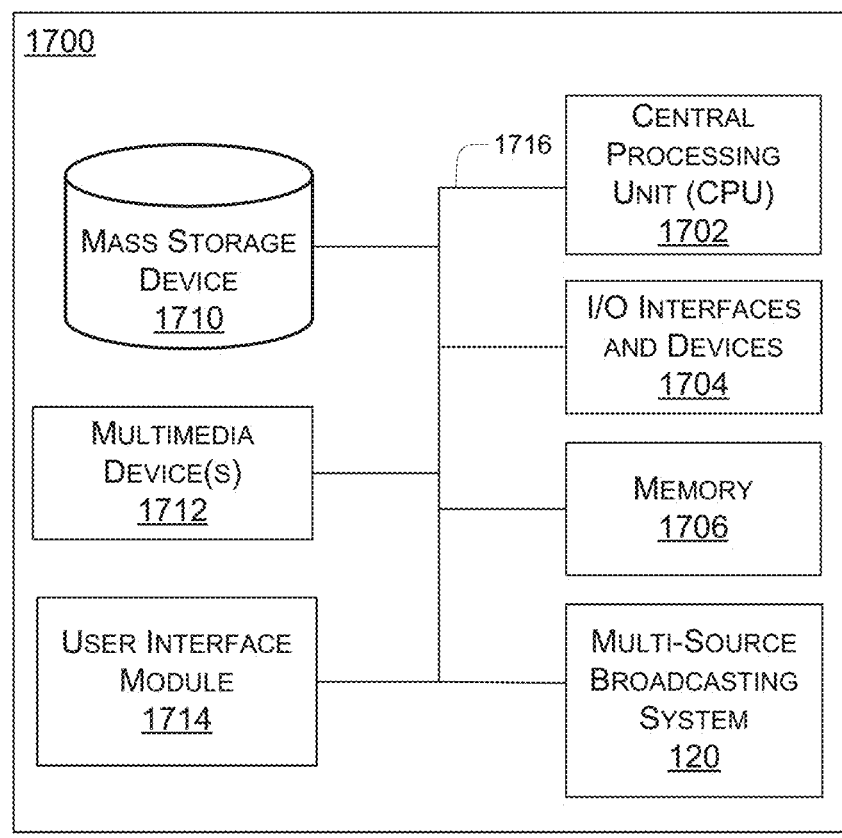
FIG. 17 is a block diagram showing one embodiment of a Cloud-Based Multi-Source Broadcasting System in communication with a network and various systems, such as websites and/or online services.

In some embodiments, any of the systems, servers, or components referenced herein may take the form of a computing system as shown in FIG. 17 which illustrates a block diagram of one embodiment of a type of computing system 1700. The exemplary computing system 1700 includes a central processing unit ("CPU") 1702, which may include one or more conventional microprocessors that comprise hardware circuitry configured to read computer-executable instructions and to cause portions of the hardware circuitry to perform operations specifically defined by the circuitry. The computing system 1700 may also include a memory 1706, such as random access memory ("RAM")

for temporary storage of information and read only memory ("ROM") for permanent storage of information, which may store some or all of the computer-executable instructions prior to being communicated to the processor for execution. The computing system may also include one or more mass storage devices 1710, such as a hard drive, diskette, CD-ROM drive, a DVD-ROM drive, or optical media storage device, that may store the computer-executable instructions for relatively long periods, including, for example, when the computer system is turned off. Typically, the modules of the computing system are connected using a standard based bus system. In different embodiments, the standard based bus system could be Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system may be combined into fewer components and modules or further separated into additional components and modules. The illustrated structure of the computing system 1700 may also be used to implement other computing components and systems described in the disclosure. It is recognized that the components discussed herein may be implemented as different types of components. For example, a server may be implemented as a module executing on a computing device, a mainframe may be implemented on a non-mainframe server, a server or other computing device may be implemented using two or more computing devices, and/or various components could be implemented using a single computing device.

Also, it is recognized that a variety of embodiments may be used and that some of the blocks in FIG. 17 may be combined, separated into sub-blocks, and rearranged to run in a different order and/or in parallel.

In one embodiment, the computing system 1700 is a server, a workstation, a mainframe, a minicomputer. In other embodiments, the system may be a personal computer that is IBM, Macintosh, or Linux/Unix compatible, a laptop computer, a tablet, a handheld device, a mobile phone, a smart phone, a smart watch, a personal digital assistant, a car system, a tablet or other user device. Servers may include a variety of servers such as database servers (for example, Oracle, DB2, Informix, Microsoft SQL Server, MySQL, or Ingres), application servers, data loader servers, or web servers. In addition, the servers may run a variety of software for data visualization, distributed file systems, distributed processing, web portals, enterprise workflow, form management, and so forth.

The computing system 1700 may be generally controlled and coordinated by operating system software, such as Windows 95, Windows 98, Windows NT, Windows 2000, Windows XP, Windows Vista, Windows 7, Windows 8, Windows 10, Unix, Linux, SunOS, Solaris, Maemo, MeeGo, BlackBerry Tablet OS, Android, webOS, Sugar, Symbian OS, MAC OS X, or iOS or other operating systems. In other embodiments, the computing system 802 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 1700 includes one or more commonly available input/output ("I/O") devices and interfaces 1704, such as a keyboard, mouse, touchpad, speaker, microphone, or printer. In one embodiment, the I/O devices and interfaces 1704 include one or more display device, such as a touchscreen, display or monitor, which allows the visual presentation of data to a user. More particularly, a display device provides for the presentation of GUIs, application software data, and multimedia presentations, for example. The central processing unit 1702 may be in communication with a display device that is configured to perform some of the functions defined by the computer-executable instructions. For example, some of the computer-executable instructions may define the operation of displaying to a display device, an image that is like one of the screen shots included in this application. The computing system may also include one or more multimedia devices 1712, such as speakers, video cards, graphics accelerators, and microphones, for example. A skilled artisan would appreciate that, in light of this disclosure, a system, including all hardware components, such as the central processing unit 1702, display device, memory 1706, and mass storage device 1710 that are necessary to perform the operations illustrated in this application, is within the scope of the disclosure.

In the embodiment of FIG. 17, the I/O devices and interfaces provide a communication interface to various external devices and systems. The computing system may be electronically coupled to a network, which comprises one or more of a LAN, WAN, the Internet, or cloud computing networks, for example, via a wired, wireless, or combination of wired and wireless, communication links. The network communicates with various systems or other systems via wired or wireless communication links, as well as various data sources.

Information may be provided to the computing system 1700 over the network from one or more data sources including, for example, external sources 110 or internal source information database 126. In addition to the sources that are illustrated in FIGS. 1A-1C, the network may communicate with other data sources or other computing devices. The data sources may include one or more internal or external data sources. In some embodiments, one or more of the databases or data sources may be implemented using an open-source cross-platform document-oriented database program, such as a Mongo dB, a relational database, such as IBM DB2, Sybase, Oracle, CodeBase and Microsoft® SQL Server as well as other types of databases such as, for example, a flat file database, an entity-relationship database, and object-oriented database, and/or a record-based database.

In the embodiment of FIG. 17, the computing system 1700 also includes a Cloud-Based Multi-Source Broadcasting System 120, which may be executed by the CPU 1702, to run one or more of the processes discussed herein. This system may include, by way of example, components, such as software components, object-oriented software components, class components, task components, processes, functions, attributes, procedures, subroutines, segments of program code, drivers, firmware, microcode, circuitry, data, databases, data structures, tables, arrays, or variables. In one embodiment, the Cloud-Based Multi-Source Broadcasting System 120 may include one or more of the modules shown in block 120 in FIGS. 1A-1C.

Embodiments can be implemented such that all functions illustrated herein are performed on a single device, while other embodiments can be implemented in a distributed environment in which the functions are collectively performed on two or more devices that are in communication with each other. Moreover, while the computing system has been used to describe one embodiment of a Multi-Source Broadcasting Platform 120, it is recognized that the user or customer systems may be implemented as computing systems as well.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, or may be invoked in response to detected events or interrupts. Software instructions may be embedded in firmware, such as an EPROM. It will be further appreciated that hardware modules may be comprised of connected logic units, such as gates and flip-flops, or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

It is recognized that the term "remote" may include systems, data, objects, devices, components, or modules not stored locally, that are not accessible via the local bus. Thus, remote data may include a system that is physically stored in the same room and connected to the computing system via a network. In other situations, a remote device may also be located in a separate geographic area, such as, for example, in a different location, country, and so forth.

IX. Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following.

What is claimed is:

1. A private broadcast platform system comprising:
one or more hardware processors configured to execute software instructions and to communicate with a web server communication module, an access module, and a first external communications module;
the web server communication module comprising instructions that when executed cause the one or more hardware processors to:
receive a first encrypted request data packet associated with a user device;
decrypt and parse the first encrypted request data packet to determine (i) a device fingerprint associated with the user device that identifies a user device type, (ii) a first resource file identifier associated with a first resource file, and (iii) a user identifier associated with a first user;
generate and send a first resource request message to the access module, the first resource request message comprising a user device type identifier associated with the user device type, the user identifier, and the requested first resource file identifier;
the access module comprising instructions that when executed cause the one or more hardware processors to:
receive the first resource request message from the web server communication module;
extract the user identifier from the first resource request message and determine an association group associated with the user identifier;
extract the user device type and the first resource file identifier from the first resource request message;
access a local management information database to determine one or more security rules associated with the first resource file of the first resource file identifier and the association group of the user identifier to confirm that the first user associated with the user identifier and the association group has requisite permission rights to access the first resource file associated with the first resource file identifier and the user device type;
if confirmed, generate a first resource transcoding request message comprising a first external resource identifier associated with: (i) the first resource file identifier and the user device type, and (ii) a first external third party communication port associated with a first resource file of the first resource file identifier comprising a first external third party's specific format;
the first external communications module comprising instructions that when executed cause the one or more hardware processors to:
receive the first resource transcoding request message and generate, for the first external third party communication port, a first external resource request based at least upon the determined first resource file identifier and the user device type;
receive a first encrypted data packet stream from the first external third party communication port;
select a first transcoder specific to the first external third party format;
initiate decrypting and transcoding of the first encrypted resource data packet stream by the first transcoder to generate a first broadcast platform resource data packet stream;
transmit the generated first broadcast platform resource data packet stream to the user device via the web server communications module; and
select a first player execution identifier associated with the generated first broadcast platform resource data packet stream and a stored first executable player interface for decoding and displaying to the first user the generated first broadcast platform resource data packet stream on a web page of the user device.

2. The private broadcast platform system of claim 1 wherein the association group comprises a hospital enterprise, a cruise ship enterprise, a non-profit enterprise, or a travel enterprise.

3. The private broadcast platform system of claim 1 wherein the first resource file comprises one or more of a: video file, an audio file, a web page, a live video stream, a live audio stream, a podcast, a video game file, an electronic book file, or a software application.

4. The private broadcast platform system of claim 1 wherein:
the one or more hardware processors are further configured to execute software instructions and to communicate with a second communications module, the second communications module different from the first external communications module;
the web server communication module comprising instructions that when executed cause the one or more hardware processors to:
receive a second encrypted request data packet associated with the user device;
decrypt and parse the second encrypted request data packet to determine a second resource file identifier associated with a second resource file;
generate and send a second resource request message to the access module, the second resource request message comprising the user device type identifier, the user identifier, and the requested second resource file identifier;
the access module comprising instructions that when executed further cause the one or more hardware processors to:
receive the second resource request message from the web server communication module;
extract the user identifier from the second resource request message;
extract the user device type and the second resource file identifier from the second resource request message;
access the local management information database to determine one or more security rules associated with the second resource file to confirm that the first user has requisite permission rights to access the second resource file associated with the second resource file identifier and the user device type;
if confirmed, generate a second resource transcoding request message comprising a second resource identifier associated with (i) the second resource file identifier and the user device type, and (ii) a second external third party communication port associated with a second resource file of the second resource file identifier comprising a second external third party format.

5. The private broadcast platform system of claim 4 wherein the first external communications module comprises instructions that when executed cause the one or more hardware processors to:
receive the second resource transcoding request message and generate, for the second external third party communication port, a second external resource request based at least upon the determined second resource file identifier and the user device type, the second external third party communication port different from the first external third party communication port;
receive a second encrypted data packet stream from the second external third party communication port;
select a second transcoder specific to the second external third party format, the second transcoder different from the first transcoder;
initiate decrypting and transcoding of the second encrypted resource data packet stream by the second transcoder to generate a second broadcast platform resource data packet stream;
transmit the generated second broadcast platform resource data packet stream to the user device via the web server communications module; and
select a second player execution identifier associated with the generated second broadcast platform resource data packet stream and a stored second executable player interface for decoding and displaying to the first user the generated first broadcast platform resource data packet stream on a web page of the user device, the second executable player interface different from the first executable player interface.

6. The private broadcast platform system of claim 4 further comprising:
an internal communications module comprising instructions that when executed cause the one or more hardware processors to:
receive the second resource transcoding request message and generate an internal resource request, for an internal database communication interface, based at least upon the determined second resource file identifier and the user device type, the internal database communication interface different from the first and second external third party communication ports;
receive a second encrypted data packet stream from the internal database communication interface;
select a second transcoder specific to the second third party format, the second transcoder different from the first transcoder;
initiate decrypting and transcoding of the second encrypted resource data packet stream by the second transcoder to generate a second broadcast platform resource data packet stream;
transmit the generated second broadcast platform resource data packet stream to the user device via the web server communications module; and
select a second player execution identifier associated with the generated second broadcast platform resource data packet stream and a stored second executable player interface for decoding and displaying to the first user the first broadcast platform resource data packet stream on a web page of the user device, the second executable player interface different from the first executable player interface.

7. The private broadcast platform system of claim 4 wherein the first resource file is a live video file and the second resource file is a music file.

8. A computer-implemented method for private broadcasting comprising:
as implemented by one or more computing devices comprising one or more hardware processors configured to execute software instructions:
receiving a first encrypted request data packet associated with a user device;
decrypting and parsing the first encrypted request data packet to determine (i) a device fingerprint associated with the user device that identifies a user device type, (ii) a first resource file identifier associated with a first resource file, and (iii) a user identifier associated with a first user;
generating a first resource request message comprising a user device type identifier associated with the user device type, the user identifier, and the requested first resource file identifier;
extracting the user identifier from the first resource request message and determining an association group associated with the user identifier;
extracting the user device type and the first resource file identifier from the first resource request message;
accessing a local management information database to determine one or more security rules associated with the first resource file of the first resource file identifier and the association group of the user identifier to confirm that the first user associated with the user identifier and the association group has requisite permission rights to access the first resource file associated with the first resource file identifier and the user device type;

if confirmed, generating a first resource transcoding request message comprising a first external resource identifier associated with (i) the first resource file identifier and the user device type, and (ii) a first external third party communication port associated with a first resource file of the first resource file identifier comprising a first external third party format;

generating, for the first external third party communication port, a first external resource request based at least upon the determined first resource file identifier and the user device type;

receiving a first encrypted data packet stream from the first external third party communication port;

selecting a first transcoder specific to the first external third party format;

initiating decrypting and transcoding of the first encrypted resource data packet stream by the first transcoder to generate a first broadcast platform resource data packet stream;

transmitting the generated first broadcast platform resource data packet to the user device; and selecting a first player execution identifier associated with the generated first broadcast platform resource data packet stream and a stored first executable player interface for decoding and displaying to the first user the generated first broadcast platform resource data packet stream on a web page of the user device.

9. The computer-implemented method for private broadcasting of claim 8 wherein the association group comprises a hospital enterprise, a cruise ship enterprise, a non-profit enterprise, or a travel enterprise.

10. The computer-implemented method for private broadcasting of claim 8 wherein the first resource file comprises one or more of a: video file, an audio file, a web page, a live video stream, a live audio stream, a podcast, a video game file, an electronic book file, or a software application.

11. The computer-implemented method for private broadcasting of claim 8 further comprising:
receiving a second encrypted request data packet associated with the user device;
decrypting and parsing the second encrypted request data packet to determine a second resource file identifier associated with a second resource file;
generating a second resource request message comprising the user device type identifier, the user identifier, and the requested second resource file identifier;
extracting the user identifier from the second resource request message;
extracting the user device type and the second resource file identifier from the second resource request message;
accessing the local management information database to determine one or more security rules associated with the second resource file to confirm that the first user has requisite permission rights to access the second resource file associated with the second resource file identifier and the user device type;
if confirmed, generating a second resource transcoding request message comprising a second resource identifier associated with (i) the second resource file identifier and the user device type, and (ii) a second external third party communication port associated with a second resource file of the second resource file identifier comprising a second external third party format.

12. The computer-implemented method for private broadcasting of claim 11 further comprising:
receiving the second resource transcoding request message and generating for the second external third party communication port, a second external resource request based at least upon the determined second resource file identifier and the user device type, the second external third party communication port different from the first external third party communication port;
receiving a second encrypted data packet stream from the second external third party communication port;
selecting a second transcoder specific to the second external third party format, the second transcoder different from the first transcoder;
initiating decrypting and transcoding of the second encrypted resource data packet stream by the second transcoder to generate a second broadcast platform resource data packet stream;
transmitting the generated second broadcast platform resource data packet stream to the user device; and
selecting a second player execution identifier associated with the generated second broadcast platform resource data packet stream and a stored second executable player interface for decoding and displaying to the first user the generated first broadcast platform resource data packet stream on a web page of the user device, the second executable player interface different from the first executable player interface.

13. The computer-implemented method for private broadcasting of claim 11 further comprising:
receiving the second resource transcoding request message and generating an internal resource request based at least upon the determined second resource file identifier and the user device type, the internal database communication interface different from the first and second external third party communication ports;
receiving a second encrypted data packet stream from the internal database communication interface;
selecting a second transcoder specific to the second third party format, the second transcoder different from the first transcoder;
initiating decrypting and transcoding of the second encrypted resource data packet stream by the second transcoder to generate a second broadcast platform resource data packet stream;
transmitting the generated second broadcast platform resource data packet stream to the user device; and
selecting a second player execution identifier associated with the generated second broadcast platform resource data packet stream and a stored second executable player interface for decoding and displaying to the first user the generated first broadcast platform resource data packet stream on a web page of the user device, the second executable player interface different from the first executable player interface.

14. The computer-implemented method for private broadcasting of claim 11 wherein the first resource file is a live video file and the second resource file is a music file.

15. Non-transitory, computer-readable storage media storing computer-executable instructions that, when executed by a computer system, configure the computer system to perform operations comprising:
  receiving a first encrypted request data packet associated with a user device;
  decrypting and parsing the first encrypted request data packet to determine (i) a device fingerprint associated with the user device that identifies a user device type, (ii) a first resource file identifier associated with a first resource file, and (iii) a user identifier associated with a first user;
  generating a first resource request message comprising a user device type identifier associated with the user device type, the user identifier, and the requested first resource file identifier;
  extracting the user identifier from the first resource request message and determining an association group associated with the user identifier;
  extracting the user device type and the first resource file identifier from the first resource request message;
  accessing a local management information database to determine one or more security rules associated with the first resource file of the first resource file identifier and the association group of the user identifier to confirm that the first user associated with the user identifier and the association group ahas requisite permission rights to access the first resource file associated with the first resource file identifier and the user device type;
  if confirmed, generating a first resource transcoding request message comprising a first external resource identifier associated with (i) the first resource file identifier and the user device type, and (ii) a first external third party communication port associated with a first resource file of the first resource file identifier having a first external third party format;
  generating, for the first external third party communication port, a first external resource request based at least upon the determined first resource file identifier and the user device type;
  receiving a first encrypted data packet stream from the first external third party communication port;
  selecting a first transcoder specific to the first external third party format;
  initiating decrypting and transcoding of the first encrypted resource data packet stream by the first transcoder to generate a first broadcast platform resource data packet stream;
  transmitting the generated first broadcast platform resource data packet to the user device; and
  selecting a first player execution identifier associated with the generated first broadcast platform resource data packet stream and a stored first executable player interface for decoding and displaying to the first user the generated first broadcast platform resource data packet stream on a web page of the user device.

16. The non-transitory, computer-readable storage media of claim 15 wherein the association group comprises a hospital enterprise, a cruise ship enterprise, a non-profit enterprise, or a travel enterprise.

17. The non-transitory, computer-readable storage media of claim 15 wherein the first resource file comprises one or more of a: video file, an audio file, a web page, a live video stream, a live audio stream, a podcast, a video game file, an electronic book file, or a software application.

18. The non-transitory, computer-readable storage media of claim 15 further comprising:
  receiving a second encrypted request data packet associated with the user device;
  decrypting and parsing the second encrypted request data packet to determine a second resource file identifier associated with a second resource file;
  generating a second resource request message comprising the user device type identifier, the user identifier, and the requested second resource file identifier;
  extracting the user identifier from the second resource request message;
  extracting the user device type and the second resource file identifier from the second resource request message;
  accessing the local management information database to determine one or more security rules associated with the second resource file to confirm that the first user has requisite permission rights to access the second resource file associated with the second resource file identifier and the user device type;
  if confirmed, generating a second resource transcoding request message comprising a second resource identifier associated with (i) the second resource file identifier and the user device type, and (ii) a second external third party communication port associated with a second resource file of the second resource file identifier comprising a second external third party format.

19. The non-transitory, computer-readable storage media of claim 18 further comprising:
  receiving the second resource transcoding request message and generating for the second external third party communication port, a second external resource request based at least upon the determined second resource file identifier and the user device type, the second external third party communication port different from the first external third party communication port;
  receiving a second encrypted data packet stream from the second external third party communication port;
  selecting a second transcoder specific to the second external third party format, the second transcoder different from the first transcoder;
  initiating decrypting and transcoding of the second encrypted resource data packet stream by the second transcoder to generate a second broadcast platform resource data packet stream;
  transmitting the generated second broadcast platform resource data packet stream to the user device; and
  selecting a second player execution identifier associated with the generated second broadcast platform resource data packet stream and a stored second executable player interface for decoding and displaying to the first user the generated first broadcast platform resource data packet stream on a web page of the user device, the second executable player interface different from the first executable player interface.

20. The non-transitory, computer-readable storage media of claim 18 further comprising:
  receiving the second resource transcoding request message and generating an internal resource request based at least upon the determined second resource file identifier and the user device type, the internal database communication interface different from the first and second external third party communication ports;
  receiving a second encrypted data packet stream from the internal database communication interface;

selecting a second transcoder specific to the second third party format, the second transcoder different from the first transcoder;

initiating decrypting and transcoding of the second encrypted resource data packet stream by the second transcoder to generate a second broadcast platform resource data packet stream;

transmitting the generated second broadcast platform resource data packet stream to the user device; and selecting a second player execution identifier associated with the generated second broadcast platform resource data packet stream and a stored second executable player interface for decoding and displaying to the first user the generated first broadcast platform resource data packet stream on a web page of the user device, the second executable player interface different from the first executable player interface.

* * * * *